(12) United States Patent
Elbsat et al.

(10) Patent No.: US 10,423,138 B2
(45) Date of Patent: Sep. 24, 2019

(54) BUILDING ENERGY STORAGE SYSTEM WITH PLANNING TOOL

(71) Applicant: Con Edison Battery Storage, LLC, Valhalla, NY (US)

(72) Inventors: Mohammad N. Elbsat, Milwaukee, WI (US); Michael J. Wenzel, Grafton, WI (US); Kirk H. Drees, Cedarburg, WI (US)

(73) Assignee: Con Edison Battery Storage, LLC, Valhalla, NY (US)

( * ) Notice: Subject to any disclaimer, the term of this patent is extended or adjusted under 35 U.S.C. 154(b) by 232 days.

(21) Appl. No.: 15/474,511

(22) Filed: Mar. 30, 2017

(65) Prior Publication Data

US 2018/0254632 A1     Sep. 6, 2018

Related U.S. Application Data

(60) Provisional application No. 62/467,426, filed on Mar. 6, 2017.

(51) Int. Cl.
  *G05B 19/04* (2006.01)
  *H02J 3/00* (2006.01)
  (Continued)

(52) U.S. Cl.
  CPC .............. *G05B 19/042* (2013.01); *H02J 3/00* (2013.01); *H02J 5/00* (2013.01); *G05B 2219/2639* (2013.01); *H02J 2003/007* (2013.01)

(58) Field of Classification Search
  CPC .... G05B 13/021; G05B 13/048; G05B 15/02; G05B 19/418; G05B 2219/2642;
  (Continued)

(56) References Cited

U.S. PATENT DOCUMENTS 6,185,483 B1 *  2/2001  Drees ................... F24F 11/006
                                                        700/291
6,522,031 B2 *  2/2003  Provanzana ............ H02J 3/28
                                                         307/48
(Continued)

OTHER PUBLICATIONS

U.S. Appl. No. 15/247,777, filed Aug. 25, 2016, Johnson Controls Technology Company.
(Continued)

*Primary Examiner* — Chun Cao
(74) *Attorney, Agent, or Firm* — Michael Best & Friedrich LLP

(57) ABSTRACT

An energy storage system for a building includes a battery asset configured to store electricity and discharge the stored electricity for use in satisfying a building electric load. The system includes a planning tool configured to identify one or more selected functionalities of the energy storage system and generate a cost function defining a cost of operating the energy storage system over an optimization period. The cost function includes a term for each of the selected functionalities. The planning tool is configured to generate optimization constraints based on the selected functionalities, attributes of the battery asset, and the electric energy load to be satisfied. The planning tool is configured to optimize the cost function to determine optimal power setpoints for the battery asset at each of a plurality of time steps of the optimization period.

20 Claims, 39 Drawing Sheets

(51) Int. Cl.
*G05B 19/042* (2006.01)
*H02J 5/00* (2016.01)

(58) Field of Classification Search
CPC ........... G05B 2219/31414; G05B 2219/32021; G05B 13/0205; G05B 19/406; G05B 2219/4906; H02J 3/00; H02J 3/14; H02J 2003/003; H02J 2003/007; H02J 3/008; H02J 3/28; H02J 13/0006; H02J 2003/143; H02J 3/32; H02J 3/383
USPC ....................................................... 700/291
See application file for complete search history.

(56) References Cited

U.S. PATENT DOCUMENTS

| | | | |
|---|---|---|---|
| 2011/0018502 A1* | 1/2011 | Bianciotto | H02J 7/045 320/162 |
| 2014/0200723 A1* | 7/2014 | Roy | G06Q 50/06 700/291 |
| 2015/0039145 A1* | 2/2015 | Yang | G05B 13/02 700/291 |
| 2015/0316901 A1 | 11/2015 | Wenzel et al. | |
| 2015/0316902 A1 | 11/2015 | Wenzel et al. | |
| 2015/0316903 A1 | 11/2015 | Asmus et al. | |
| 2015/0316907 A1 | 11/2015 | Elbsat et al. | |
| 2015/0316946 A1 | 11/2015 | Wenzel et al. | |
| 2016/0197519 A1* | 7/2016 | Carter | G06Q 10/06 700/291 |
| 2016/0377306 A1 | 12/2016 | Drees et al. | |
| 2017/0235858 A1* | 8/2017 | Tate, Jr. | G06F 17/5036 703/2 |

OTHER PUBLICATIONS

U.S. Appl. No. 15/247,784, filed Aug. 25, 2016, Johnson Controls Technology Company.
U.S. Appl. No. 15/247,788, filed Aug. 25, 2016, Johnson Controls Technology Company.
U.S. Appl. No. 15/247,793, filed Aug. 25, 2016, Johnson Controls Technology Company.
U.S. Appl. No. 15/247,844, filed Aug. 25, 2016, Johnson Controls Technology Company.
U.S. Appl. No. 15/247,869, filed Aug. 25, 2016, Johnson Controls Technology Company.
U.S. Appl. No. 15/247,872, filed Aug. 25, 2016, Johnson Controls Technology Company.
U.S. Appl. No. 15/247,873, filed Aug. 25, 2016, Johnson Controls Technology Company.
U.S. Appl. No. 15/247,875, filed Aug. 25, 2016, Johnson Controls Technology Company.
U.S. Appl. No. 15/247,879, filed Aug. 25, 2016, Johnson Controls Technology Company.
U.S. Appl. No. 15/247,880, filed Aug. 25, 2016, Johnson Controls Technology Company.
U.S. Appl. No. 15/247,883, filed Aug. 25, 2016, Johnson Controls Technology Company.
U.S. Appl. No. 15/247,885, filed Aug. 25, 2016, Johnson Controls Technology Company.
U.S. Appl. No. 15/247,886, filed Aug. 25, 2016, Johnson Controls Technology Company.
U.S. Appl. No. 15/405,234, filed Jan. 12, 2017, Johnson Controls Technology Company.
U.S. Appl. No. 15/405,236, filed Jan. 12, 2017, Johnson Controls Technology Company.
U.S. Appl. No. 15/426,962, filed Feb. 7, 2017, Johnson Controls Technology Company.

* cited by examiner

1600

| Client Information | | Tool Guide |
|---|---|---|
| Company/Facility Name | ABC Corporation | |
| Street Address | 123 Main St. | 1610 |
| City, State, Zipcode | Milwaukee, WI 53202 | |
| Phone | (123) 456-7890 | Run Tool |
| Service Account Number | 11223344 | |
| | | Run with Kernel Release 1.3 |

1602 — 1608 —

| Functionality Selection | | Capital Expenses | |
|---|---|---|---|
| Determine Battery Size | No | System Size Dependent | |
| | | Energy Cost ($) | $400,000,000 |
| Optimize Simple Pay Back Period? | Yes | Power Cost ($) | $1,800,000 |
| Optimize NPV, Enter Simple Payback Period | | Installation Cost ($) | $0 |
| Simple Payback Period | 3.98 | | |
| C Rate | 1 | | |
| Augmentation Strategy Unit Cost ($/kWh) | 500 | | |
| Energy Upper Bound (kWh) | 1000 | Fixed | |
| Power Upper Bound (kW) | 1000 | Integration ($) | $20,000 |
| Enable By Selecting Yes for Determine Battery Size | | iDR/SCADA/EOS Setup Fees ($) | $15,000 |

1604 —

| | | Warranty ($) | $20,000 |
|---|---|---|---|
| Select Program(s) | | Construction ($) | $0 |
| Frequency Regulation | No | Controls ($) | $40,000 |
| Economic Load Demand Response | Yes | Development ($) | $50,000 |
| Peak Load Contribution | No | iDR Management Fee ($) | $10,000 |

1606 —

| | | Total Fixed Cost | $155,000 |
|---|---|---|---|
| Financial Run Information | | Adjustment | |
| Number of Years | 1 | Expected Markup of Energy Cost ($) | $12,000,000 |
| Financed Interest Rate (%) | 7% | Expected Markup of Power Cost ($) | $72,000 |
| Generate Plots | Yes | Margin ($) | $20,097,750.00 |
| | | Total Initial Investment | $434,124,750 |

1612 Storage System Paramaters

| Battery Energy Capacity (kWh) | 500000.00 |
|---|---|
| Battery Power Capacity (kW) | 12000.00 |
| SOC Control Margin (%) | 10% |
| Storage Backup (%) | 0% |
| Degradation per Cycle (%) | 0.0140% |
| Degradation Threshold (%) | 80.00% |
|  |  |

Enable by Selecting No for Determine Battery Size

1614 PV System Parameters

| Enable PV | Yes |
|---|---|
| PV Capacity (kW) | 2550 |
| PV Firming Reserve Capacity (kWh) | 100 |
| PV Firming Reserve Power (kW) | 125 |
|  |  |

Enable By Selecting Yes for Enable PV

1616 Expense Parameters

| ($/kWh) | |
|---|---|
| Energy Unit Cost ($/kWh) | 800.00 |
| Installation Cost ($/kWh) | 0.00 |
|  | 0.00 |
| Total Energy Unit Cost ($/kWh) | 800.00 |
| ($/kW) | |
| Power Unit Cost ($/kW) | 150.00 |
|  | 0.00 |
|  | 0.00 |
| Total Power Unit Cost ($/kW) | 150.00 |
| Other | |
| Expected Markup of Energy Cost (%) | 3% |
| Expected Markup of Power Cost (%) | 4% |
| Margin (%) | 5% |
| Operations and Maintenance Factor ($/kWh) | 6.00 |
| iDR Management Fee (%) | 0% |
| Partner Management Fee (%) | 0% |

1618 Error Messages

| Load Percent Change | | | Rates and FR Incentive Percent Change (1630) | | | | |
|---|---|---|---|---|---|---|---|
| Applied After | Electric Load | PV Generation | Electric Rate | Real Time LMP | Day Ahead LMP | FR Incentives | PLC/ GA Rates |
| Year 1 | 3.00% | 0.00% | 3.00% | 3.00% | 3.00% | 0.00% | 0.00% |
| Year 2 | -2.00% | 0.00% | -2.00% | -2.00% | -2.00% | -1.00% | -1.00% |
| Year 3 | 3.00% | 0.00% | 3.00% | 3.00% | 3.00% | -1.00% | -1.00% |
| Year 4 | 0.00% | 0.00% | 0.00% | 0.00% | 0.00% | -2.00% | -2.00% |
| Year 5 | -2.00% | 0.00% | -2.00% | -2.00% | -2.00% | -2.00% | -2.00% |
| Year 6 | -1.00% | 0.00% | -1.00% | -1.00% | -1.00% | -1.00% | -1.00% |
| Year 7 | 0.00% | 0.00% | 0.00% | 0.00% | 0.00% | 0.00% | 0.00% |
| Year 8 | 0.00% | 0.00% | 0.00% | 0.00% | 0.00% | 0.00% | 0.00% |
| Year 9 | 5.00% | 0.00% | 5.00% | 5.00% | 5.00% | -1.00% | -1.00% |
| Year 10 | 6.00% | 0.00% | 6.00% | 6.00% | 6.00% | 0.00% | 0.00% |
| Year 11 | 1.00% | 0.00% | 1.00% | 1.00% | 1.00% | -1.00% | -1.00% |
| Year 12 | 1.00% | 0.00% | 1.00% | 1.00% | 1.00% | 0.00% | 0.00% |
| Year 13 | 1.00% | 0.00% | 1.00% | 1.00% | 1.00% | 0.00% | 0.00% |
| Year 14 | 1.00% | 0.00% | 1.00% | 1.00% | 1.00% | -2.00% | -2.00% |
| Year 15 | 1.00% | 0.00% | 1.00% | 1.00% | 1.00% | -3.00% | -3.00% |
| Year 16 | 0.00% | 0.00% | 0.00% | 0.00% | 0.00% | -1.00% | -1.00% |
| Year 17 | 0.00% | 0.00% | 0.00% | 0.00% | 0.00% | -1.00% | -1.00% |
| Year 18 | 0.00% | 0.00% | 0.00% | 0.00% | 0.00% | 0.00% | 0.00% |
| Year 19 | 0.00% | 0.00% | 0.00% | 0.00% | 0.00% | 0.00% | 0.00% |

| Annual Costs 1632 | | | Miscellaneous Cost ($) |
|---|---|---|---|
| Applied After | Augmentation Unit Cost ($/kWh) | O&M ($) | Miscellaneous Cost ($) |
| Year 1 | $700 | $3,000,000 | $0 |
| Year 2 | $675 | $3,000,000 | $0 |
| Year 3 | $650 | $3,000,000 | $0 |
| Year 4 | $625 | $3,000,000 | $0 |
| Year 5 | $600 | $3,000,000 | $0 |
| Year 6 | $575 | $3,000,000 | $0 |
| Year 7 | $550 | $3,000,000 | $0 |
| Year 8 | $525 | $3,000,000 | $0 |
| Year 9 | $500 | $3,000,000 | $0 |
| Year 10 | $475 | $3,000,000 | $0 |
| Year 11 | $475 | $3,000,000 | $0 |
| Year 12 | $425 | $3,000,000 | $0 |
| Year 13 | $400 | $3,000,000 | $0 |
| Year 14 | $375 | $3,000,000 | $0 |
| Year 15 | $350 | $3,000,000 | $0 |
| Year 16 | $325 | $3,000,000 | $0 |
| Year 17 | $300 | $3,000,000 | $0 |
| Year 18 | $275 | $3,000,000 | $0 |
| Year 19 | $250 | $3,000,000 | $0 |
| Year 20 | $225 | $3,000,000 | $0 |

| Current Rate Details | |
|---|---|
| Current Electric Company | PG&E |
| Current Rate Schedule | E-19P Mandatory Firm |
| Current Rate Subclass | Time of Use |
| Demand Type | 1 |
| Weekday End (5=Fri, 6=Sat) | 5 |
| Summer Season Start | 1-May |
| Summer Season End | 31-Oct |
| Winter Season Start | 1-Nov |
| Winter Season End | 30-Apr |

Summer

| Weekdays | Period | 1 | Rate Code | | Demand Rate Code | | Start Time | End Time | Energy Rate | Demand Rate |
|---|---|---|---|---|---|---|---|---|---|---|
| On-Peak 1 | 1 | 1-A | RATE-1-1 | | DEMAND-1-1 | 1-1-1-A | 12:00 PM | 6:00 PM | $ 0.1372 | $ 16.6800 |
| Partial Peak 1 | 2 | 2-A | RATE-1-2 | | DEMAND-1-2 | 1-1-2-A | 8:30 AM | 12:00 PM | $ 0.0992 | $ 4.5700 |
| Partial Peak 2 | 2 | 2-B | RATE-1-2 | | DEMAND-1-2 | 1-1-2-B | 6:00 PM | 9:30 PM | $ 0.0992 | $ 4.5700 |
| Off-Peak 1 | 3 | 3-A | RATE-1-3 | | DEMAND-1-3 | 1-1-3-A | 9:30 PM | 11:59 PM | $ 0.0748 | $ - |
| Off-Peak 2 | 3 | 3-B | RATE-1-3 | | DEMAND-1-3 | 1-1-3-B | 12:00 AM | 8:30 AM | $ 0.0748 | $ - |
| Facilities Related | | | | | DEMAND-1 | | | | | $ 14.0600 |

| Weekends / Holidays | Period | 1 | Rate Code | | Demand Rate Code | | Start Time | End Time | Energy Rate | Demand Rate |
|---|---|---|---|---|---|---|---|---|---|---|
| Off-Peak 1 | 3 | 3-A | RATE-1-3 | | DEMAND-1-3 | 1-2-3-A | 12:00 AM | 12:00 PM | $ 0.0748 | $ - |
| Off-Peak 2 | 3 | 3-B | RATE-1-3 | | DEMAND-1-3 | 1-2-3-B | 12:00 PM | 11:59 PM | $ 0.0748 | $ - |
| Facilities Related | | | | | DEMAND-1 | | | | | $ 14.0600 |

Winter

| Weekdays | Period | 1 | Rate Code | | Demand Rate Code | | Start Time | End Time | Energy Rate | Demand Rate |
|---|---|---|---|---|---|---|---|---|---|---|
| Partial Peak 1 | 2 | 2-A | RATE-2-2 | | DEMAND-2-2 | 2-1-2-A | 8:30 AM | 9:30 PM | $ 0.0941 | $ 0.1500 |
| Off-Peak 1 | 3 | 3-A | RATE-2-3 | | DEMAND-2-3 | 2-1-3-A | 9:30 PM | 11:59 PM | $ 0.0808 | $ - |
| Off-Peak 2 | 3 | 3-B | RATE-2-3 | | DEMAND-2-3 | 2-1-3-B | 12:00 AM | 8:30 AM | $ 0.0808 | $ - |
| Facilities Related | | | | | DEMAND-2 | | | | | $ 14.0600 |

| Weekends | Period | 1 | Rate Code | | Demand Rate Code | | Start Time | End Time | Energy Rate | Demand Rate |
|---|---|---|---|---|---|---|---|---|---|---|
| Off-Peak 1 | 3 | 3-A | RATE-2-3 | | DEMAND-2-3 | 2-2-3-A | 12:00 AM | 12:00 PM | $ 0.0808 | $ - |
| Off-Peak 2 | 3 | 3-B | RATE-2-3 | | DEMAND-2-3 | 2-2-3-B | 12:00 PM | 11:59 PM | $ 0.0808 | $ - |
| Facilities Related | | | | | DEMAND-2 | | | | | $ 14.0600 |

| | | | |
|---|---|---|---|
| Battery Energy Capacity (kWh) | 500000.00 | | |
| Battery Power Capacity (kW) | 12000.00 | | |
| FR Enabled | No | | |
| ELDR Enabled | Yes | | |
| PV Enabled | Yes | | |
| PLC/GA Enabled | No | | |
| Year | 0 | 1 | ... |
| Baseline Cost | | | |
| Baseline Energy Cost ($) | $0 | ($28,007,995) | ... |
| Baseline Demand Cost ($) | $0 | $0 | ... |
| Baseline PLC/GA Cost ($) | $0 | $0 | ... |
| Cost with Storage | | | |
| With Storage Energy Cost ($) | $0 | ($27,426,249) | ... |
| With Storage Demand Cost ($) | $0 | $0 | ... |
| With Storage PLC/GA Cost ($) | $0 | $0 | ... |
| Annual Cost | | | |
| Operations and Maintenance Cost ($) | $0 | ($3,000,000) | ... |
| Miscellaneous Annual Cost ($) | $0 | $0 | ... |
| kWh Augmentation Cost ($) | $0 | $0 | ... |
| Total Annual Cost | $0 | ($3,000,000) | ... |
| Benefit | | | |
| ELDR Revenue ($) | $0 | $1,409,558 | ... |
| FR Revenue ($) | $0 | $0 | ... |
| Energy Cost Savings ($) | $0 | $581,745 | ... |
| Demand Cost Savings ($) | $0 | $0 | ... |
| PLC /GA Savings ($) | $0 | $0 | ... |
| Total Annual Benefit ($) | $0 | $1,991,303 | ... |
| Battery Performance | | | |
| Number of Battery Cycles | 0.00 | 80.02 | ... |
| Initial Battery Capacity (kWh) | 500000.00 | 500000.00 | ... |
| Final Battery Capacity (kWh) | 500000.00 | 494429.29 | ... |
| kWh Augmented (kWh) | 0.00 | 0.00 | ... |
| ProForma | | | |
| Cash Flow ($) | ($434,124,750) | ($1,008,697) | ... |
| Accumulated Cash Balance ($) | ($434,124,750) | ($435,133,447) | ... |
| Initial Investment ($) | ($434,124,750) | | |
| Simple Payback Period (Years) | | | |
| Net Present Value ($) | (435,067,457) | | |
| Internal Rate of Return (%) | | | |

FIG. 18B

| Baseline Average Hourly Demand Per Month | | | | | | | | | | | | |
|---|---|---|---|---|---|---|---|---|---|---|---|---|
| Hour Ending | Jan | Feb | Mar | Apr | May | Jun | Jul | Aug | Sep | Oct | Nov | Dec |
| 1 | 24605.85 | 24974.39 | 24355.34 | 24550.76 | 24557.71 | 22965.25 | 23091.97 | 22491.40 | 23970.69 | 24092.62 | 24151.23 | 22446.14 |
| 2 | 24027.10 | 24467.25 | 23899.86 | 24037.35 | 24061.24 | 22413.49 | 22510.00 | 21998.84 | 23384.72 | 23518.22 | 23560.50 | 21997.87 |
| 3 | 23687.19 | 24001.08 | 23440.75 | 23559.94 | 23637.45 | 21887.75 | 22018.06 | 21676.39 | 22752.77 | 22989.87 | 23145.01 | 21635.21 |
| 4 | 23431.93 | 23619.80 | 23139.78 | 23278.92 | 23229.20 | 21792.13 | 21938.61 | 21688.31 | 22625.27 | 22863.56 | 22771.05 | 21589.52 |
| 5 | 23682.97 | 23701.09 | 23203.93 | 23474.69 | 23169.91 | 22035.38 | 22128.49 | 21781.22 | 22755.64 | 23023.59 | 22735.74 | 21681.25 |
| 6 | 24242.71 | 24234.60 | 23712.98 | 23861.73 | 23344.23 | 22419.15 | 22620.42 | 22439.22 | 23592.70 | 23796.02 | 23143.31 | 22060.73 |
| 7 | 25267.30 | 25189.37 | 24684.25 | 24846.41 | 23740.97 | 23030.99 | 23512.10 | 23000.27 | 24472.74 | 24659.03 | 24100.83 | 22639.26 |
| 8 | 26093.85 | 26005.93 | 25564.37 | 25731.87 | 24697.13 | 24107.43 | 24544.17 | 23728.31 | 25379.72 | 25464.15 | 24976.81 | 23374.01 |
| 9 | 26907.68 | 26867.87 | 26537.08 | 26826.18 | 25698.71 | 25186.56 | 25295.41 | 24696.26 | 26238.00 | 26342.46 | 25943.66 | 23822.58 |
| 10 | 27550.93 | 27608.04 | 27397.95 | 27563.74 | 26637.18 | 26129.23 | 26205.87 | 25434.35 | 27052.12 | 27304.42 | 26911.44 | 24389.48 |
| 11 | 28161.99 | 28182.14 | 28002.01 | 28155.41 | 27257.12 | 26957.20 | 27070.17 | 26245.04 | 27815.42 | 28123.88 | 27661.80 | 24893.14 |
| 12 | 28495.25 | 28658.89 | 28489.16 | 28563.87 | 27790.49 | 27560.02 | 27640.20 | 26832.44 | 28442.41 | 28720.26 | 28204.97 | 25291.39 |
| 13 | 28633.23 | 28800.43 | 28686.31 | 28743.69 | 27947.36 | 27886.91 | 27852.16 | 27061.39 | 28706.62 | 29051.15 | 28588.20 | 25607.01 |
| 14 | 28699.63 | 28903.84 | 28721.52 | 28758.61 | 28038.79 | 28019.44 | 28000.53 | 27216.31 | 28883.77 | 29243.95 | 28787.96 | 25828.47 |
| 15 | 28705.60 | 28884.43 | 28676.41 | 28823.33 | 28096.53 | 28108.93 | 28040.08 | 27213.31 | 28945.08 | 29289.65 | 28855.24 | 25946.15 |
| 16 | 28812.60 | 28934.13 | 28563.21 | 28682.11 | 28056.68 | 27981.26 | 27936.23 | 27035.29 | 28871.58 | 29166.19 | 28798.65 | 25953.97 |
| 17 | 28780.48 | 28936.11 | 28244.61 | 28362.71 | 27790.63 | 27581.28 | 27562.40 | 26625.04 | 28438.12 | 28659.90 | 28737.68 | 25965.70 |
| 18 | 28897.59 | 29121.24 | 27986.21 | 28003.52 | 27515.81 | 26922.05 | 26834.70 | 26066.44 | 28014.05 | 28257.87 | 28682.93 | 25919.69 |
| 19 | 28700.75 | 29097.41 | 27814.57 | 27675.27 | 27032.25 | 26260.14 | 26268.83 | 25534.71 | 27769.44 | 28011.11 | 28561.70 | 25789.20 |
| 20 | 28191.57 | 28674.74 | 27656.57 | 27417.87 | 26705.06 | 25677.33 | 25704.90 | 25145.22 | 27415.22 | 27600.69 | 28046.65 | 25388.95 |
| 21 | 27418.53 | 27844.86 | 27223.72 | 27096.02 | 26552.89 | 25225.39 | 25464.34 | 24793.49 | 26829.94 | 26871.62 | 27296.35 | 24899.51 |
| 22 | 26594.01 | 27024.36 | 26489.87 | 26525.13 | 26169.04 | 24793.53 | 25054.42 | 24262.38 | 26017.43 | 26196.06 | 26415.58 | 24232.13 |
| 23 | 25792.92 | 26206.05 | 25619.05 | 25671.68 | 25450.35 | 24117.90 | 24229.59 | 23455.42 | 25185.24 | 25392.38 | 25506.23 | 23521.83 |
| 24 | 25151.74 | 25606.17 | 24974.52 | 24979.79 | 24851.53 | 23435.78 | 23552.20 | 22858.71 | 24551.50 | 24734.99 | 24814.14 | 22932.01 |

1900 ↖  1902 Month

FIG. 19A

| With Storage Average Hourly Demand Per Month | | | | | | | | | | | | | |
|---|---|---|---|---|---|---|---|---|---|---|---|---|---|
| Hour Ending | Jan | Feb | Mar | Apr | May | Jun | Jul | Aug | Sep | Oct | Nov | Dec |
| 1 | 32551.31 | 33800.05 | 33598.34 | 33595.55 | 29817.41 | 28427.51 | 28844.04 | 25470.73 | 31195.06 | 33538.99 | 31917.89 | 28278.82 |
| 2 | 32240.78 | 33292.92 | 33142.86 | 33082.14 | 31414.57 | 27875.75 | 28707.23 | 24978.17 | 31004.94 | 32964.59 | 31327.17 | 30128.95 |
| 3 | 31900.87 | 32826.75 | 32683.75 | 32604.73 | 30990.78 | 27117.38 | 28164.70 | 24655.73 | 30190.29 | 32436.24 | 30911.67 | 29766.29 |
| 4 | 31390.24 | 32445.47 | 31663.82 | 32015.84 | 30582.52 | 27549.53 | 28979.07 | 25178.40 | 30326.68 | 32309.94 | 29746.05 | 29592.90 |
| 5 | 32024.34 | 32844.84 | 31930.14 | 32552.47 | 31655.83 | 29969.87 | 30509.67 | 29101.96 | 32139.34 | 32661.49 | 30569.28 | 30067.70 |
| 6 | 30367.22 | 31015.47 | 30999.61 | 31579.35 | 27784.40 | 27890.34 | 29545.95 | 27977.23 | 30573.30 | 31570.04 | 26820.60 | 27475.92 |
| 7 | 30187.89 | 31970.24 | 31970.89 | 32564.03 | 28643.37 | 27682.23 | 29773.65 | 27440.17 | 30972.69 | 32433.05 | 27778.12 | 28608.67 |
| 8 | 31014.43 | 32786.80 | 32851.00 | 33449.49 | 29304.87 | 28515.08 | 29812.77 | 27696.74 | 31873.83 | 33238.17 | 28654.10 | 28789.20 |
| 9 | 30608.37 | 33648.73 | 33823.71 | 34543.80 | 29205.76 | 28321.89 | 28447.53 | 27457.12 | 30272.29 | 32351.65 | 28871.69 | 29094.12 |
| 10 | 31251.63 | 34388.91 | 34684.58 | 35281.36 | 29914.39 | 29264.56 | 28591.87 | 28195.21 | 31086.42 | 33313.61 | 29839.48 | 29382.43 |
| 11 | 31862.69 | 34963.01 | 35288.65 | 36136.91 | 30534.33 | 30092.53 | 29456.17 | 29005.90 | 31849.72 | 34133.07 | 30946.66 | 29886.09 |
| 12 | 32195.95 | 35439.75 | 35775.79 | 36545.38 | 31067.70 | 30695.35 | 30026.20 | 29593.31 | 32476.70 | 34729.45 | 31489.83 | 30667.40 |
| 13 | 23564.95 | 20131.68 | 19744.38 | 22839.62 | 26148.96 | 31022.24 | 30238.16 | 29056.13 | 28235.95 | 23689.34 | 27815.77 | 22936.39 |
| 14 | 23248.27 | 19386.87 | 19098.59 | 20567.50 | 26240.39 | 31154.78 | 30386.73 | 29211.05 | 26829.78 | 23116.01 | 28015.53 | 22391.72 |
| 15 | 23190.41 | 19418.35 | 19053.48 | 20632.22 | 26489.67 | 31244.27 | 30489.92 | 29208.05 | 27682.75 | 23161.71 | 28703.69 | 22509.40 |
| 16 | 21845.42 | 19468.06 | 18940.28 | 19419.61 | 22164.97 | 20297.67 | 19922.61 | 19011.93 | 20012.07 | 18884.73 | 20984.90 | 19544.66 |
| 17 | 21323.37 | 19936.55 | 18621.68 | 19100.21 | 21898.92 | 19897.69 | 19612.61 | 18601.68 | 19578.60 | 18761.51 | 20923.93 | 19556.40 |
| 18 | 21243.50 | 21818.11 | 20362.88 | 19981.30 | 22599.64 | 19238.46 | 18884.92 | 18043.09 | 19550.37 | 19232.87 | 21767.72 | 20216.36 |
| 19 | 20850.21 | 21794.28 | 20191.24 | 19653.05 | 19611.42 | 19535.69 | 19915.15 | 20251.74 | 20097.43 | 18986.11 | 21646.49 | 17492.82 |
| 20 | 21107.16 | 21371.61 | 20033.24 | 19395.65 | 18330.06 | 18952.88 | 19351.22 | 19862.25 | 19743.21 | 18575.69 | 21131.45 | 16326.44 |
| 21 | 20005.77 | 20541.74 | 19600.39 | 19073.80 | 17706.42 | 17387.38 | 18580.26 | 18449.72 | 19440.66 | 17846.62 | 20381.14 | 15349.46 |
| 22 | 20024.00 | 19721.23 | 18866.54 | 18502.91 | 17322.57 | 16163.85 | 17302.06 | 17484.48 | 17836.48 | 17171.06 | 18708.70 | 14682.08 |
| 23 | 20882.86 | 19657.83 | 18677.57 | 17966.13 | 17768.40 | 16450.26 | 18261.75 | 17340.87 | 19075.18 | 16589.55 | 20277.27 | 16963.51 |
| 24 | 20816.28 | 23299.03 | 21097.56 | 20440.90 | 18701.84 | 18143.14 | 19437.59 | 17842.28 | 20816.44 | 17464.42 | 21168.51 | 17331.36 |

FIG. 19B

| Average Hourly Battery Power (kW) | | | | | | | | | | | | | |
|---|---|---|---|---|---|---|---|---|---|---|---|---|---|
| | | | | | | Month | | | | | | | |
| Hour Ending | Jan | Feb | Mar | Apr | May | Jun | Jul | Aug | Sep | Oct | Nov | Dec |
| 1 | 9139.06 | 9835.04 | 9986.14 | 9955.21 | 9296.74 | 9424.19 | 9570.51 | 9278.73 | 10334.35 | 10472.98 | 9650.00 | 9489.89 |
| 2 | 9407.29 | 9835.04 | 9986.14 | 9955.21 | 9501.51 | 9424.19 | 9891.48 | 9278.73 | 9938.52 | 10472.98 | 9650.00 | 10256.02 |
| 3 | 9407.29 | 9835.04 | 9986.14 | 9955.21 | 9501.51 | 9536.52 | 9942.07 | 9278.73 | 9846.43 | 10472.98 | 9650.00 | 10256.02 |
| 4 | 9151.91 | 9835.04 | 9343.10 | 9647.34 | 9501.51 | 9800.41 | 10580.51 | 9534.10 | 10110.32 | 10472.98 | 9650.00 | 10128.33 |
| 5 | 8768.85 | 9516.96 | 8970.67 | 9394.44 | 9901.17 | 10394.16 | 10772.05 | 10300.23 | 10407.19 | 10281.45 | 9583.13 | 9745.27 |
| 6 | 7691.35 | 8123.47 | 8330.76 | 8379.60 | 7364.11 | 8010.02 | 9316.40 | 8711.99 | 8637.43 | 8522.64 | 7010.21 | 7343.95 |
| 7 | 7363.01 | 8123.47 | 8330.76 | 8379.60 | 7668.01 | 7585.91 | 8652.42 | 8380.00 | 8156.78 | 8522.64 | 7010.21 | 7555.85 |
| 8 | 7363.01 | 8123.47 | 8330.76 | 8379.60 | 7373.34 | 7342.32 | 8425.60 | 7908.53 | 8150.94 | 8522.64 | 7010.21 | 7343.95 |
| 9 | 6839.96 | 8123.47 | 8330.76 | 8379.60 | 6272.65 | 6465.84 | 6820.88 | 6700.97 | 8066.12 | 7907.00 | 6656.79 | 7200.30 |
| 10 | 6839.96 | 8123.47 | 8330.76 | 8379.60 | 6042.81 | 6465.84 | 6820.88 | 6700.97 | 8066.12 | 7907.00 | 6656.79 | 6921.71 |
| 11 | 6839.96 | 8123.47 | 8330.76 | 8643.49 | 6042.81 | 6465.84 | 6820.88 | 6700.97 | 8066.12 | 7907.00 | 6641.53 | 6921.71 |
| 12 | 6839.96 | 8123.47 | 8330.76 | 8643.49 | 6042.81 | 6465.84 | 6820.88 | 6700.97 | 8066.12 | 7907.00 | 6641.53 | 7304.77 |
| 13 | 7136.83 | 9516.96 | 9613.72 | 9686.48 | 5947.05 | 6465.84 | 6820.88 | 6700.97 | 8311.16 | 9072.06 | 6938.40 | 7685.55 |
| 14 | 8286.03 | 9516.96 | 9698.85 | 9774.44 | 5947.05 | 6465.84 | 6820.88 | 6700.97 | 8311.16 | 9072.06 | 6938.40 | 7685.55 |
| 15 | 9116.00 | 9466.07 | 9698.85 | 9774.44 | 6521.64 | 6465.84 | 6757.03 | 6700.97 | 8311.16 | 9072.06 | 7559.29 | 7685.55 |
| 16 | 10031.70 | 9466.07 | 9698.85 | 10054.17 | 8212.60 | 10091.90 | 10062.67 | 9583.12 | 10932.15 | 10281.45 | 10188.75 | 8857.70 |
| 17 | 9755.50 | 9847.77 | 9698.85 | 10054.17 | 8212.60 | 10091.90 | 9998.82 | 9583.12 | 10932.15 | 10664.52 | 10188.75 | 8857.70 |
| 18 | 10182.16 | 11544.20 | 11529.89 | 11188.89 | 8769.32 | 10091.90 | 9998.82 | 9583.12 | 11327.99 | 11323.39 | 10873.54 | 9338.95 |
| 19 | 10378.60 | 11544.20 | 11529.89 | 11188.89 | 10272.11 | 10259.37 | 9168.85 | 9907.25 | 11327.99 | 11323.39 | 10873.54 | 10458.67 |
| 20 | 10378.60 | 11544.20 | 11529.89 | 11188.89 | 10850.19 | 10259.37 | 9168.85 | 9907.25 | 11610.72 | 11323.39 | 10873.54 | 10458.67 |
| 21 | 10706.94 | 11544.20 | 11529.89 | 11188.89 | 11144.86 | 10729.15 | 9404.58 | 10378.71 | 11610.72 | 11323.39 | 10873.54 | 10737.27 |
| 22 | 10017.42 | 11544.20 | 11529.89 | 11188.89 | 11144.86 | 10729.15 | 10068.56 | 10710.70 | 11610.72 | 11323.39 | 10873.54 | 10737.27 |
| 23 | 8612.85 | 10789.29 | 10848.04 | 10872.22 | 9980.34 | 9767.11 | 9816.30 | 10047.35 | 10727.34 | 11101.21 | 9187.29 | 8703.19 |
| 24 | 8038.26 | 10789.29 | 10848.04 | 10872.22 | 9980.34 | 9767.11 | 9495.33 | 10379.34 | 10727.34 | 11101.21 | 9187.29 | 8511.66 |

FIG. 19C

| Average Hourly FR Participation | | | | | | | | | | | | |
|---|---|---|---|---|---|---|---|---|---|---|---|---|
| Hour Ending | Jan | Feb | Mar | Apr | May | Jun | Jul | Aug | Sep | Oct | Nov | Dec |
| 1 | 0.00 | 0.00 | 0.00 | 0.00 | 0.00 | 0.00 | 0.00 | 0.00 | 0.00 | 0.00 | 0.00 | 0.00 |
| 2 | 0.00 | 0.00 | 0.00 | 0.00 | 0.00 | 0.00 | 0.00 | 0.00 | 0.00 | 0.00 | 0.00 | 0.00 |
| 3 | 0.00 | 0.00 | 0.00 | 0.00 | 0.00 | 0.00 | 0.00 | 0.00 | 0.00 | 0.00 | 0.00 | 0.00 |
| 4 | 0.00 | 0.00 | 0.00 | 0.00 | 0.00 | 0.00 | 0.00 | 0.00 | 0.00 | 0.00 | 0.00 | 0.00 |
| 5 | 0.00 | 0.00 | 0.00 | 0.00 | 0.00 | 0.00 | 0.00 | 0.00 | 0.00 | 0.00 | 0.00 | 0.00 |
| 6 | 0.00 | 0.00 | 0.00 | 0.00 | 0.00 | 0.00 | 0.00 | 0.00 | 0.00 | 0.00 | 0.00 | 0.00 |
| 7 | 0.00 | 0.00 | 0.00 | 0.00 | 0.00 | 0.00 | 0.00 | 0.00 | 0.00 | 0.00 | 0.00 | 0.00 |
| 8 | 0.00 | 0.00 | 0.00 | 0.00 | 0.00 | 0.00 | 0.00 | 0.00 | 0.00 | 0.00 | 0.00 | 0.00 |
| 9 | 0.00 | 0.00 | 0.00 | 0.00 | 0.00 | 0.00 | 0.00 | 0.00 | 0.00 | 0.00 | 0.00 | 0.00 |
| 10 | 0.00 | 0.00 | 0.00 | 0.00 | 0.00 | 0.00 | 0.00 | 0.00 | 0.00 | 0.00 | 0.00 | 0.00 |
| 11 | 0.00 | 0.00 | 0.00 | 0.00 | 0.00 | 0.00 | 0.00 | 0.00 | 0.00 | 0.00 | 0.00 | 0.00 |
| 12 | 0.00 | 0.00 | 0.00 | 0.00 | 0.00 | 0.00 | 0.00 | 0.00 | 0.00 | 0.00 | 0.00 | 0.00 |
| 13 | 0.00 | 0.00 | 0.00 | 0.00 | 0.00 | 0.00 | 0.00 | 0.00 | 0.00 | 0.00 | 0.00 | 0.00 |
| 14 | 0.00 | 0.00 | 0.00 | 0.00 | 0.00 | 0.00 | 0.00 | 0.00 | 0.00 | 0.00 | 0.00 | 0.00 |
| 15 | 0.00 | 0.00 | 0.00 | 0.00 | 0.00 | 0.00 | 0.00 | 0.00 | 0.00 | 0.00 | 0.00 | 0.00 |
| 16 | 0.00 | 0.00 | 0.00 | 0.00 | 0.00 | 0.00 | 0.00 | 0.00 | 0.00 | 0.00 | 0.00 | 0.00 |
| 17 | 0.00 | 0.00 | 0.00 | 0.00 | 0.00 | 0.00 | 0.00 | 0.00 | 0.00 | 0.00 | 0.00 | 0.00 |
| 18 | 0.00 | 0.00 | 0.00 | 0.00 | 0.00 | 0.00 | 0.00 | 0.00 | 0.00 | 0.00 | 0.00 | 0.00 |
| 19 | 0.00 | 0.00 | 0.00 | 0.00 | 0.00 | 0.00 | 0.00 | 0.00 | 0.00 | 0.00 | 0.00 | 0.00 |
| 20 | 0.00 | 0.00 | 0.00 | 0.00 | 0.00 | 0.00 | 0.00 | 0.00 | 0.00 | 0.00 | 0.00 | 0.00 |
| 21 | 0.00 | 0.00 | 0.00 | 0.00 | 0.00 | 0.00 | 0.00 | 0.00 | 0.00 | 0.00 | 0.00 | 0.00 |
| 22 | 0.00 | 0.00 | 0.00 | 0.00 | 0.00 | 0.00 | 0.00 | 0.00 | 0.00 | 0.00 | 0.00 | 0.00 |
| 23 | 0.00 | 0.00 | 0.00 | 0.00 | 0.00 | 0.00 | 0.00 | 0.00 | 0.00 | 0.00 | 0.00 | 0.00 |
| 24 | 0.00 | 0.00 | 0.00 | 0.00 | 0.00 | 0.00 | 0.00 | 0.00 | 0.00 | 0.00 | 0.00 | 0.00 |

| Bins (kW) | Baseline Percent Time At or Above Demand | With Storage Percent Time At or Above Demand Level |
|---|---|---|
| 11240 | 100.00% | 98.54% |
| 11901 | 100.00% | 97.18% |
| 12563 | 100.00% | 95.13% |
| 13224 | 100.00% | 92.13% |
| 13885 | 100.00% | 88.95% |
| 14546 | 100.00% | 85.46% |
| 15207 | 100.00% | 82.42% |
| 15869 | 100.00% | 79.93% |
| 16530 | 100.00% | 77.59% |
| 17191 | 100.00% | 74.32% |
| 17852 | 100.00% | 70.39% |
| 18513 | 100.00% | 64.91% |
| 19175 | 100.00% | 61.34% |
| 19836 | 99.93% | 60.32% |
| 20497 | 99.39% | 59.11% |
| 21158 | 97.98% | 57.84% |
| 21819 | 94.77% | 56.38% |
| 22481 | 89.43% | 55.13% |
| 23142 | 80.90% | 53.90% |
| 23803 | 70.30% | 52.56% |
| 24464 | 59.97% | 51.11% |
| 25125 | 51.45% | 50.00% |
| 25787 | 44.52% | 48.78% |
| 26448 | 38.49% | 47.77% |
| 27109 | 33.66% | 46.84% |
| 27770 | 29.38% | 45.62% |
| 28431 | 25.50% | 44.20% |
| 29093 | 20.15% | 42.71% |
| 29754 | 13.24% | 41.55% |
| 30415 | 4.33% | 40.14% |
| 31076 | 0.64% | 38.96% |
| 31737 | 0.26% | 38.13% |
| 32399 | 0.13% | 37.39% |
| 33060 | 0.01% | 36.04% |

Projected CP Hours — Hour Ending

| Date | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1-Jan | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2-Jan | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3-Jan | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4-Jan | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5-Jan | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6-Jan | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| ... | | | | | | | | | | | | | | | | | | | | | | | | |
| 18-Sep | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 19-Sep | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 20-Sep | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 21-Sep | 0 | 0 | 0 | 0 | 0 | 0 | 0 | 0 | 0 | 0 | 0 | 0 | 0 | 1 | 1 | 1 | 1 | 1 | 0 | 0 | 0 | 0 | 0 | 0 |
| 22-Sep | 0 | 0 | 0 | 0 | 0 | 0 | 0 | 0 | 0 | 0 | 0 | 0 | 0 | 1 | 1 | 1 | 1 | 1 | 0 | 0 | 0 | 0 | 0 | 0 |
| 23-Sep | 0 | 0 | 0 | 0 | 0 | 0 | 0 | 0 | 0 | 0 | 0 | 0 | 0 | 1 | 1 | 1 | 1 | 1 | 0 | 0 | 0 | 0 | 0 | 0 |
| 24-Sep | 0 | 0 | 0 | 0 | 0 | 0 | 0 | 0 | 0 | 0 | 0 | 0 | 0 | 1 | 1 | 1 | 1 | 1 | 0 | 0 | 0 | 0 | 0 | 0 |
| 25-Sep | 0 | 0 | 0 | 0 | 0 | 0 | 0 | 0 | 0 | 0 | 0 | 0 | 0 | 1 | 1 | 1 | 1 | 1 | 0 | 0 | 0 | 0 | 0 | 0 |
| 26-Sep | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| ... | | | | | | | | | | | | | | | | | | | | | | | | |
| 29-Dec | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 30-Dec | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 31-Dec | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| Date | Electric Load (kW) | | | | | | | | | | |
|---|---|---|---|---|---|---|---|---|---|---|---|
| | Hour Ending | | | | | | | | | | |
| | 1 | 2 | 3 | 4 | 5 | ... | 20 | 21 | 22 | 23 | 24 |
| 1-Jan | 24110.68 | 23380.65 | 23432.89 | 22720.80 | 23408.46 | | 29348.84 | 27966.63 | 26761.06 | 25496.40 | 24798.07 |
| 2-Jan | 24134.51 | 23467.50 | 23200.85 | 22805.32 | 22131.13 | | 27369.25 | 26812.80 | 25440.14 | 24756.06 | 24406.87 |
| 3-Jan | 24102.27 | 23412.30 | 23456.37 | 23481.19 | 23463.80 | | 27297.36 | 26687.12 | 26099.97 | 25372.67 | 24788.24 |
| 4-Jan | 24202.14 | 23547.79 | 23471.15 | 23393.41 | 24149.58 | | 29314.11 | 28039.33 | 26779.43 | 25386.29 | 24814.23 |
| 5-Jan | 24848.57 | 24140.12 | 24050.44 | 23420.21 | 23428.08 | | 28062.27 | 27373.34 | 26096.78 | 25469.57 | 24747.68 |
| 6-Jan | 24180.18 | 23506.67 | 22834.70 | 22772.12 | 23428.61 | | 27991.58 | 27114.45 | 26148.74 | 25450.76 | 24862.04 |
| 7-Jan | 24172.42 | 23469.58 | 23477.21 | 23422.63 | 24092.89 | | 30003.78 | 28756.68 | 27370.41 | 26109.23 | 25486.04 |
| 8-Jan | 24835.31 | 24215.20 | 23499.13 | 23440.76 | 24116.48 | | 29424.53 | 28109.02 | 26771.34 | 26106.42 | 25423.19 |
| 9-Jan | 24245.88 | 23919.72 | 23424.32 | 22783.64 | 22248.31 | | 26166.52 | 25502.25 | 25108.05 | 24774.10 | 24467.03 |
| 10-Jan | 24165.56 | 23866.87 | 23439.26 | 23437.35 | 23409.08 | | 27400.30 | 26667.24 | 26770.11 | 26009.22 | 25473.16 |
| 11-Jan | 24830.57 | 24193.51 | 23505.92 | 23497.44 | 24172.85 | | 30092.52 | 28715.80 | 27359.71 | 26105.18 | 25409.39 |
| 12-Jan | 24763.53 | 24109.57 | 23603.23 | 23479.74 | 24095.08 | | 29379.39 | 28045.08 | 26788.29 | 26175.46 | 25347.82 |
| 13-Jan | 24800.45 | 24157.32 | 23440.65 | 23472.32 | 24150.75 | | 30039.48 | 28666.21 | 27281.15 | 26036.02 | 24810.46 |
| 14-Jan | 23520.24 | 22835.92 | 22213.07 | 22205.21 | 22802.58 | | 28072.47 | 27400.61 | 26713.76 | 26145.78 | 25445.65 |
| 15-Jan | 25415.84 | 24894.73 | 24096.97 | 23569.73 | 24079.14 | | 28673.12 | 27375.73 | 26203.46 | 25510.99 | 24728.46 |
| 16-Jan | 24145.89 | 24086.14 | 24080.43 | 23536.09 | 23439.76 | | 26748.18 | 26023.26 | 25524.89 | 24746.94 | 24857.21 |
| ... | | | | | | | | | | | |
| 29-Dec | 24134.69 | 23568.32 | 22738.46 | 22827.74 | 23438.15 | | 30048.49 | 28676.79 | 26756.92 | 25460.74 | 24726.05 |
| 30-Dec | 24082.41 | 23476.33 | 23422.72 | 22802.30 | 22845.81 | | 29386.92 | 28726.97 | 27428.34 | 26098.23 | 24873.79 |
| 31-Dec | 24169.97 | 23518.63 | 23495.08 | 22752.67 | 22763.48 | | 29361.20 | 28710.39 | 27431.58 | 26124.71 | 24883.38 |

FIG. 21

| Date | PV Generation (kW) Hour Ending | | | | | ... | | | | |
| --- | --- | --- | --- | --- | --- | --- | --- | --- | --- | --- |
| | 1 | 2 | 3 | 4 | 5 | ... | 20 | 21 | 22 | 23 | 24 |
| 1-Jan | 0.00 | 0.00 | 0.00 | 0.00 | 0.00 | | 309.32 | 104.95 | 0.00 | 0.00 | 0 |
| 2-Jan | 0.00 | 0.00 | 0.00 | 0.00 | 0.00 | | 304.87 | 91.70 | 0.00 | 0.00 | 0 |
| 3-Jan | 0.00 | 0.00 | 0.00 | 0.00 | 0.00 | | 299.20 | 104.03 | 0.00 | 0.00 | 0 |
| 4-Jan | 0.00 | 0.00 | 0.00 | 0.00 | 0.00 | | 291.90 | 111.07 | 0.00 | 0.00 | 0 |
| 5-Jan | 0.00 | 0.00 | 0.00 | 0.00 | 0.00 | | 281.26 | 98.43 | 0.00 | 0.00 | 0 |
| 6-Jan | 0.00 | 0.00 | 0.00 | 0.00 | 0.00 | | 302.17 | 107.03 | 0.00 | 0.00 | 0 |
| 7-Jan | 0.00 | 0.00 | 0.00 | 0.00 | 0.00 | | 315.97 | 111.95 | 0.00 | 0.00 | 0 |
| 8-Jan | 0.00 | 0.00 | 0.00 | 0.00 | 0.00 | | 294.64 | 94.73 | 0.00 | 0.00 | 0 |
| 9-Jan | 0.00 | 0.00 | 0.00 | 0.00 | 0.00 | | 308.80 | 89.36 | 0.00 | 0.00 | 0 |
| 10-Jan | 0.00 | 0.00 | 0.00 | 0.00 | 0.00 | | 315.73 | 99.23 | 0.00 | 0.00 | 0 |
| 11-Jan | 0.00 | 0.00 | 0.00 | 0.00 | 0.00 | | 296.32 | 90.77 | 0.00 | 0.00 | 0 |
| 12-Jan | 0.00 | 0.00 | 0.00 | 0.00 | 0.00 | | 294.27 | 119.87 | 0.00 | 0.00 | 0 |
| 13-Jan | 0.00 | 0.00 | 0.00 | 0.00 | 0.00 | | 294.70 | 98.39 | 0.00 | 0.00 | 0 |
| 14-Jan | 0.00 | 0.00 | 0.00 | 0.00 | 0.00 | | 278.41 | 105.97 | 0.00 | 0.00 | 0 |
| 15-Jan | 0.00 | 0.00 | 0.00 | 0.00 | 0.00 | | 311.54 | 94.12 | 0.00 | 0.00 | 0 |
| 16-Jan | 0.00 | 0.00 | 0.00 | 0.00 | 0.00 | | 303.12 | 82.70 | 0.00 | 0.00 | 0 |
| ... | | | | | | | | | | | |
| 29-Dec | 0.00 | 0.00 | 0.00 | 0.00 | 0.00 | | 304.40 | 95.28 | 0.00 | 0.00 | 0 |
| 30-Dec | 0.00 | 0.00 | 0.00 | 0.00 | 0.00 | | 301.52 | 86.05 | 0.00 | 0.00 | 0 |
| 31-Dec | 0.00 | 0.00 | 0.00 | 0.00 | 0.00 | | 314.64 | 113.55 | 0.00 | 0.00 | 0 |

| Date | Electric Rate ($ per kW) | | | | | | | | | | |
|---|---|---|---|---|---|---|---|---|---|---|---|
| | Hour Ending | | | | | | | | | | |
| | 1 | 2 | 3 | 4 | 5 | ... | 20 | 21 | 22 | 23 | 24 |
| 1-Jan | 0.0808 | 0.0808 | 0.0808 | 0.0808 | 0.0808 | | 0.0941 | 0.0941 | 0.0941 | 0.0808 | 0.0808 |
| 2-Jan | 0.0808 | 0.0808 | 0.0808 | 0.0808 | 0.0808 | | 0.0808 | 0.0808 | 0.0808 | 0.0808 | 0.0808 |
| 3-Jan | 0.0808 | 0.0808 | 0.0808 | 0.0808 | 0.0808 | | 0.0808 | 0.0808 | 0.0808 | 0.0808 | 0.0808 |
| 4-Jan | 0.0808 | 0.0808 | 0.0808 | 0.0808 | 0.0808 | | 0.0941 | 0.0941 | 0.0941 | 0.0808 | 0.0808 |
| 5-Jan | 0.0808 | 0.0808 | 0.0808 | 0.0808 | 0.0808 | | 0.0941 | 0.0941 | 0.0941 | 0.0808 | 0.0808 |
| 6-Jan | 0.0808 | 0.0808 | 0.0808 | 0.0808 | 0.0808 | | 0.0941 | 0.0941 | 0.0941 | 0.0808 | 0.0808 |
| 7-Jan | 0.0808 | 0.0808 | 0.0808 | 0.0808 | 0.0808 | | 0.0941 | 0.0941 | 0.0941 | 0.0808 | 0.0808 |
| 8-Jan | 0.0808 | 0.0808 | 0.0808 | 0.0808 | 0.0808 | | 0.0808 | 0.0808 | 0.0808 | 0.0808 | 0.0808 |
| 9-Jan | 0.0808 | 0.0808 | 0.0808 | 0.0808 | 0.0808 | | 0.0941 | 0.0941 | 0.0941 | 0.0808 | 0.0808 |
| 10-Jan | 0.0808 | 0.0808 | 0.0808 | 0.0808 | 0.0808 | | 0.0941 | 0.0941 | 0.0941 | 0.0808 | 0.0808 |
| 11-Jan | 0.0808 | 0.0808 | 0.0808 | 0.0808 | 0.0808 | | 0.0941 | 0.0941 | 0.0941 | 0.0808 | 0.0808 |
| 12-Jan | 0.0808 | 0.0808 | 0.0808 | 0.0808 | 0.0808 | | 0.0941 | 0.0941 | 0.0941 | 0.0808 | 0.0808 |
| 13-Jan | 0.0808 | 0.0808 | 0.0808 | 0.0808 | 0.0808 | | 0.0941 | 0.0941 | 0.0941 | 0.0808 | 0.0808 |
| 14-Jan | 0.0808 | 0.0808 | 0.0808 | 0.0808 | 0.0808 | | 0.0808 | 0.0808 | 0.0808 | 0.0808 | 0.0808 |
| 15-Jan | 0.0808 | 0.0808 | 0.0808 | 0.0808 | 0.0808 | | 0.0941 | 0.0941 | 0.0941 | 0.0808 | 0.0808 |
| 16-Jan | 0.0808 | 0.0808 | 0.0808 | 0.0808 | 0.0808 | | 0.0808 | 0.0808 | 0.0808 | 0.0808 | 0.0808 |
| ... | | | | | | | | | | | |
| 29-Dec | 0.0808 | 0.0808 | 0.0808 | 0.0808 | 0.0808 | | 0.0941 | 0.0941 | 0.0941 | 0.0808 | 0.0808 |
| 30-Dec | 0.0808 | 0.0808 | 0.0808 | 0.0808 | 0.0808 | | 0.0941 | 0.0941 | 0.0941 | 0.0808 | 0.0808 |
| 31-Dec | 0.0808 | 0.0808 | 0.0808 | 0.0808 | 0.0808 | | 0.0941 | 0.0941 | 0.0941 | 0.0808 | 0.0808 |

| Date | Day Ahead LMP ($ per kW) | | | | | | | | | | |
|---|---|---|---|---|---|---|---|---|---|---|---|
| | Hour Ending | | | | | | | | | | |
| | 1 | 2 | 3 | 4 | 5 | ... | 20 | 21 | 22 | 23 | 24 |
| 1-Jan | 0.0272 | 0.0265 | 0.0262 | 0.0262 | 0.0264 | | 0.0304 | 0.0302 | 0.0286 | 0.0270 | 0.0260 |
| 2-Jan | 0.0245 | 0.0239 | 0.0233 | 0.0232 | 0.0245 | | 0.0294 | 0.0296 | 0.0283 | 0.0271 | 0.0262 |
| 3-Jan | 0.0266 | 0.0258 | 0.0253 | 0.0252 | 0.0254 | | 0.0292 | 0.0281 | 0.0270 | 0.0249 | 0.0220 |
| 4-Jan | 0.0225 | 0.0183 | 0.0139 | 0.0134 | 0.0127 | | 0.0275 | 0.0273 | 0.0263 | 0.0249 | 0.0228 |
| 5-Jan | 0.0218 | 0.0217 | 0.0215 | 0.0223 | 0.0232 | | 0.0414 | 0.0396 | 0.0348 | 0.0296 | 0.0276 |
| 6-Jan | 0.0291 | 0.0291 | 0.0289 | 0.0290 | 0.0292 | | 0.0367 | 0.0356 | 0.0317 | 0.0303 | 0.0291 |
| 7-Jan | 0.0296 | 0.0291 | 0.0294 | 0.0291 | 0.0295 | | 0.0845 | 0.0685 | 0.0586 | 0.0440 | 0.0369 |
| 8-Jan | 0.0350 | 0.0340 | 0.0346 | 0.0357 | 0.0387 | | 0.0554 | 0.0481 | 0.0442 | 0.0342 | 0.0313 |
| 9-Jan | 0.0315 | 0.0309 | 0.0306 | 0.0305 | 0.0311 | | 0.0633 | 0.0616 | 0.0487 | 0.0442 | 0.0355 |
| 10-Jan | 0.0359 | 0.0343 | 0.0339 | 0.0339 | 0.0344 | | 0.0485 | 0.0464 | 0.0416 | 0.0398 | 0.0329 |
| 11-Jan | 0.0310 | 0.0309 | 0.0305 | 0.0300 | 0.0295 | | 0.0320 | 0.0314 | 0.0300 | 0.0292 | 0.0278 |
| 12-Jan | 0.0293 | 0.0289 | 0.0288 | 0.0284 | 0.0291 | | 0.0432 | 0.0403 | 0.0362 | 0.0328 | 0.0301 |
| 13-Jan | 0.0293 | 0.0287 | 0.0288 | 0.0287 | 0.0293 | | 0.0544 | 0.0467 | 0.0432 | 0.0391 | 0.0351 |
| 14-Jan | 0.0357 | 0.0335 | 0.0332 | 0.0330 | 0.0340 | | 0.0513 | 0.0461 | 0.0424 | 0.0364 | 0.0350 |
| 15-Jan | 0.0345 | 0.0332 | 0.0330 | 0.0328 | 0.0340 | | 0.0479 | 0.0446 | 0.0392 | 0.0336 | 0.0296 |
| 16-Jan | 0.0289 | 0.0283 | 0.0283 | 0.0284 | 0.0288 | | 0.0413 | 0.0413 | 0.0383 | 0.0323 | 0.0302 |
| ... | | | | | | | | | | | |
| 29-Dec | 0.0176 | 0.0156 | 0.0126 | 0.0125 | 0.0149 | | 0.0303 | 0.0285 | 0.0264 | 0.0219 | 0.0200 |
| 30-Dec | 0.0205 | 0.0200 | 0.0193 | 0.0195 | 0.0200 | | 0.0311 | 0.0302 | 0.0261 | 0.0223 | 0.0205 |
| 31-Dec | 0.0204 | 0.0185 | 0.0176 | 0.0177 | 0.0184 | | 0.0293 | 0.0281 | 0.0264 | 0.0229 | 0.0219 |

FIG. 24

| Date | Real Time LMP ($ per kW) | | | | | | | | | | |
|---|---|---|---|---|---|---|---|---|---|---|---|
| | Hour Ending | | | | | | | | | | |
| | 1 | 2 | 3 | 4 | 5 | ... | 20 | 21 | 22 | 23 | 24 |
| 1-Jan | 0.0278 | 0.0280 | 0.0274 | 0.0271 | 0.0263 | | 0.0269 | 0.0270 | 0.0251 | 0.0236 | 0.0237 |
| 2-Jan | 0.0226 | 0.0236 | 0.0227 | 0.0227 | 0.0246 | | 0.0271 | 0.0277 | 0.0274 | 0.0264 | 0.0245 |
| 3-Jan | 0.0267 | 0.0261 | 0.0245 | 0.0245 | 0.0250 | | 0.0290 | 0.0263 | 0.0257 | 0.0236 | 0.0194 |
| 4-Jan | 0.0187 | 0.0186 | 0.0136 | 0.0165 | 0.0153 | | 0.0261 | 0.0263 | 0.0231 | 0.0205 | 0.0172 |
| 5-Jan | 0.0070 | 0.0122 | 0.0173 | 0.0191 | 0.0233 | | 0.0370 | 0.0371 | 0.0319 | 0.0287 | 0.0277 |
| 6-Jan | 0.0301 | 0.0306 | 0.0298 | 0.0302 | 0.0303 | | 0.0311 | 0.0338 | 0.0316 | 0.0294 | 0.0286 |
| 7-Jan | 0.0258 | 0.0271 | 0.0259 | 0.0273 | 0.0289 | | 0.0885 | 0.0730 | 0.0977 | 0.0628 | 0.0347 |
| 8-Jan | 0.0359 | 0.0429 | 0.0405 | 0.0451 | 0.0752 | | 0.0530 | 0.0632 | 0.0460 | 0.0316 | 0.0323 |
| 9-Jan | 0.0283 | 0.0298 | 0.0284 | 0.0273 | 0.0270 | | 0.0433 | 0.0410 | 0.0366 | 0.0339 | 0.0309 |
| 10-Jan | 0.0319 | 0.0321 | 0.0311 | 0.0314 | 0.0315 | | 0.0402 | 0.0334 | 0.0317 | 0.0314 | 0.0301 |
| 11-Jan | 0.0283 | 0.0282 | 0.0279 | 0.0284 | 0.0276 | | 0.0304 | 0.0296 | 0.0279 | 0.0271 | 0.0259 |
| 12-Jan | 0.0297 | 0.0286 | 0.0266 | 0.0271 | 0.0281 | | 0.0365 | 0.0373 | 0.0302 | 0.0269 | 0.0268 |
| 13-Jan | 0.0268 | 0.0257 | 0.0284 | 0.0279 | 0.0302 | | 0.0506 | 0.0507 | 0.0602 | 0.0409 | 0.0367 |
| 14-Jan | 0.0366 | 0.0332 | 0.0305 | 0.0337 | 0.0338 | | 0.0619 | 0.0547 | 0.0657 | 0.0322 | 0.0330 |
| 15-Jan | 0.0328 | 0.0307 | 0.0306 | 0.0304 | 0.0311 | | 0.0347 | 0.0339 | 0.0279 | 0.0262 | 0.0265 |
| 16-Jan | 0.0283 | 0.0274 | 0.0283 | 0.0283 | 0.0289 | | 0.0319 | 0.0311 | 0.0287 | 0.0289 | 0.0278 |
| ... | | | | | | | ... | | | | |
| 29-Dec | 0.0188 | 0.0149 | 0.0146 | 0.0134 | 0.0164 | | 0.0259 | 0.0248 | 0.0232 | 0.0204 | 0.0219 |
| 30-Dec | 0.0221 | 0.0198 | 0.0189 | 0.0182 | 0.0197 | | 0.0250 | 0.0241 | 0.0219 | 0.0210 | 0.0203 |
| 31-Dec | 0.0186 | 0.0158 | 0.0144 | 0.0120 | 0.0123 | | 0.0204 | 0.0205 | 0.0184 | 0.0179 | 0.0168 |

FIG. 25

FR Incentive ($ per kW)

| Date | Hour Ending | | | | | ... | | | | | |
|---|---|---|---|---|---|---|---|---|---|---|---|
| | 1 | 2 | 3 | 4 | 5 | ... | 20 | 21 | 22 | 23 | 24 |
| 1-Jan | 0.0098 | 0.0079 | 0.0039 | 0.0036 | 0.0033 | | 0.0050 | 0.0119 | 0.0081 | 0.0089 | 0.0067 |
| 2-Jan | 0.0054 | 0.0088 | 0.0063 | 0.0060 | 0.0078 | | 0.0006 | 0.0086 | 0.0144 | 0.0221 | 0.0269 |
| 3-Jan | 0.0033 | 0.0015 | 0.0010 | 0.0021 | 0.0026 | | 0.0134 | 0.0123 | 0.0192 | 0.0202 | 0.0229 |
| 4-Jan | 0.0102 | 0.0122 | 0.0183 | 0.0043 | 0.0166 | | 0.0052 | 0.0255 | 0.0264 | 0.0279 | 0.0241 |
| 5-Jan | 0.0331 | 0.0145 | 0.0079 | 0.0035 | 0.0088 | | 0.0089 | 0.0122 | 0.0216 | 0.0238 | 0.0178 |
| 6-Jan | 0.0123 | 0.0151 | 0.0163 | 0.0204 | 0.0211 | | 0.0679 | 0.0170 | 0.0561 | 0.0276 | 0.0274 |
| 7-Jan | 0.0218 | 0.0928 | 0.0192 | 0.0208 | 0.1522 | | 0.1432 | 0.0680 | 0.2337 | 0.1468 | 0.1207 |
| 8-Jan | 0.0394 | 0.0592 | 0.0489 | 0.0788 | 0.1217 | | 0.0174 | 0.0306 | 0.0593 | 0.0946 | 0.1328 |
| 9-Jan | 0.0361 | 0.1499 | 0.0091 | 0.0128 | 0.0097 | | 0.0272 | 0.0484 | 0.0382 | 0.0219 | 0.0222 |
| 10-Jan | 0.0147 | 0.0189 | 0.0005 | 0.0004 | 0.0001 | | 0.0229 | 0.0281 | 0.0183 | 0.0211 | 0.0185 |
| 11-Jan | 0.0338 | 0.0281 | 0.0260 | 0.0585 | 0.0149 | | 0.0019 | 0.0055 | 0.0225 | 0.0212 | 0.0202 |
| 12-Jan | 0.0237 | 0.0185 | 0.0324 | 0.0314 | 0.0197 | | 0.0073 | 0.0352 | 0.0235 | 0.0368 | 0.0385 |
| 13-Jan | 0.0107 | 0.0211 | 0.0313 | 0.0163 | 0.0133 | | 0.0092 | 0.0085 | 0.0289 | 0.0287 | 0.0371 |
| 14-Jan | 0.0230 | 0.0193 | 0.0159 | 0.0195 | 0.0219 | | 0.0174 | 0.0093 | 0.1221 | 0.0256 | 0.0144 |
| 15-Jan | 0.0151 | 0.0172 | 0.0191 | 0.0098 | 0.0145 | | 0.0108 | 0.0230 | 0.0237 | 0.0108 | 0.0121 |
| 16-Jan | 0.0165 | 0.0183 | 0.0195 | 0.0142 | 0.0305 | | 0.0049 | 0.0194 | 0.0153 | 0.0222 | 0.0137 |
| ... | | | | | | | ... | | | | |
| 29-Dec | 0.0099 | 0.0103 | 0.0065 | 0.0100 | 0.0072 | | 0.0058 | 0.0039 | 0.0176 | 0.0187 | 0.0108 |
| 30-Dec | 0.0062 | 0.0059 | 0.0058 | 0.0040 | 0.0097 | | 0.0025 | 0.0029 | 0.0105 | 0.0110 | 0.0100 |
| 31-Dec | 0.0108 | 0.0056 | 0.0082 | 0.0081 | 0.0090 | | 0.0007 | 0.0031 | 0.0068 | 0.0068 | 0.0095 |

FIG. 26

Effective Electric Load (kW)

| Date | 1 | 2 | 3 | 4 | 5 | ... | 20 | 21 | 22 | 23 | 24 |
|---|---|---|---|---|---|---|---|---|---|---|---|
| 1-Jan | 24110.68 | 23380.65 | 23432.89 | 22720.8 | 23408.46 | | 29039.51 | 27861.68 | 26761.06 | 25496.4 | 24798.07 |
| 2-Jan | 24134.51 | 23467.5 | 23200.85 | 22805.32 | 22131.13 | | 27064.39 | 26721.1 | 25440.14 | 24756.06 | 24406.87 |
| 3-Jan | 24102.27 | 23412.3 | 23456.37 | 23481.19 | 23463.8 | | 26998.16 | 26583.09 | 26099.97 | 25372.67 | 24788.24 |
| 4-Jan | 24202.14 | 23547.79 | 23471.15 | 23393.41 | 24149.58 | | 29022.21 | 27928.26 | 26779.43 | 25386.29 | 24814.23 |
| 5-Jan | 24848.57 | 24140.12 | 24050.44 | 23420.21 | 23428.08 | | 27781.02 | 27274.91 | 26096.78 | 25469.57 | 24747.68 |
| 6-Jan | 24180.18 | 23506.67 | 22834.7 | 22772.12 | 23428.61 | | 27689.41 | 27007.42 | 26148.74 | 25450.76 | 24862.04 |
| 7-Jan | 24172.42 | 23469.58 | 23477.21 | 23422.63 | 24092.89 | | 29687.81 | 28644.73 | 27370.41 | 26109.23 | 25486.04 |
| 8-Jan | 24835.31 | 24215.2 | 23499.13 | 23440.76 | 24116.48 | | 29129.9 | 28014.29 | 26771.34 | 26106.42 | 25423.19 |
| 9-Jan | 24245.88 | 23919.72 | 23424.32 | 22783.64 | 22248.31 | | 25857.72 | 25412.89 | 25108.05 | 24774.1 | 24467.03 |
| 10-Jan | 24165.56 | 23866.87 | 23439.26 | 23437.35 | 23409.08 | | 27084.57 | 26568.01 | 26770.11 | 26009.22 | 25473.16 |
| 11-Jan | 24830.57 | 24193.51 | 23505.92 | 23497.44 | 24172.85 | | 29796.2 | 28625.03 | 27359.71 | 26105.18 | 25409.39 |
| 12-Jan | 24763.53 | 24109.57 | 23603.23 | 23479.74 | 24095.08 | | 29085.12 | 27925.21 | 26788.29 | 26175.46 | 25347.82 |
| 13-Jan | 24800.45 | 24157.32 | 23440.65 | 23472.32 | 24150.75 | | 29744.78 | 28567.81 | 27281.15 | 26036.02 | 24810.46 |
| 14-Jan | 23520.24 | 22835.92 | 22213.07 | 22205.21 | 22802.58 | | 27794.06 | 27294.63 | 26713.76 | 26145.78 | 25445.65 |
| 15-Jan | 25415.84 | 24894.73 | 24096.97 | 23569.73 | 24079.14 | | 28361.58 | 27281.61 | 26203.46 | 25510.99 | 24728.46 |
| 16-Jan | 24145.89 | 24086.14 | 24080.43 | 23536.09 | 23439.76 | | 26445.06 | 25940.56 | 25524.89 | 24746.94 | 24857.21 |
| ... | | | | | | | | | | | |
| 29-Dec | 24134.69 | 23568.32 | 22738.46 | 22827.74 | 23438.15 | | 29744.09 | 28581.51 | 26756.92 | 25460.74 | 24726.05 |
| 30-Dec | 24082.41 | 23476.33 | 23422.72 | 22802.3 | 22845.81 | | 29085.4 | 28640.93 | 27428.34 | 26098.23 | 24873.79 |
| 31-Dec | 24169.97 | 23518.63 | 23495.08 | 22752.67 | 22763.48 | | 29046.56 | 28596.84 | 27431.58 | 26124.71 | 24883.38 |

FIG. 27

FR Participation

| Date | Hour Ending | | | | | | ... | | | | | |
|---|---|---|---|---|---|---|---|---|---|---|---|---|
| | 1 | 2 | 3 | 4 | 5 | ... | 20 | 21 | 22 | 23 | 24 |
| 1-Jan | 0.00 | 0.00 | 0.00 | 0.00 | 0.00 | | 0.00 | 0.00 | 0.00 | 0.00 | 0.00 |
| 2-Jan | 0.00 | 0.00 | 0.00 | 0.00 | 0.00 | | 0.00 | 0.00 | 0.00 | 0.00 | 0.00 |
| 3-Jan | 0.00 | 0.00 | 0.00 | 0.00 | 0.00 | | 0.00 | 0.00 | 0.00 | 0.00 | 0.00 |
| 4-Jan | 0.00 | 0.00 | 0.00 | 0.00 | 0.00 | | 0.00 | 0.00 | 0.00 | 0.00 | 0.00 |
| 5-Jan | 0.00 | 0.00 | 0.00 | 0.00 | 0.00 | | 0.00 | 0.00 | 0.00 | 0.00 | 0.00 |
| 6-Jan | 0.00 | 0.00 | 0.00 | 0.00 | 0.00 | | 0.00 | 0.00 | 0.00 | 0.00 | 0.00 |
| 7-Jan | 0.00 | 0.00 | 0.00 | 0.00 | 0.00 | | 0.00 | 0.00 | 0.00 | 0.00 | 0.00 |
| 8-Jan | 0.00 | 0.00 | 0.00 | 0.00 | 0.00 | | 0.00 | 0.00 | 0.00 | 0.00 | 0.00 |
| 9-Jan | 0.00 | 0.00 | 0.00 | 0.00 | 0.00 | | 0.00 | 0.00 | 0.00 | 0.00 | 0.00 |
| 10-Jan | 0.00 | 0.00 | 0.00 | 0.00 | 0.00 | | 0.00 | 0.00 | 0.00 | 0.00 | 0.00 |
| 11-Jan | 0.00 | 0.00 | 0.00 | 0.00 | 0.00 | | 0.00 | 0.00 | 0.00 | 0.00 | 0.00 |
| 12-Jan | 0.00 | 0.00 | 0.00 | 0.00 | 0.00 | | 0.00 | 0.00 | 0.00 | 0.00 | 0.00 |
| 13-Jan | 0.00 | 0.00 | 0.00 | 0.00 | 0.00 | | 0.00 | 0.00 | 0.00 | 0.00 | 0.00 |
| 14-Jan | 0.00 | 0.00 | 0.00 | 0.00 | 0.00 | | 0.00 | 0.00 | 0.00 | 0.00 | 0.00 |
| 15-Jan | 0.00 | 0.00 | 0.00 | 0.00 | 0.00 | | 0.00 | 0.00 | 0.00 | 0.00 | 0.00 |
| 16-Jan | 0.00 | 0.00 | 0.00 | 0.00 | 0.00 | | 0.00 | 0.00 | 0.00 | 0.00 | 0.00 |
| ... | | | | | | | | | | | |
| 29-Dec | 0.00 | 0.00 | 0.00 | 0.00 | 0.00 | | 0.00 | 0.00 | 0.00 | 0.00 | 0.00 |
| 30-Dec | 0.00 | 0.00 | 0.00 | 0.00 | 0.00 | | 0.00 | 0.00 | 0.00 | 0.00 | 0.00 |
| 31-Dec | 0.00 | 0.00 | 0.00 | 0.00 | 0.00 | | 0.00 | 0.00 | 0.00 | 0.00 | 0.00 |

FIG. 29

BUILDING ENERGY STORAGE SYSTEM WITH PLANNING TOOL

CROSS-REFERENCE TO RELATED PATENT APPLICATION

This application claims the benefit of and priority to U.S. Provisional Patent Application No. 62/467,426 filed Mar. 6, 2017, the entire disclosure of which is incorporated by reference herein.

BACKGROUND

The present disclosure relates generally to a building energy storage system configured to store and discharge energy resources (e.g., electricity, thermal energy, etc.) for use in serving building energy loads. The present disclosure relates more particularly to building energy storage system with a planning tool configured to optimize the cost of operating the building energy storage system.

An energy storage system can be used to store various types of energy resources in order to shift the demand for the energy resources in time. For example, an energy storage system can include thermal energy storage tanks configured to store cold or hot water, which can be used to offset the demand for cold or hot water of a campus or facility. Some energy storage systems include a battery asset configured to store electrical energy, which can be used to shift the demand for electricity. Energy storage systems find application also in peak load shaving or peak load shifting. The energy storage assets can be charged during the hours when utility rates are low and discharged during the hours when utility rates are high. The objective of these applications is to reduce the customers' utility cost.

Energy storage systems, particularly electrical energy storage systems, may be used to participate in Regional Transmission Organization (RTO) sponsored incentive-based demand response (IBDR) programs, where the customers can generate revenue in addition to minimizing their utility cost. Examples of IBDR programs include frequency regulation and economic load demand response. However, it can be difficult to efficiently control and allocate energy storage assets to optimize IBDR program participation. Additionally, a customer interested in investing in a battery system may wish to estimate the benefits (e.g., savings and revenue) a battery system will yield. It can be difficult to estimate the benefits of investing in a battery asset.

SUMMARY

One implementation of the present disclosure is an energy storage system for a building. The system includes a battery asset configured to store electricity and discharge the stored electricity for use in satisfying a building electric load. The system further includes a planning tool configured to identify the building electric load to be satisfied at each of a plurality of time steps during an optimization period and one or more selected functionalities of the energy storage system. The planning tool is configured to generate a cost function defining a cost of operating the energy storage system over the optimization period as a function of one or more battery power setpoints for the battery asset. The cost function includes a term for each of the selected functionalities. The planning tool is configured to generate one or more optimization constraints based on the selected functionalities, attributes of the battery asset, and the building electric load to be satisfied at each of the plurality of time steps. The planning tool is configured to optimize the cost function subject to the optimization constraints to determine optimal values of the battery power setpoints for each of the plurality of time steps.

In some embodiments, optimizing the cost function includes optimizing the cost function to determine optimal values of the battery power setpoints for each of the plurality of time steps in the optimization period, the optimization period comprising a portion of a planning period, shifting the optimization period forward in time by a block size comprising a predetermined number of time steps, iteratively repeating the optimizing and shifting steps until the cost function has been optimized for each time step that occurs during the planning period, and predicting the cost of operating the energy storage system over the planning period based on the optimal values of the battery power setpoints for each time step that occurs during the planning period.

In some embodiments, the planning tool is configured to obtain historical data for one or more parameters specific to the selected functionalities. The historical data may define values of the one or more parameters for each time step of the optimization period. The planning tool can use the historical data as inputs to the cost function.

In some embodiments, the selected functionalities include accounting for revenue generated by using the battery asset to participate in one or more incentive programs during the optimization period. The incentive programs may include at least one of frequency regulation (FR) and economic load demand response (ELDR). The cost function may include at least one of a term accounting for FR revenue and a term accounting for ELDR revenue.

In some embodiments, the selected functionalities include determining an optimal size for the battery asset. The cost function may account for both an initial purchase cost of the battery asset and an effect of the battery asset on the cost of operating the energy storage system. Both the initial purchase cost of the battery asset and the effect of the battery asset on the cost of operating the energy storage system may be functions of one or more battery size variables included in the cost function. The planning tool may be configured to optimize the cost function to determine optimal values for the battery power setpoints and the battery size variables.

In some embodiments, the battery size variables include at least one of a capacity size variable indicating a maximum capacity of the battery asset and a loading size variable indicating a maximum loading of the battery asset. In some embodiments, optimizing the cost function includes optimizing a financial metric comprising at least one of net present value, internal rate of return, and simple payback period. In some embodiments, the planning tool is configured to update the attributes of the battery asset based on the optimal values of the battery size variables. In some embodiments, the planning tool is configured to scale one or more battery size cost terms in the cost function to a duration of the optimization period.

In some embodiments, the selected functionalities include accounting for multiple demand charges. Each of the demand charges may correspond to a demand charge period and may define a cost based on a maximum amount of electricity purchased from an electric utility during any time step within the corresponding demand charge period. The planning tool may be configured to apply a demand charge mask to each of the multiple demand charges. The demand charge masks may cause the planning tool to disregard the electricity purchased from the electricity utility during any time steps that occur outside the corresponding demand charge period when calculating a value for the demand charge. In some embodiments, the planning tool is configured to apply a weighting factor to each of the multiple demand charges in the cost function. Each weighting factor may scale the corresponding demand charge to a duration of the optimization period.

In some embodiments, the selected functionalities include accounting for a peak load contribution (PLC) charge. The cost function may include a PLC term representing a cost based on an amount of electricity purchased from an electric utility during coincidental peak (CP) hours of the optimization period. The planning tool may be configured to apply a peak hours mask to the PLC term. The peak hours mask may identify one or more hours in the optimization period as projected peak hours and may cause the planning tool to disregard the electricity purchased from the electric utility during any hours not identified as projected peak hours when calculating a value for the PLC term.

Another implementation of the present disclosure is a method for optimizing cost in an energy storage system for a building. The method includes identifying, by a planning tool, a building electric load to be satisfied at each of a plurality of time steps during an optimization period and one or more selected functionalities of the planning tool. The method includes generating a cost function defining a cost of operating the energy storage system over the optimization period as a function of one or more battery power setpoints for a battery asset of the energy storage system. The cost function may include a term for each of the selected functionalities. The method includes generating one or more optimization constraints based on the selected functionalities, attributes of the battery asset, and the building electric load to be satisfied at each of the plurality of time steps. The method includes optimizing the cost function subject to the optimization constraints to determine optimal values of the battery power setpoints for each of the plurality of time steps.

In some embodiments, optimizing the cost function includes optimizing the cost function to determine optimal values of the battery power setpoints for each of the plurality of time steps in the optimization period, the optimization period comprising a portion of a planning period, shifting the optimization period forward in time by a block size comprising predetermined number of time steps, iteratively repeating the optimizing and shifting steps until the cost function has been optimized for each time step that occurs during the planning period, and predicting the cost of operating the energy storage system over the planning period based on the optimal values of the battery power setpoints for each time step that occurs during the planning period.

In some embodiments, the method includes obtaining historical data for one or more parameters specific to the selected functionalities. The historical data may define values of the one or more parameters for each time step of the optimization period. The method may include using the historical data as inputs to the cost function.

In some embodiments, the selected functionalities include accounting for revenue generated by using the battery asset to participate in one or more incentive programs during the optimization period. The incentive programs may include at least one of frequency regulation (FR) and economic load demand response (ELDR). The cost function may include at least one of a term accounting for FR revenue and a term accounting for ELDR revenue.

In some embodiments, the selected functionalities include determining an optimal size for the battery asset. The cost function may account for both an initial purchase cost of the battery asset and an effect of the battery asset on the cost of operating the energy storage system. Both the initial purchase cost of the battery asset and the effect of the battery asset on the cost of operating the energy storage system may be functions of one or more battery size variables included in the cost function. Optimizing the cost function may include determining optimal values for the battery power setpoints and the battery size variables.

In some embodiments, the battery size variables include at least one of a capacity size variable indicating a maximum capacity of the battery asset and a loading size variable indicating a maximum loading of the battery asset. In some embodiments, optimizing the cost function includes optimizing a financial metric comprising at least one of net present value, internal rate of return, and simple payback period. In some embodiments, the method includes updating the attributes of the battery asset based on the optimal values of the battery size variables. In some embodiments, the method includes scaling one or more battery size cost terms in the cost function to a duration of the optimization period.

In some embodiments, the selected functionalities include accounting for multiple demand charges. Each of the demand charges may correspond to a demand charge period and may define a cost based on a maximum amount of electricity purchased from an electric utility during any time step within the corresponding demand charge period. The method may further include applying a demand charge mask to each of the multiple demand charges. The demand charge masks may cause the electricity purchased from the electric utility during any time steps that occur outside the corresponding demand charge period to be disregarded when calculating a value for the demand charge. In some embodiments, the method includes applying a weighting factor to each of the multiple demand charges in the cost function. Each weighting factor may scale the corresponding demand charge to a duration of the optimization period.

In some embodiments, the selected functionalities include accounting for a peak load contribution (PLC) charge. The cost function may include a PLC term representing a cost based on an amount of electricity purchased from an electric utility during coincidental peak (CP) hours of the optimization period. The method may include applying a peak hours mask to the PLC term. The peak hours mask may identify one or more hours in the optimization period as projected peak hours and may cause the electricity purchased from the electric utility during any hours not identified as projected peak hours to be disregarded when calculating a value for the PLC term.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIGS. 16A-16E are drawings of an input setup interface which can be generated by the planning tool of FIG. 7, according to an exemplary embodiment.

FIG. 17 is a drawing of a rate selection interface which can be generated by the planning tool of FIG. 7, according to an exemplary embodiment.

FIGS. 18A-18D are drawings of a pro forma interface which can be generated by the planning tool of FIG. 7, according to an exemplary embodiment.

FIGS. 19A-19G are drawings of a performance graphs interface which can be generated by the planning tool of FIG. 7, according to an exemplary embodiment.

FIG. 20 is a drawing of a projected CP hours interface which can be generated by the planning tool of FIG. 7, according to an exemplary embodiment.

FIG. 21 is a drawing of an electric load interface which can be generated by the planning tool of FIG. 7, according to an exemplary embodiment.

FIG. 22 is a drawing of a photovoltaic (PV) generation interface which can be generated by the planning tool of FIG. 7, according to an exemplary embodiment.

FIG. 23 is a drawing of an electric rate interface which can be generated by the planning tool of FIG. 7, according to an exemplary embodiment.

FIG. 24 is a drawing of a day ahead locational marginal price (LMP) interface which can be generated by the planning tool of FIG. 7, according to an exemplary embodiment.

FIG. 25 is a drawing of a real time LMP interface which can be generated by the planning tool of FIG. 7, according to an exemplary embodiment.

FIG. 26 is a drawing of a FR incentive interface which can be generated by the planning tool of FIG. 7, according to an exemplary embodiment.

FIG. 27 is a drawing of an effective electric load interface which can be generated by the planning tool of FIG. 7, according to an exemplary embodiment.

FIG. 29 is a drawing of a FR participation interface which can be generated by the planning tool of FIG. 7, according to an exemplary embodiment.

DETAILED DESCRIPTION

Overview

Figure 1:
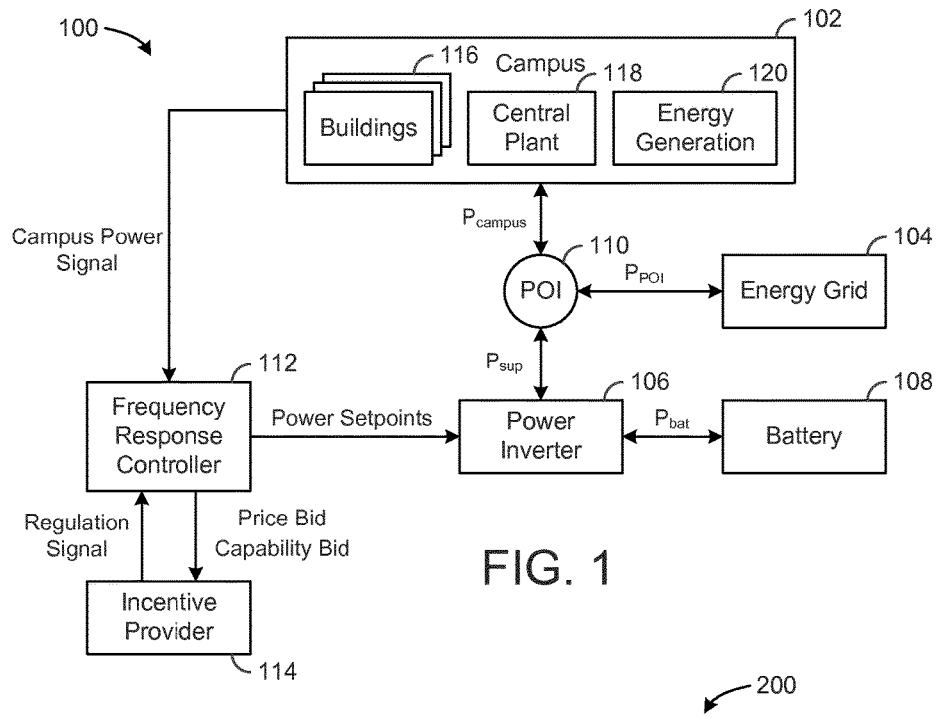
FIG. 1 is a block diagram of a frequency response optimization system, according to an exemplary embodiment.

Referring generally to the FIGURES, an energy storage system with an energy storage planning tool is shown, according to an exemplary embodiment. The energy storage planning tool can be configured to determine the optimal allocation of a battery asset and/or other assets of the energy storage system (e.g., chillers, heaters, etc.) for the purpose of minimizing utility cost and/or maximizing revenue from incentive-based demand response (IBDR) programs. In some embodiments, the energy storage planning tool includes a high level optimizer which determines the optimal allocation of assets for each time step in an optimization period (e.g., each hour in a year) while taking into account price-based and/or incentive-based demand response programs. The high level optimizer can consider energy rates, multiple demand charges, peak load contribution (PLC) costs, frequency regulation (FR) program revenue, economic load demand response (ELDR) program revenue, and asset sizing while performing the optimization. In some embodiments, the optimization problem is solved using a linear programming framework.

The energy storage planning tool can be configured estimate of the benefits and costs of investing in a battery asset or other type of asset. Potential benefits can include, for example, reduced energy costs, reduced demand charges, reduced PLC charges, and/or increased revenue from participating in IBDR programs such as FR or ELDR. Potential costs can include fixed costs (e.g., an initial purchase cost of the asset) as well as marginal costs (e.g., ongoing costs of using the asset) over the time horizon. The potential benefits and costs of an asset may vary based on the application of the asset and/or the system in which the asset will be used. For example, a system that participates in FR programs may realize the benefit of increased IBDR revenue, whereas a system that does not participate in any IBDR programs may not realize such a benefit.

To estimate the benefits and costs of investing in an asset, the planning tool can run the optimization to generate results for an entire year. In some embodiments, the optimization is based on hourly input data defining electric load, photovoltaic generation, utility rates, and/or other data that affects the utilization of the assets. A block size and a horizon can be specified in the unit of hours. The planning tool can perform the optimization to determine the values of the decision variables (e.g., battery power setpoints, electricity purchase amounts, FR allocation, etc.) over the horizon, given the input data over the horizon. Then, the input data can be shifted by the specified block size and the optimization problem solved again. This can be repeated until the whole year is covered. The results of the optimization define the predicted costs incurred over the planning period (e.g., energy costs, demand charges, PLC charges, etc.) as well as the revenue generated (e.g., FR revenue, ELDR revenue, etc.) by operating a battery asset.

The energy storage planning tool can be configured to calculate various financial metrics associated with the investment in the asset such as internal rate of return (IRR), net present value (NPV), and simple payback period (SPP). The planning tool can also determine the size of the asset which yields optimal financial metrics, such as a maximum NPV or a minimum SPP. In some embodiments, the planning tool allows a user to specify an asset size (e.g., battery size) and automatically determines the benefits of the asset from participating in selected IBDR programs while performing PBDR. In some embodiments, the planning tool is configured to determine the battery size that minimizes SPP given the IBDR programs selected and the requirement of performing PBDR. In some embodiments, the planning tool is configured to determine the battery size that maximizes NPV given the IBDR programs selected and the requirement of performing PBDR.

In any of the aforementioned cases, the planning tool may allow the user to select one or more which IBDR programs in which to participate. The IBDR program options available may include FR and ELDR, among others. Additionally, the user may be given the option of modifying and entering several inputs pertinent to each program. The planning tool may calculate the savings from PBDR and the revenue generated corresponding to the selected IBDR programs, in addition to the pro forma (financial statement) of the investment up to 20 years. The pro forma may include total annual benefit, battery performance parameters (e.g., cost of annual energy capacity augmentation), cash flow, accumulated cash balance, NPV, IRR, and SPP.

Throughout this disclosure, the term "planning period" or "simulation period" is used to refer to the entire period over which the planning tool runs the simulation. The planning period can have a duration of a month, several months, a year, several years, or any other duration. The term "optimization period" is used to refer to the to the portion of the planning period over which each iteration of the optimization is performed. The planning tool can solve the optimization over the optimization period to determine optimal battery power setpoints for each time step that occurs during the optimization period. The optimization period can then be shifted forward in time by a specified block size (e.g., a day, an hour, several hours, etc.). The decisions made for the time steps no longer within the optimization period (i.e., the time steps within the first block size period) can be stored as final decisions for those time steps. The planning tool can then solve the optimization over the new optimization period to determine optimal battery power setpoints for each time step that occurs during the new optimization period. This process can be repeated iteratively until the entire planning period has been covered (i.e., until the optimization period has been shifted to the end of the planning period) and decisions have been made for each time step in the planning period. These and other features and advantages of the energy storage planning tool are described in detail below.

Frequency Response Optimization System

Referring now to FIG. 1, a frequency response optimization system 100 is shown, according to an exemplary embodiment. System 100 is shown to include a campus 102 and an energy grid 104. Campus 102 may include one or more buildings 116 that receive power from energy grid 104. Buildings 116 may include equipment or devices that consume electricity during operation. For example, buildings 116 may include HVAC equipment, lighting equipment, security equipment, communications equipment, vending machines, computers, electronics, elevators, or other types of building equipment.

In some embodiments, buildings 116 are served by a building management system (BMS). A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices. An exemplary building management system which may be used to monitor and control buildings 116 is described in U.S. patent application Ser. No. 14/717,593 filed May 20, 2015, the entire disclosure of which is incorporated by reference herein.

In some embodiments, campus 102 includes a central plant 118. Central plant 118 may include one or more subplants that consume resources from utilities (e.g., water, natural gas, electricity, etc.) to satisfy the loads of buildings 116. For example, central plant 118 may include a heater subplant, a heat recovery chiller subplant, a chiller subplant, a cooling tower subplant, a hot thermal energy storage (TES) subplant, and a cold thermal energy storage (TES) subplant, a steam subplant, and/or any other type of subplant configured to serve buildings 116. The subplants may be configured to convert input resources (e.g., electricity, water, natural gas, etc.) into output resources (e.g., cold water, hot water, chilled air, heated air, etc.) that are provided to buildings 116. An exemplary central plant which may be used to satisfy the loads of buildings 116 is described U.S. patent application Ser. No. 14/634,609 filed Feb. 27, 2015, the entire disclosure of which is incorporated by reference herein.

In some embodiments, campus 102 includes energy generation 120. Energy generation 120 may be configured to generate energy that can be used by buildings 116, used by central plant 118, and/or provided to energy grid 104. In some embodiments, energy generation 120 generates electricity. For example, energy generation 120 may include an electric power plant, a photovoltaic energy field, or other types of systems or devices that generate electricity. The electricity generated by energy generation 120 can be used internally by campus 102 (e.g., by buildings 116 and/or central plant 118) to decrease the amount of electric power that campus 102 receives from outside sources such as energy grid 104 or battery 108. If the amount of electricity generated by energy generation 120 exceeds the electric power demand of campus 102, the excess electric power can be provided to energy grid 104 or stored in battery 108. The power output of campus 102 is shown in FIG. 1 as $P_{campus}$. $P_{campus}$ may be positive if campus 102 is outputting electric power or negative if campus 102 is receiving electric power.

Still referring to FIG. 1, system 100 is shown to include a power inverter 106 and a battery 108. Power inverter 106 may be configured to convert electric power between direct current (DC) and alternating current (AC). For example, battery 108 may be configured to store and output DC power, whereas energy grid 104 and campus 102 may be configured to consume and generate AC power. Power inverter 106 may be used to convert DC power from battery 108 into a sinusoidal AC output synchronized to the grid frequency of energy grid 104. Power inverter 106 may also be used to convert AC power from campus 102 or energy grid 104 into DC power that can be stored in battery 108. The power output of battery 108 is shown as $P_{bat}$. $P_{bat}$ may be positive if battery 108 is providing power to power inverter 106 or negative if battery 108 is receiving power from power inverter 106.

In some embodiments, power inverter 106 receives a DC power output from battery 108 and converts the DC power output to an AC power output. The AC power output can be used to satisfy the energy load of campus 102 and/or can be provided to energy grid 104. Power inverter 106 may synchronize the frequency of the AC power output with that of energy grid 104 (e.g., 50 Hz or 60 Hz) using a local oscillator and may limit the voltage of the AC power output to no higher than the grid voltage. In some embodiments, power inverter 106 is a resonant inverter that includes or uses LC circuits to remove the harmonics from a simple square wave in order to achieve a sine wave matching the frequency of energy grid 104. In various embodiments, power inverter 106 may operate using high-frequency transformers, low-frequency transformers, or without transformers. Low-frequency transformers may convert the DC output from battery 108 directly to the AC output provided to energy grid 104. High-frequency transformers may employ a multi-step process that involves converting the DC output to high-frequency AC, then back to DC, and then finally to the AC output provided to energy grid 104.

System 100 is shown to include a point of interconnection (POI) 110. POI 110 is the point at which campus 102, energy grid 104, and power inverter 106 are electrically connected. The power supplied to POI 110 from power inverter 106 is shown as $P_{sup}$. $P_{sup}$ may be defined as $P_{bat}+P_{loss}$, where $P_{batt}$ is the battery power and $P_{loss}$ is the power loss in the battery system (e.g., losses in power inverter 106 and/or battery 108). $P_{bat}$ and $P_{sup}$ may be positive if power inverter 106 is providing power to POI 110 or negative if power inverter 106 is receiving power from POI 110. $P_{campus}$ and $P_{sup}$ combine at POI 110 to form $P_{POI}$. $P_{POI}$ may be defined as the power provided to energy grid 104 from POI 110. $P_{POI}$ may be positive if POI 110 is providing power to energy grid 104 or negative if POI 110 is receiving power from energy grid 104.

Still referring to FIG. 1, system 100 is shown to include a frequency response controller 112. Controller 112 may be configured to generate and provide power setpoints to power inverter 106. Power inverter 106 may use the power setpoints to control the amount of power $P_{sup}$ provided to POI 110 or drawn from POI 110. For example, power inverter 106 may be configured to draw power from POI 110 and store the power in battery 108 in response to receiving a negative power setpoint from controller 112. Conversely, power inverter 106 may be configured to draw power from battery 108 and provide the power to POI 110 in response to receiving a positive power setpoint from controller 112. The magnitude of the power setpoint may define the amount of power $P_{sup}$ provided to or from power inverter 106. Controller 112 may be configured to generate and provide power setpoints that optimize the value of operating system 100 over a time horizon.

In some embodiments, frequency response controller 112 uses power inverter 106 and battery 108 to perform frequency regulation for energy grid 104. Frequency regulation is the process of maintaining the stability of the grid frequency (e.g., 60 Hz in the United States). The grid frequency may remain stable and balanced as long as the total electric supply and demand of energy grid 104 are balanced. Any deviation from that balance may result in a deviation of the grid frequency from its desirable value. For example, an increase in demand may cause the grid frequency to decrease, whereas an increase in supply may cause the grid frequency to increase. Frequency response controller 112 may be configured to offset a fluctuation in the grid frequency by causing power inverter 106 to supply energy from battery 108 to energy grid 104 (e.g., to offset a decrease in grid frequency) or store energy from energy grid 104 in battery 108 (e.g., to offset an increase in grid frequency).

In some embodiments, frequency response controller 112 uses power inverter 106 and battery 108 to perform load shifting for campus 102. For example, controller 112 may cause power inverter 106 to store energy in battery 108 when energy prices are low and retrieve energy from battery 108 when energy prices are high in order to reduce the cost of electricity required to power campus 102. Load shifting may also allow system 100 reduce the demand charge incurred. Demand charge is an additional charge imposed by some utility providers based on the maximum power consumption during an applicable demand charge period. For example, a demand charge rate may be specified in terms of dollars per unit of power (e.g., $/kW) and may be multiplied by the peak power usage (e.g., kW) during a demand charge period to calculate the demand charge. Load shifting may allow system 100 to smooth momentary spikes in the electric demand of campus 102 by drawing energy from battery 108 in order to reduce peak power draw from energy grid 104, thereby decreasing the demand charge incurred.

Still referring to FIG. 1, system 100 is shown to include an incentive provider 114. Incentive provider 114 may be a utility (e.g., an electric utility), a regional transmission organization (RTO), an independent system operator (ISO), or any other entity that provides incentives for performing frequency regulation. For example, incentive provider 114 may provide system 100 with monetary incentives for participating in a frequency response program. In order to participate in the frequency response program, system 100 may maintain a reserve capacity of stored energy (e.g., in battery 108) that can be provided to energy grid 104. System 100 may also maintain the capacity to draw energy from energy grid 104 and store the energy in battery 108. Reserving both of these capacities may be accomplished by managing the state-of-charge of battery 108.

Frequency response controller 112 may provide incentive provider 114 with a price bid and a capability bid. The price bid may include a price per unit power (e.g., $/MW) for reserving or storing power that allows system 100 to participate in a frequency response program offered by incentive provider 114. The price per unit power bid by frequency response controller 112 is referred to herein as the "capability price." The price bid may also include a price for actual performance, referred to herein as the "performance price." The capability bid may define an amount of power (e.g., MW) that system 100 will reserve or store in battery 108 to perform frequency response, referred to herein as the "capability bid."

Incentive provider 114 may provide frequency response controller 112 with a capability clearing price $CP_{cap}$, a performance clearing price $CP_{perf}$, and a regulation award $Reg_{award}$, which correspond to the capability price, the performance price, and the capability bid, respectively. In some embodiments, $CP_{cap}$, $CP_{perf}$, and $Reg_{award}$ are the same as the corresponding bids placed by controller 112. In other embodiments, $CP_{cap}$, $CP_{perf}$, and $Reg_{award}$ may not be the same as the bids placed by controller 112. For example, $CP_{cap}$, $CP_{perf}$, and $Reg_{award}$ may be generated by incentive provider 114 based on bids received from multiple participants in the frequency response program. Controller 112 may use $CP_{cap}$, $CP_{perf}$, and $Reg_{award}$ to perform frequency regulation.

Frequency response controller 112 is shown receiving a regulation signal from incentive provider 114. The regulation signal may specify a portion of the regulation award $Reg_{award}$ that frequency response controller 112 is to add or remove from energy grid 104. In some embodiments, the regulation signal is a normalized signal (e.g., between −1 and 1) specifying a proportion of $Reg_{award}$. Positive values of the regulation signal may indicate an amount of power to add to energy grid 104, whereas negative values of the regulation signal may indicate an amount of power to remove from energy grid 104.

Frequency response controller 112 may respond to the regulation signal by generating an optimal power setpoint for power inverter 106. The optimal power setpoint may take into account both the potential revenue from participating in the frequency response program and the costs of participation. Costs of participation may include, for example, a monetized cost of battery degradation as well as the energy and demand charges that will be incurred. The optimization may be performed using sequential quadratic programming, dynamic programming, or any other optimization technique.

In some embodiments, controller 112 uses a battery life model to quantify and monetize battery degradation as a function of the power setpoints provided to power inverter 106. Advantageously, the battery life model allows controller 112 to perform an optimization that weighs the revenue generation potential of participating in the frequency response program against the cost of battery degradation and other costs of participation (e.g., less battery power available for campus 102, increased electricity costs, etc.). An exemplary regulation signal and power response are described in greater detail with reference to FIG. 2.

Figure 2:
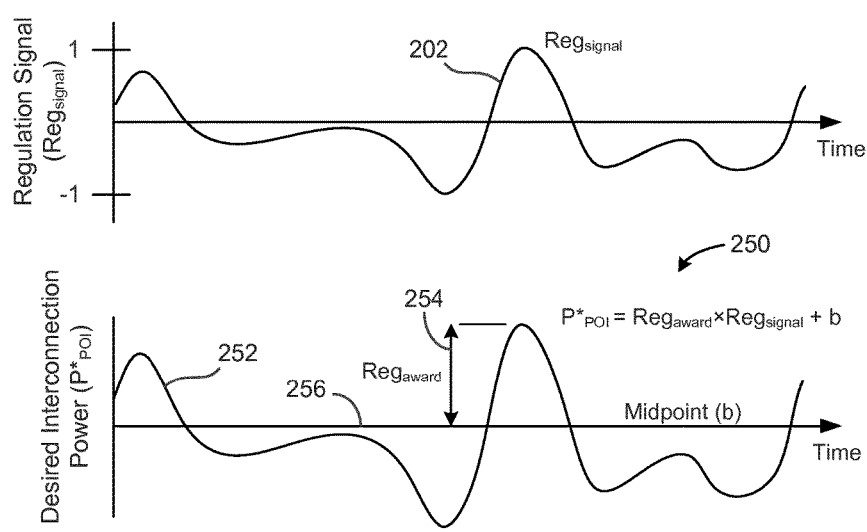
FIG. 2 is a graph of a regulation signal which may be provided to the system of FIG. 1 and a frequency response signal which may be generated by the system of FIG. 1, according to an exemplary embodiment.

Referring now to FIG. 2, a pair of frequency response graphs 200 and 250 are shown, according to an exemplary embodiment. Graph 200 illustrates a regulation signal $Reg_{signal}$ 202 as a function of time. $Reg_{signal}$ 202 is shown as a normalized signal ranging from −1 to 1 (i.e., $-1 \leq Reg_{signal} \leq 1$). $Reg_{signal}$ 202 may be generated by incentive provider 114 and provided to frequency response controller 112. $Reg_{signal}$ 202 may define a proportion of the regulation award $Reg_{award}$ 254 that controller 112 is to add or remove from energy grid 104, relative to a baseline value referred to as the midpoint b 256. For example, if the value of $Reg_{award}$ 254 is 10 MW, a regulation signal value of 0.5 (i.e., $Reg_{signal}$=0.5) may indicate that system 100 is requested to add 5 MW of power at POI 110 relative to midpoint b (e.g., $P_{POI^*}$=10 MW×0.5+b), whereas a regulation signal value of −0.3 may indicate that system 100 is requested to remove 3 MW of power from POI 110 relative to midpoint b (e.g., $P_{POI}^*$=10 MW×−0.3+b).

Graph 250 illustrates the desired interconnection power $P_{POI}^*$ 252 as a function of time. $P_{POI}^*$ 252 may be calculated by frequency response controller 112 based on $Reg_{signal}$ 202, $Reg_{award}$ 254, and a midpoint b 256. For example, controller 112 may calculate $P_{POI}^*$ 252 using the following equation:

$$P_{POI}^* = Reg_{award} \times Reg_{signal} + b$$

where $P_{POI}^*$ represents the desired power at POI 110 (e.g., $P_{POI}^* = P_{sup} + P_{campus}$) and b is the midpoint. Midpoint b may be defined (e.g., set or optimized) by controller 112 and may represent the midpoint of regulation around which the load is modified in response to $Reg_{signal}$ 202. Optimal adjustment of midpoint b may allow controller 112 to actively participate in the frequency response market while also taking into account the energy and demand charge that will be incurred.

In order to participate in the frequency response market, controller 112 may perform several tasks. Controller 112 may generate a price bid (e.g., $/MW) that includes the capability price and the performance price. In some embodiments, controller 112 sends the price bid to incentive provider 114 at approximately 15:30 each day and the price bid remains in effect for the entirety of the next day. Prior to beginning a frequency response period, controller 112 may generate the capability bid (e.g., MW) and send the capability bid to incentive provider 114. In some embodiments, controller 112 generates and sends the capability bid to incentive provider 114 approximately 1.5 hours before a frequency response period begins. In an exemplary embodiment, each frequency response period has a duration of one hour; however, it is contemplated that frequency response periods may have any duration.

At the start of each frequency response period, controller 112 may generate the midpoint b around which controller 112 plans to perform frequency regulation. In some embodiments, controller 112 generates a midpoint b that will maintain battery 108 at a constant state-of-charge (SOC) (i.e. a midpoint that will result in battery 108 having the same SOC at the beginning and end of the frequency response period). In other embodiments, controller 112 generates midpoint b using an optimization procedure that allows the SOC of battery 108 to have different values at the beginning and end of the frequency response period. For example, controller 112 may use the SOC of battery 108 as a constrained variable that depends on midpoint b in order to optimize a value function that takes into account frequency response revenue, energy costs, and the cost of battery degradation. Exemplary techniques for calculating and/or optimizing midpoint b under both the constant SOC scenario and the variable SOC scenario are described in detail in U.S. patent application Ser. No. 15/247,883 filed Aug. 25, 2016, U.S. patent application Ser. No. 15/247,885 filed Aug. 25, 2016, and U.S. patent application Ser. No. 15/247,886 filed Aug. 25, 2016. The entire disclosure of each of these patent applications is incorporated by reference herein.

During each frequency response period, controller 112 may periodically generate a power setpoint for power inverter 106. For example, controller 112 may generate a power setpoint for each time step in the frequency response period. In some embodiments, controller 112 generates the power setpoints using the equation:

$$P_{POI}^* = Reg_{award} \times Reg_{signal} + b$$

where $P_{POI}^* = P_{sup} + P_{campus}$. Positive values of $P_{POI}^*$ indicate energy flow from POI 110 to energy grid 104. Positive values of $P_{sup}$ and $P_{campus}$ indicate energy flow to POI 110 from power inverter 106 and campus 102, respectively.

In other embodiments, controller 112 generates the power setpoints using the equation:

$$P_{POI}^* = Reg_{award} \times Res_{FR} + b$$

where $Res_{FR}$ is an optimal frequency response generated by optimizing a value function. Controller 112 may subtract $P_{campus}$ from $P_{POI}^*$ to generate the power setpoint for power inverter 106 (i.e., $P_{sup}=P_{POI}^*-P_{campus}$). The power setpoint for power inverter 106 indicates the amount of power that power inverter 106 is to add to POI 110 (if the power setpoint is positive) or remove from POI 110 (if the power setpoint is negative). Exemplary techniques which can be used by controller 112 to calculate power inverter setpoints are described in detail in U.S. patent application Ser. No. 15/247,793 filed Aug. 25, 2016, U.S. patent application Ser. No. 15/247,784 filed Aug. 25, 2016, and U.S. patent application Ser. No. 15/247,777 filed Aug. 25, 2016. The entire disclosure of each of these patent applications is incorporated by reference herein.

Photovoltaic Energy System with Frequency Regulation and Ramp Rate Control

Figure 3:
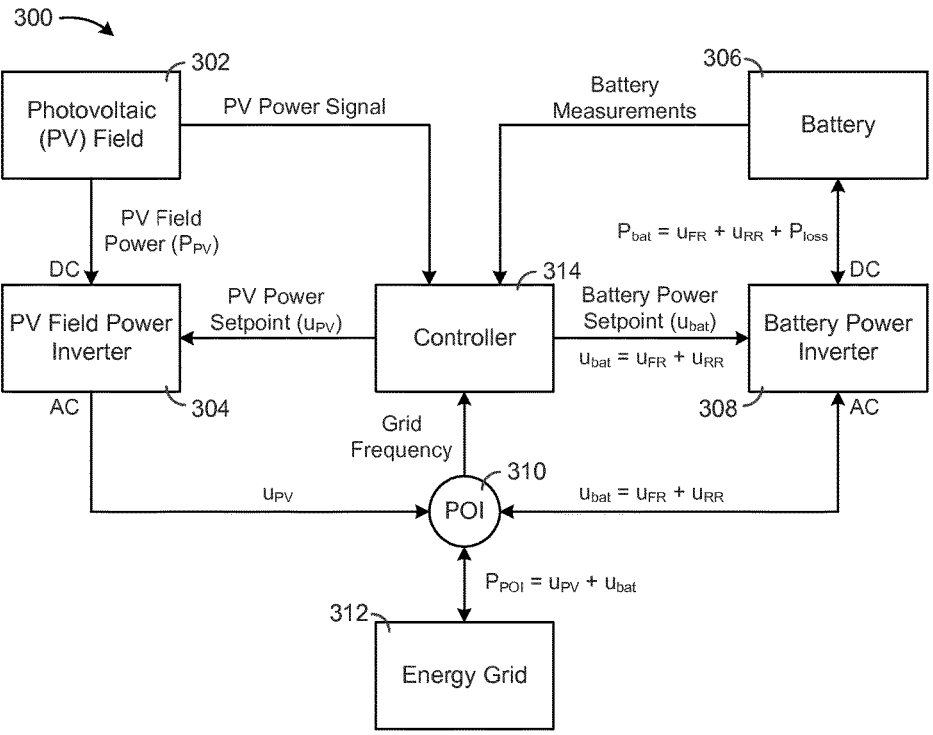
FIG. 3 is a block diagram of a photovoltaic energy system configured to simultaneously perform both ramp rate control and frequency regulation while maintaining the state-of-charge of a battery within a desired range, according to an exemplary embodiment.
Figure 4:
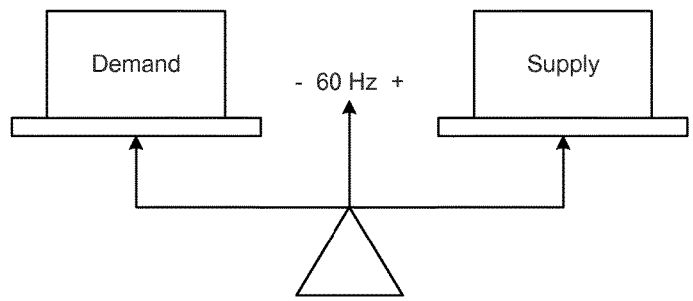
FIG. 4 is a drawing illustrating the electric supply to an energy grid and electric demand from the energy grid which must be balanced in order to maintain the grid frequency, according to an exemplary embodiment.

Referring now to FIGS. 3-4, a photovoltaic energy system 300 that uses battery storage to simultaneously perform both ramp rate control and frequency regulation is shown, according to an exemplary embodiment. Ramp rate control is the process of offsetting ramp rates (i.e., increases or decreases in the power output of an energy system such as a photovoltaic energy system) that fall outside of compliance limits determined by the electric power authority overseeing the energy grid. Ramp rate control typically requires the use of an energy source that allows for offsetting ramp rates by either supplying additional power to the grid or consuming more power from the grid. In some instances, a facility is penalized for failing to comply with ramp rate requirements.

Frequency regulation is the process of maintaining the stability of the grid frequency (e.g., 60 Hz in the United States). As shown in FIG. 4, the grid frequency may remain balanced at 60 Hz as long as there is a balance between the demand from the energy grid and the supply to the energy grid. An increase in demand yields a decrease in grid frequency, whereas an increase in supply yields an increase in grid frequency. During a fluctuation of the grid frequency, system 300 may offset the fluctuation by either drawing more energy from the energy grid (e.g., if the grid frequency is too high) or by providing energy to the energy grid (e.g., if the grid frequency is too low). Advantageously, system 300 may use battery storage in combination with photovoltaic power to perform frequency regulation while simultaneously complying with ramp rate requirements and maintaining the state-of-charge of the battery storage within a predetermined desirable range.

Referring particularly to FIG. 3, system 300 is shown to include a photovoltaic (PV) field 302, a PV field power inverter 304, a battery 306, a battery power inverter 308, a point of interconnection (POI) 310, and an energy grid 312. PV field 302 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form solar panels. Each solar panel may include a plurality of linked photovoltaic cells. The solar panels may combine to form a photovoltaic array.

PV field 302 may have any of a variety of sizes and/or locations. In some embodiments, PV field 302 is part of a large-scale photovoltaic power station (e.g., a solar park or farm) capable of providing an energy supply to a large number of consumers. When implemented as part of a large-scale system, PV field 302 may cover multiple hectares and may have power outputs of tens or hundreds of megawatts. In other embodiments, PV field 302 may cover a smaller area and may have a relatively lesser power output (e.g., between one and ten megawatts, less than one megawatt, etc.). For example, PV field 302 may be part of a rooftop-mounted system capable of providing enough electricity to power a single home or building. It is contemplated that PV field 302 may have any size, scale, and/or power output, as may be desirable in different implementations.

PV field 302 may generate a direct current (DC) output that depends on the intensity and/or directness of the sunlight to which the solar panels are exposed. The directness of the sunlight may depend on the angle of incidence of the sunlight relative to the surfaces of the solar panels. The intensity of the sunlight may be affected by a variety of environmental factors such as the time of day (e.g., sunrises and sunsets) and weather variables such as clouds that cast shadows upon PV field 302. When PV field 302 is partially or completely covered by shadow, the power output of PV field 302 (i.e., PV field power $P_{PV}$) may drop as a result of the decrease in solar intensity.

In some embodiments, PV field 302 is configured to maximize solar energy collection. For example, PV field 302 may include a solar tracker (e.g., a GPS tracker, a sunlight sensor, etc.) that adjusts the angle of the solar panels so that the solar panels are aimed directly at the sun throughout the day. The solar tracker may allow the solar panels to receive direct sunlight for a greater portion of the day and may increase the total amount of power produced by PV field 302. In some embodiments, PV field 302 includes a collection of mirrors, lenses, or solar concentrators configured to direct and/or concentrate sunlight on the solar panels. The energy generated by PV field 302 may be stored in battery 306 or provided to energy grid 312.

Still referring to FIG. 3, system 300 is shown to include a PV field power inverter 304. Power inverter 304 may be configured to convert the DC output of PV field 302 $P_{PV}$ into an alternating current (AC) output that can be fed into energy grid 312 or used by a local (e.g., off-grid) electrical network. For example, power inverter 304 may be a solar inverter or grid-tie inverter configured to convert the DC output from PV field 302 into a sinusoidal AC output synchronized to the grid frequency of energy grid 312. In some embodiments, power inverter 304 receives a cumulative DC output from PV field 302. For example, power inverter 304 may be a string inverter or a central inverter. In other embodiments, power inverter 304 may include a collection of micro-inverters connected to each solar panel or solar cell. PV field power inverter 304 may convert the DC power output $P_{PV}$ into an AC power output $u_{PV}$ and provide the AC power output $u_{PV}$ to POI 310.

Power inverter 304 may receive the DC power output $P_{PV}$ from PV field 302 and convert the DC power output to an AC power output that can be fed into energy grid 312. Power inverter 304 may synchronize the frequency of the AC power output with that of energy grid 312 (e.g., 50 Hz or 60 Hz) using a local oscillator and may limit the voltage of the AC power output to no higher than the grid voltage. In some embodiments, power inverter 304 is a resonant inverter that includes or uses LC circuits to remove the harmonics from a simple square wave in order to achieve a sine wave matching the frequency of energy grid 312. In various embodiments, power inverter 304 may operate using high-frequency transformers, low-frequency transformers, or without transformers. Low-frequency transformers may convert the DC output from PV field 302 directly to the AC output provided to energy grid 312. High-frequency transformers may employ a multi-step process that involves converting the DC output to high-frequency AC, then back to DC, and then finally to the AC output provided to energy grid 312.

Power inverter 304 may be configured to perform maximum power point tracking and/or anti-islanding. Maximum power point tracking may allow power inverter 304 to produce the maximum possible AC power from PV field 302. For example, power inverter 304 may sample the DC power output from PV field 302 and apply a variable resistance to find the optimum maximum power point. Anti-islanding is a protection mechanism that immediately shuts down power inverter 304 (i.e., preventing power inverter 304 from generating AC power) when the connection to an electricity-consuming load no longer exists. In some embodiments, PV field power inverter 304 performs ramp rate control by limiting the power generated by PV field 302.

Still referring to FIG. 3, system 300 is shown to include a battery power inverter 308. Battery power inverter 308 may be configured to draw a DC power $P_{bat}$ from battery 306, convert the DC power $P_{bat}$ into an AC power $u_{bat}$, and provide the AC power $u_{bat}$ to POI 310. Battery power inverter 308 may also be configured to draw the AC power $u_{bat}$ from POI 310, convert the AC power $u_{bat}$ into a DC battery power $P_{bat}$, and store the DC battery power $P_{bat}$ in battery 306. The DC battery power $P_{bat}$ may be positive if battery 306 is providing power to battery power inverter 308 (i.e., if battery 306 is discharging) or negative if battery 306 is receiving power from battery power inverter 308 (i.e., if battery 306 is charging). Similarly, the AC battery power $u_{bat}$ may be positive if battery power inverter 308 is providing power to POI 310 or negative if battery power inverter 308 is receiving power from POI 310.

The AC battery power $u_{bat}$ is shown to include an amount of power used for frequency regulation (i.e., $u_{FR}$) and an amount of power used for ramp rate control (i.e., $u_{RR}$) which together form the AC battery power (i.e., $u_{bat}=u_{FR}+u_{RR}$). The DC battery power $P_{bat}$ is shown to include both $u_{FR}$ and $u_{RR}$ as well as an additional term $P_{loss}$ representing power losses in battery 306 and/or battery power inverter 308 (i.e., $P_{bat}=u_{FR}+u_{RR}+P_{loss}$). The PV field power $u_{PV}$ and the battery power $u_{bat}$ combine at POI 110 to form $P_{POI}$ (i.e., $P_{POI}=u_{PV}+u_{bat}$), which represents the amount of power provided to energy grid 312. $P_{POI}$ may be positive if POI 310 is providing power to energy grid 312 or negative if POI 310 is receiving power from energy grid 312.

Still referring to FIG. 3, system 300 is shown to include a controller 314. Controller 314 may be configured to generate a PV power setpoint $u_{PV}$ for PV field power inverter 304 and a battery power setpoint $u_{bat}$ for battery power inverter 308. Throughout this disclosure, the variable $u_{PV}$ is used to refer to both the PV power setpoint generated by controller 314 and the AC power output of PV field power inverter 304 since both quantities have the same value. Similarly, the variable $u_{bat}$ is used to refer to both the battery power setpoint generated by controller 314 and the AC power output/input of battery power inverter 308 since both quantities have the same value.

PV field power inverter 304 uses the PV power setpoint $u_{PV}$ to control an amount of the PV field power $P_{PV}$ to provide to POI 110. The magnitude of $u_{PV}$ may be the same as the magnitude of $P_{PV}$ or less than the magnitude of $P_{PV}$. For example, $u_{PV}$ may be the same as $P_{PV}$ if controller 314 determines that PV field power inverter 304 is to provide all of the photovoltaic power $P_{PV}$ to POI 310. However, $u_{PV}$ may be less than $P_{PV}$ if controller 314 determines that PV field power inverter 304 is to provide less than all of the photovoltaic power $P_{PV}$ to POI 310. For example, controller 314 may determine that it is desirable for PV field power inverter 304 to provide less than all of the photovoltaic power $P_{PV}$ to POI 310 to prevent the ramp rate from being exceeded and/or to prevent the power at POI 310 from exceeding a power limit.

Battery power inverter 308 uses the battery power setpoint $u_{bat}$ to control an amount of power charged or discharged by battery 306. The battery power setpoint $u_{bat}$ may be positive if controller 314 determines that battery power inverter 308 is to draw power from battery 306 or negative if controller 314 determines that battery power inverter 308 is to store power in battery 306. The magnitude of $u_{bat}$ controls the rate at which energy is charged or discharged by battery 306.

Controller 314 may generate $u_{PV}$ and $u_{bat}$ based on a variety of different variables including, for example, a power signal from PV field 302 (e.g., current and previous values for $P_{PV}$), the current state-of-charge (SOC) of battery 306, a maximum battery power limit, a maximum power limit at POI 310, the ramp rate limit, the grid frequency of energy grid 312, and/or other variables that can be used by controller 314 to perform ramp rate control and/or frequency regulation. Advantageously, controller 314 generates values for $u_{PV}$ and $u_{bat}$ that maintain the ramp rate of the PV power within the ramp rate compliance limit while participating in the regulation of grid frequency and maintaining the SOC of battery 306 within a predetermined desirable range.

An exemplary controller which can be used as controller 314 and exemplary processes which may be performed by controller 314 to generate the PV power setpoint $u_{PV}$ and the battery power setpoint $u_{bat}$ are described in detail in U.S. patent application Ser. No. 15/247,869 filed Aug. 25, 2016, U.S. patent application Ser. No. 15/247,844 filed Aug. 25, 2016, U.S. patent application Ser. No. 15/247,788 filed Aug. 25, 2016, U.S. patent application Ser. No. 15/247,872 filed Aug. 25, 2016, U.S. patent application Ser. No. 15/247,880 filed Aug. 25, 2016, and U.S. patent application Ser. No. 15/247,873 filed Aug. 25, 2016. The entire disclosure of each of these patent applications is incorporated by reference herein.

Energy Storage System with Thermal and Electrical Energy Storage

Figure 5:
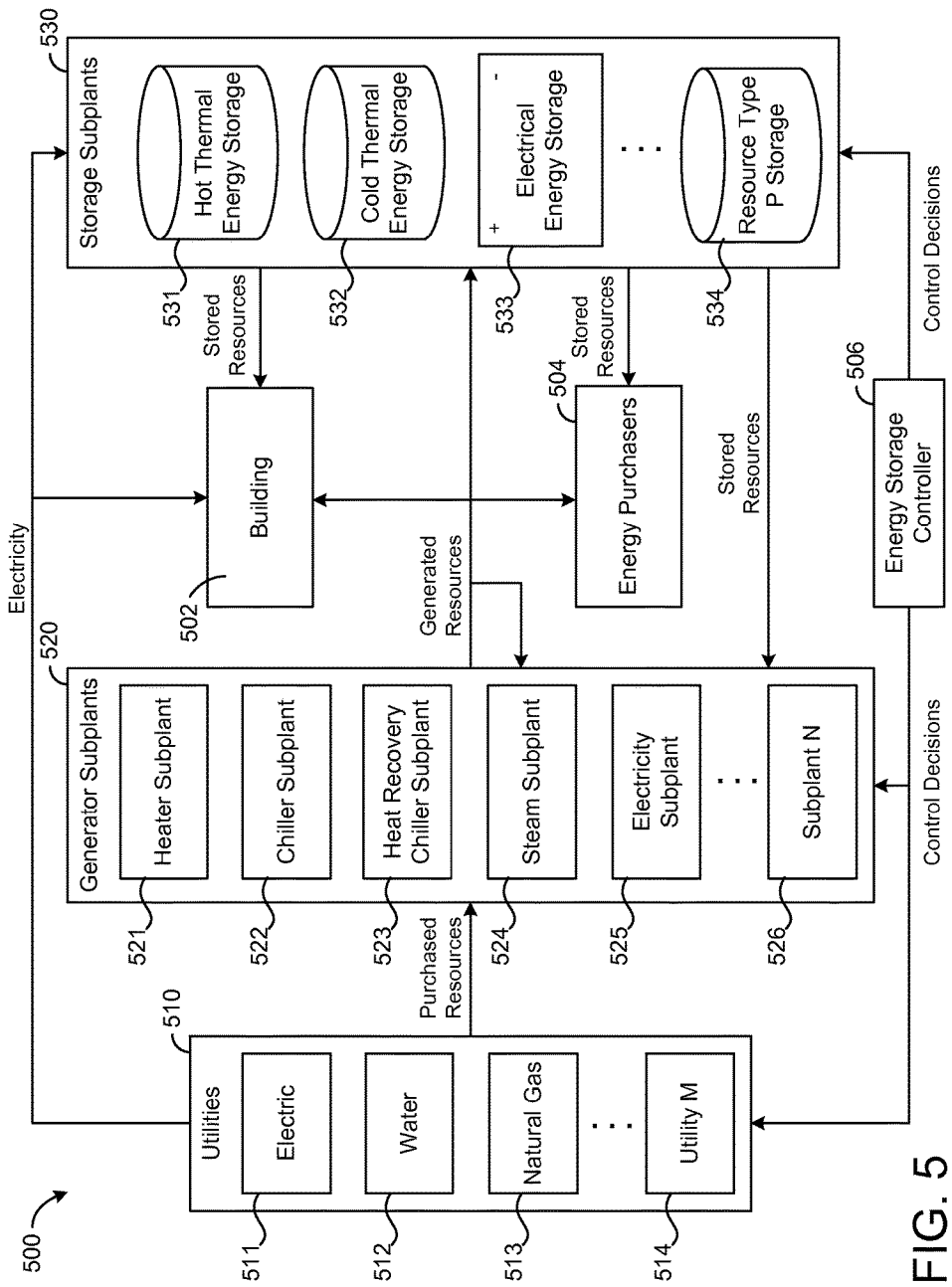
FIG. 5 is a block diagram of an energy storage system including thermal energy storage and electrical energy storage, according to an exemplary embodiment.

Referring now to FIG. 5, a block diagram of an energy storage system 500 is shown, according to an exemplary embodiment. Energy storage system 500 is shown to include a building 502. Building 502 may be the same or similar to buildings 116, as described with reference to FIG. 1. For example, building 502 may be equipped with a HVAC system and/or a building management system that operates to control conditions within building 502. In some embodiments, building 502 includes multiple buildings (i.e., a campus) served by energy storage system 500. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy storage system 500 operates to satisfy the resource demand associated with building 502.

Energy storage system 500 is shown to include a plurality of utilities 510. Utilities 510 may provide energy storage system 500 with resources such as electricity, water, natural gas, or any other resource that can be used by energy storage system 500 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.), stored in storage subplants 530 for later use, or provided directly to building 502. For example, utilities 510 are shown providing electricity directly to building 502 and storage subplants 530.

Energy storage system 500 is shown to include a plurality of generator subplants 520. In some embodiments, generator subplants 520 are components of a central plant (e.g., central plant 118). Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510, retrieved from storage subplants 530, and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be stored in storage subplants 530, provided to building 502, sold to energy purchasers 504, and/or used by other generator subplants 520. For example, the electricity generated by electricity subplant 525 may be stored in electrical energy storage 533, used by chiller subplant 522 to generate cold thermal energy, provided to building 502, and/or sold to energy purchasers 504.

Energy storage system 500 is shown to include storage subplants 530. In some embodiments, storage subplants 530 are components of a central plant (e.g., central plant 118). Storage subplants 530 may be configured to store energy and other types of resources for later use. Each of storage subplants 530 may be configured to store a different type of resource. For example, storage subplants 530 are shown to include hot thermal energy storage 531 (e.g., one or more hot water storage tanks), cold thermal energy storage 532 (e.g., one or more cold thermal energy storage tanks), electrical energy storage 533 (e.g., one or more batteries), and resource type P storage 534, where P is the total number of storage subplants 530. The resources stored in subplants 530 may be purchased directly from utilities 510 or generated by generator subplants 520.

In some embodiments, storage subplants 530 are used by energy storage system 500 to take advantage of price-based demand response (PBDR) programs. PBDR programs encourage consumers to reduce consumption when generation, transmission, and distribution costs are high. PBDR programs are typically implemented (e.g., by utilities 510) in the form of energy prices that vary as a function of time. For example, utilities 510 may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in subplants 530 allows for the resources to be purchased at times when the resources are relatively less expensive (e.g., during non-peak electricity hours) and stored for use at times when the resources are relatively more expensive (e.g., during peak electricity hours). Storing resources in subplants 530 also allows the resource demand of building 502 to be shifted in time. For example, resources can be purchased from utilities 510 at times when the demand for heating or cooling is low and immediately converted into hot or cold thermal energy by generator subplants 520. The thermal energy can be stored in storage subplants 530 and retrieved at times when the demand for heating or cooling is high. In some embodiments, thermal energy can be stored in the mass of the building. For example, the building air mass can be treated as a type of thermal energy storage and used in combination with storage subplants 530 to store thermal energy. This allows energy storage system 500 to smooth the resource demand of building 502 and reduces the maximum required capacity of generator subplants 520. Smoothing the demand also allows energy storage system 500 to reduce the peak electricity consumption, which results in a lower demand charge.

In some embodiments, storage subplants 530 are used by energy storage system 500 to take advantage of incentive-based demand response (IBDR) programs. IBDR programs provide incentives to customers who have the capability to store energy, generate energy, or curtail energy usage upon request. Incentives are typically provided in the form of monetary revenue paid by utilities 510 or by an independent service operator (ISO). IBDR programs supplement traditional utility-owned generation, transmission, and distribution assets with additional options for modifying demand load curves. For example, stored energy can be sold to energy purchasers 504 (e.g., an energy grid) to supplement the energy generated by utilities 510. In some instances, incentives for participating in an IBDR program vary based on how quickly a system can respond to a request to change power output/consumption. Faster responses may be compensated at a higher level. Advantageously, electrical energy storage 533 allows system 500 to quickly respond to a request for electric power by rapidly discharging stored electrical energy to energy purchasers 504.

Still referring to FIG. 5, energy storage system 500 is shown to include an energy storage controller 506. Energy storage controller 506 may be configured to control the distribution, production, storage, and usage of resources in energy storage system 500. In some embodiments, energy storage controller 506 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to store or remove from storage subplants 530, an optimal amount of each resource to sell to energy purchasers 504, and/or an optimal amount of each resource to provide to building 502. In some embodiments, the control decisions include an optimal amount of each input resource and output resource for each of generator subplants 520.

Controller 506 may be configured to maximize the economic value of operating energy storage system 500 over the duration of the optimization period. The economic value may be defined by a value function that expresses economic value as a function of the control decisions made by controller 506. The value function may account for the cost of resources purchased from utilities 510, revenue generated by selling resources to energy purchasers 504, and the cost of operating energy storage system 500. In some embodiments, the cost of operating energy storage system 500 includes a cost for losses in battery capacity as a result of the charging and discharging electrical energy storage 533. The cost of operating energy storage system 500 may also include a cost of excessive equipment start/stops during the optimization period.

Each of subplants 520-530 may include equipment that can be controlled by energy storage controller 506 to optimize the performance of energy storage system 500. Subplant equipment may include, for example, heating devices, chillers, heat recovery heat exchangers, cooling towers, energy storage devices, pumps, valves, and/or other devices of subplants 520-530. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from energy storage controller 506.

In some embodiments, one or more of subplants 520-530 includes a subplant level controller configured to control the equipment of the corresponding subplant. For example, energy storage controller 506 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, controller 506 maximizes the life cycle economic value of energy storage system 500 while participating in PBDR programs, IBDR programs, or simultaneously in both PBDR and IBDR programs. For the IBDR programs, controller 506 may use statistical estimates of past clearing prices, mileage ratios, and event probabilities to determine the revenue generation potential of selling stored energy to energy purchasers 504. For the PBDR programs, controller 506 may use predictions of ambient conditions, facility thermal loads, and thermodynamic models of installed equipment to estimate the resource consumption of subplants 520. Controller 506 may use predictions of the resource consumption to monetize the costs of running the equipment.

Controller 506 may automatically determine (e.g., without human intervention) a combination of PBDR and/or IBDR programs in which to participate over the optimization period in order to maximize economic value. For example, controller 506 may consider the revenue generation potential of IBDR programs, the cost reduction potential of PBDR programs, and the equipment maintenance/replacement costs that would result from participating in various combinations of the IBDR programs and PBDR programs. Controller 506 may weigh the benefits of participation against the costs of participation to determine an optimal combination of programs in which to participate. Advantageously, this allows controller 506 to determine an optimal set of control decisions that maximize the overall value of operating energy storage system 500.

In some instances, controller 506 may determine that it would be beneficial to participate in an IBDR program when the revenue generation potential is high and/or the costs of participating are low. For example, controller 506 may receive notice of a synchronous reserve event from an IBDR program which requires energy storage system 500 to shed a predetermined amount of power. Controller 506 may determine that it is optimal to participate in the IBDR program if cold thermal energy storage 532 has enough capacity to provide cooling for building 502 while the load on chiller subplant 522 is reduced in order to shed the predetermined amount of power.

In other instances, controller 506 may determine that it would not be beneficial to participate in an IBDR program when the resources required to participate are better allocated elsewhere. For example, if building 502 is close to setting a new peak demand that would greatly increase the PBDR costs, controller 506 may determine that only a small portion of the electrical energy stored in electrical energy storage 533 will be sold to energy purchasers 504 in order to participate in a frequency response market. Controller 506 may determine that the remainder of the electrical energy will be used to power chiller subplant 522 to prevent a new peak demand from being set.

In some embodiments, energy storage system 500 and controller include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

Energy Storage Controller

Figure 6:
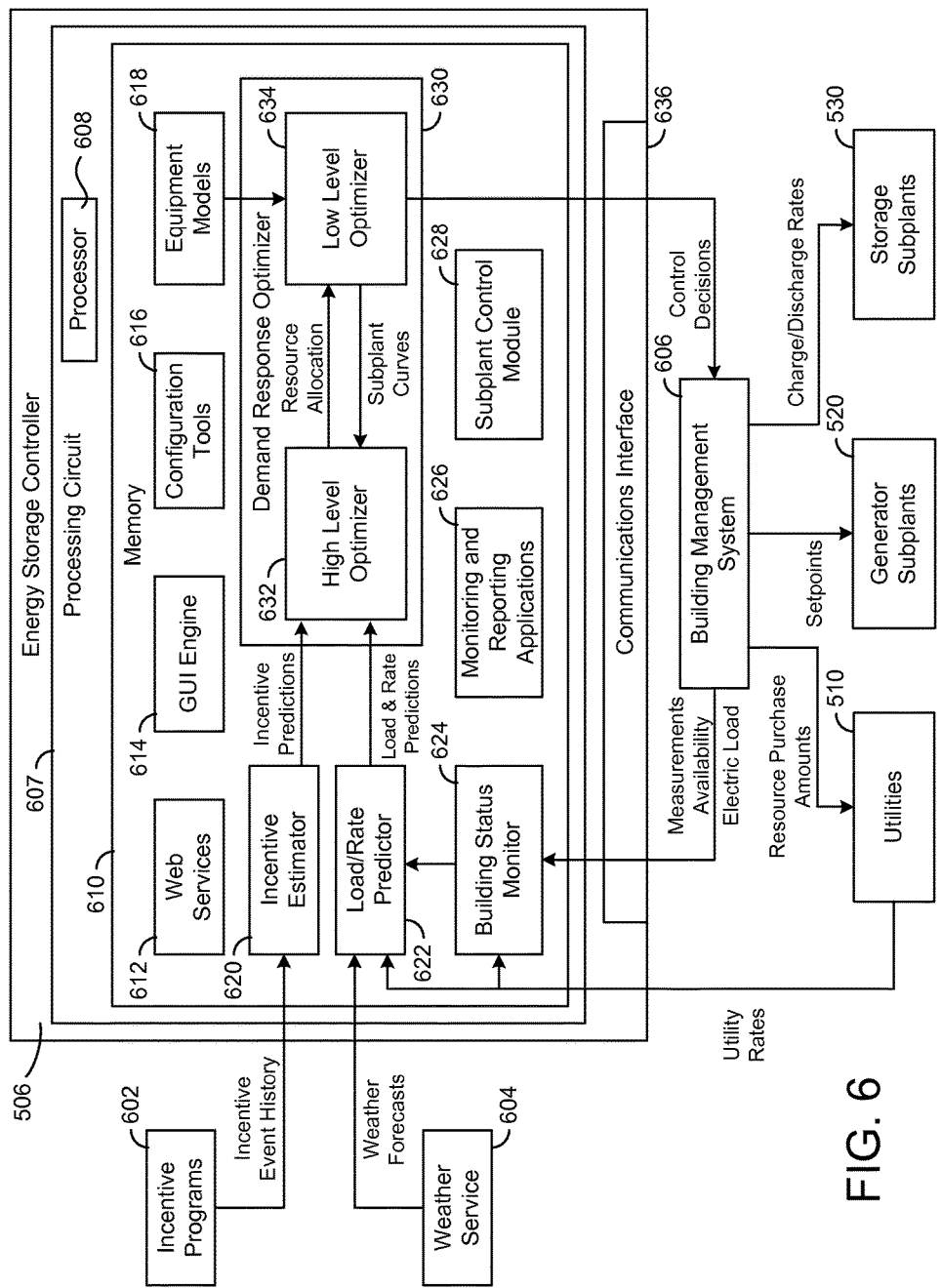
FIG. 6 is block diagram of an energy storage controller which may be used to operate the energy storage system of FIG. 5, according to an exemplary embodiment.

Referring now to FIG. 6, a block diagram illustrating energy storage controller 506 in greater detail is shown, according to an exemplary embodiment. Energy storage controller 506 is shown providing control decisions to a building management system (BMS) 606. In some embodiments, BMS 606 is the same or similar the BMS described with reference to FIG. 1. The control decisions provided to BMS 606 may include resource purchase amounts for utilities 510, setpoints for generator subplants 520, and/or charge/discharge rates for storage subplants 530.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to energy storage controller 506. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520-

530 to affect the monitored conditions within the building and to serve the thermal energy loads of the building.

BMS 606 may receive control signals from energy storage controller 506 specifying on/off states, charge/discharge rates, and/or setpoints for the subplant equipment. BMS 606 may control the equipment (e.g., via actuators, power relays, etc.) in accordance with the control signals provided by energy storage controller 506. For example, BMS 606 may operate the equipment using closed loop control to achieve the setpoints specified by energy storage controller 506. In various embodiments, BMS 606 may be combined with energy storage controller 506 or may be part of a separate building management system. According to an exemplary embodiment, BMS 606 is a METASYS® brand building management system, as sold by Johnson Controls, Inc.

Energy storage controller 506 may monitor the status of the controlled building using information received from BMS 606. Energy storage controller 506 may be configured to predict the thermal energy loads (e.g., heating loads, cooling loads, etc.) of the building for plurality of time steps in an optimization period (e.g., using weather forecasts from a weather service 604). Energy storage controller 506 may also predict the revenue generation potential of IBDR programs using an incentive event history (e.g., past clearing prices, mileage ratios, event probabilities, etc.) from incentive programs 602. Energy storage controller 506 may generate control decisions that optimize the economic value of operating energy storage system 500 over the duration of the optimization period subject to constraints on the optimization process (e.g., energy balance constraints, load satisfaction constraints, etc.). The optimization process performed by energy storage controller 506 is described in greater detail below.

According to an exemplary embodiment, energy storage controller 506 is integrated within a single computer (e.g., one server, one housing, etc.). In various other exemplary embodiments, energy storage controller 506 can be distributed across multiple servers or computers (e.g., that can exist in distributed locations). In another exemplary embodiment, energy storage controller 506 may integrated with a smart building manager that manages multiple building systems and/or combined with BMS 606.

Energy storage controller 506 is shown to include a communications interface 636 and a processing circuit 607. Communications interface 636 may include wired or wireless interfaces (e.g., jacks, antennas, transmitters, receivers, transceivers, wire terminals, etc.) for conducting data communications with various systems, devices, or networks. For example, communications interface 636 may include an Ethernet card and port for sending and receiving data via an Ethernet-based communications network and/or a Wi-Fi transceiver for communicating via a wireless communications network. Communications interface 636 may be configured to communicate via local area networks or wide area networks (e.g., the Internet, a building WAN, etc.) and may use a variety of communications protocols (e.g., BACnet, IP, LON, etc.).

Communications interface 636 may be a network interface configured to facilitate electronic data communications between energy storage controller 506 and various external systems or devices (e.g., BMS 606, subplants 520-530, utilities 510, etc.). For example, energy storage controller 506 may receive information from BMS 606 indicating one or more measured states of the controlled building (e.g., temperature, humidity, electric loads, etc.) and one or more states of subplants 520-530 (e.g., equipment status, power consumption, equipment availability, etc.). Communications interface 636 may receive inputs from BMS 606 and/or subplants 520-530 and may provide operating parameters (e.g., on/off decisions, setpoints, etc.) to subplants 520-530 via BMS 606. The operating parameters may cause subplants 520-530 to activate, deactivate, or adjust a setpoint for various devices thereof.

Still referring to FIG. 6, processing circuit 607 is shown to include a processor 608 and memory 610. Processor 608 may be a general purpose or specific purpose processor, an application specific integrated circuit (ASIC), one or more field programmable gate arrays (FPGAs), a group of processing components, or other suitable processing components. Processor 608 may be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 may be communicably connected to processor 608 via processing circuit 607 and may include computer code for executing (e.g., by processor 608) one or more processes described herein.

Memory 610 is shown to include a building status monitor 624. Energy storage controller 506 may receive data regarding the overall building or building space to be heated or cooled by system 500 via building status monitor 624. In an exemplary embodiment, building status monitor 624 may include a graphical user interface component configured to provide graphical user interfaces to a user for selecting building requirements (e.g., overall temperature parameters, selecting schedules for the building, selecting different temperature levels for different building zones, etc.).

Energy storage controller 506 may determine on/off configurations and operating setpoints to satisfy the building requirements received from building status monitor 624. In some embodiments, building status monitor 624 receives, collects, stores, and/or transmits cooling load requirements, building temperature setpoints, occupancy data, weather data, energy data, schedule data, and other building parameters. In some embodiments, building status monitor 624 stores data regarding energy costs, such as pricing information available from utilities 510 (energy charge, demand charge, etc.).

Still referring to FIG. 6, memory 610 is shown to include a load/rate predictor 622. Load/rate predictor 622 may be configured to predict the thermal and electrical energy loads ($\ell$) of the building or campus for each time step k (e.g., k=1 . . . n) of an optimization period. Load/rate predictor 622 is shown receiving weather forecasts from a weather service 604. In some embodiments, load/rate predictor 622 predicts the energy loads $\hat{\ell}_k$ as a function of the weather forecasts. In some embodiments, load/rate predictor 622 uses feedback from BMS 606 to predict loads $\hat{\ell}_k$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 622 receives a measured electric load and/or previous measured load data from BMS 606 (e.g., via building status monitor 624). Load/rate predictor 622 may predict loads $\hat{l}_k$ as a function of a given weather forecast ($\hat{\phi}_w$), a day type (clay), the time of day (t), and previous measured load data ($Y_{k-1}$). Such a relationship is expressed in the following equation:

$$\hat{l}_k = f(\hat{\phi}_w, day, t | Y_{k-1})$$

In some embodiments, load/rate predictor 622 uses a deterministic plus stochastic model trained from historical load data to predict loads $\hat{l}_k$. Load/rate predictor 622 may use any of a variety of prediction methods to predict loads $\hat{l}_k$ (e.g., linear regression for the deterministic portion and an AR model for the stochastic portion). Load/rate predictor 622 may predict one or more different types of loads for the building or campus. For example, load/rate predictor 622 may predict a hot water load $\hat{l}_{Hot,k}$, a cold water load $\hat{l}_{Cold,k}$, and an electricity load $\hat{l}_{Elec}$ for each time step k within the prediction window. In some embodiments, load/rate predictor 622 makes load/rate predictions using the techniques described in U.S. patent application Ser. No. 14/717,593.

Load/rate predictor 622 is shown receiving utility rates from utilities 510. Utility rates may indicate a cost or price per unit of a resource (e.g., electricity, natural gas, water, etc.) provided by utilities 510 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 510 or predicted utility rates estimated by load/rate predictor 622.

In some embodiments, the utility rates include demand charges for one or more resources provided by utilities 510. A demand charge may define a separate cost imposed by utilities 510 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 630 may be configured to account for demand charges in the high level optimization process performed by high level optimizer 632. Utilities 510 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 622 may store the predicted loads $\hat{l}_k$ and the utility rates in memory 610 and/or provide the predicted loads $\hat{l}_k$ and the utility rates to demand response optimizer 630.

Still referring to FIG. 6, memory 610 is shown to include an incentive estimator 620. Incentive estimator 620 may be configured to estimate the revenue generation potential of participating in various incentive-based demand response (IBDR) programs. In some embodiments, incentive estimator 620 receives an incentive event history from incentive programs 602. The incentive event history may include a history of past IBDR events from incentive programs 602. An IBDR event may include an invitation from incentive programs 602 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 620 may use the incentive event history to estimate IBDR event probabilities during the optimization period.

Incentive estimator 620 is shown providing incentive predictions to demand response optimizer 630. The incentive predictions may include the estimated IBDR probabilities, estimated participation requirements, an estimated amount of revenue from participating in the estimated IBDR events, and/or any other attributes of the predicted IBDR events. Demand response optimizer 630 may use the incentive predictions along with the predicted loads $\hat{l}_k$ and utility rates from load/rate predictor 622 to determine an optimal set of control decisions for each time step within the optimization period.

Still referring to FIG. 6, memory 610 is shown to include a demand response optimizer 630. Demand response optimizer 630 may perform a cascaded optimization process to optimize the performance of energy storage system 500. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating energy storage system 500. Control decisions made by high level optimizer 632 may include, for example, load setpoints for each of generator subplants 520, charge/discharge rates for each of storage subplants 530, resource purchase amounts for each type of resource purchased from utilities 510, and/or an amount of each resource sold to energy purchasers 504. In other words, the control decisions may define resource allocation at each time step. The control decisions made by high level optimizer 632 are based on the statistical estimates of incentive event probabilities and revenue generation potential for various IBDR events as well as the load and rate predictions.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. In some embodiments, low level optimizer 634 receives actual incentive events from incentive programs 602. Low level optimizer 634 may determine whether to participate in the incentive events based on the resource allocation set by high level optimizer 632. For example, if insufficient resources have been allocated to a particular IBDR program by high level optimizer 632 or if the allocated resources have already been used, low level optimizer 634 may determine that energy storage system 500 will not participate in the IBDR program and may ignore the IBDR event. However, if the required resources have been allocated to the IBDR program and are available in storage subplants 530, low level optimizer 634 may determine that system 500 will participate in the IBDR program in response to the IBDR event. The cascaded optimization process performed by demand response optimizer 630 is described in greater detail in U.S. patent application Ser. No. 15/247,885.

Still referring to FIG. 6, memory 610 is shown to include a subplant control module 628. Subplant control module 628 may store historical data regarding past operating statuses, past operating setpoints, and instructions for calculating and/or implementing control parameters for subplants 520-530. Subplant control module 628 may also receive, store, and/or transmit data regarding the conditions of individual devices of the subplant equipment, such as operating efficiency, equipment degradation, a date since last service, a lifespan parameter, a condition grade, or other device-specific data. Subplant control module 628 may receive data from subplants 520-530 and/or BMS 606 via communications interface 636. Subplant control module 628 may also receive and store on/off statuses and operating setpoints from low level optimizer 634.

Data and processing results from demand response optimizer 630, subplant control module 628, or other modules of energy storage controller 506 may be accessed by (or pushed to) monitoring and reporting applications 626. Monitoring and reporting applications 626 may be configured to generate real time "system health" dashboards that can be viewed and navigated by a user (e.g., a system engineer). For example, monitoring and reporting applications 626 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 6, energy storage controller 506 may include one or more GUI servers, web services 612, or GUI engines 614 to support monitoring and reporting applications 626. In various embodiments, applications 626, web services 612, and GUI engine 614 may be provided as separate components outside of energy storage controller 506 (e.g., as part of a smart building manager). Energy storage controller 506 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Energy storage controller 506 may be configured to provide the results of any such processing to other databases, tables, XML files, or other data structures for further querying, calculation, or access by, for example, external monitoring and reporting applications.

Energy storage controller 506 is shown to include configuration tools 616. Configuration tools 616 can allow a user to define (e.g., via graphical user interfaces, via prompt-driven "wizards," etc.) how energy storage controller 506 should react to changing conditions in the energy storage subsystems. In an exemplary embodiment, configuration tools 616 allow a user to build and store condition-response scenarios that can cross multiple energy storage system devices, multiple building systems, and multiple enterprise control applications (e.g., work order management system applications, entity resource planning applications, etc.). For example, configuration tools 616 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 616 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Planning Tool

Figure 7:
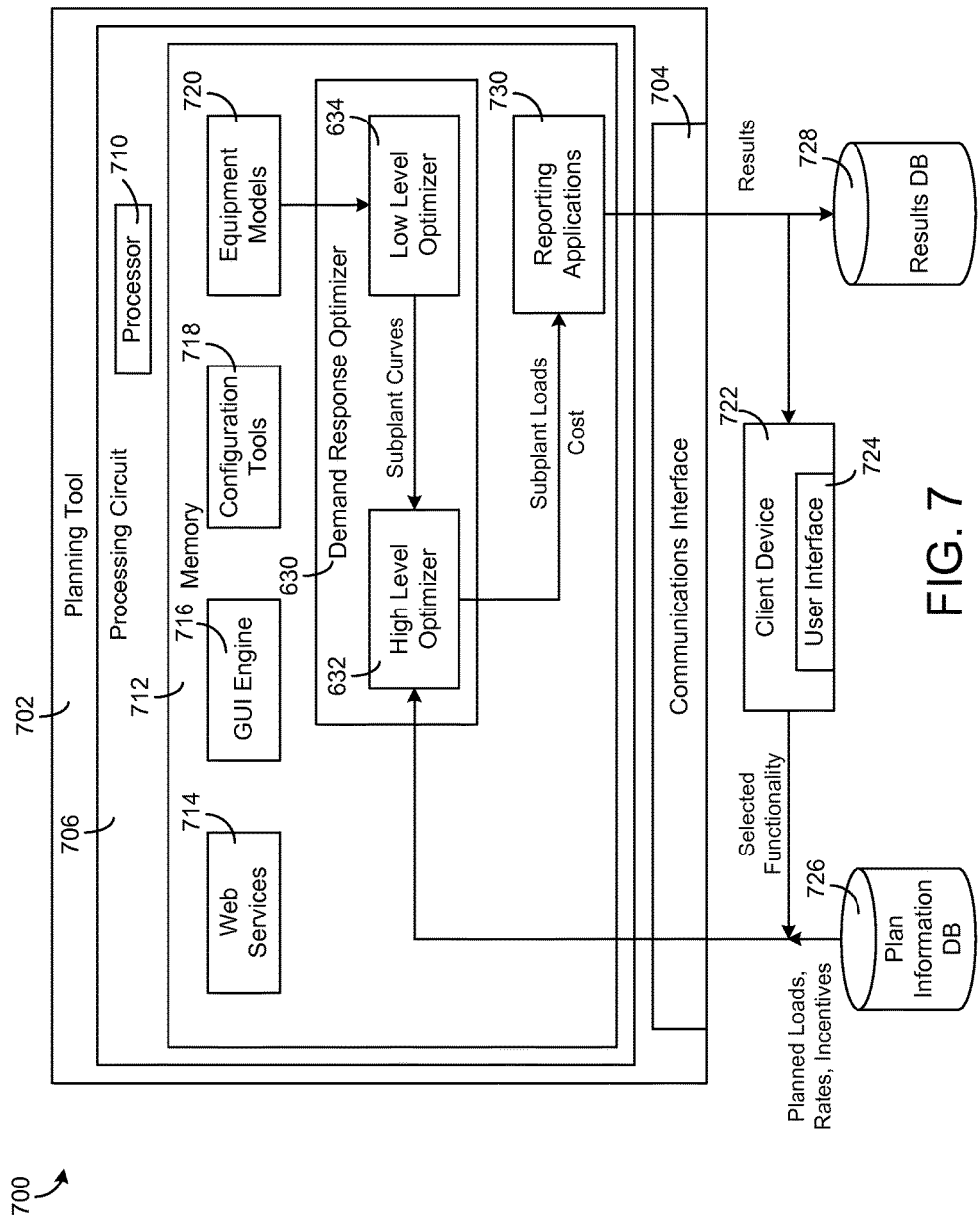
FIG. 7 is a block diagram of a planning tool which can be used to determine the benefits of investing in a battery asset and calculate various financial metrics associated with the investment, according to an exemplary embodiment.

Referring now to FIG. 7, a block diagram of a planning system 700 is shown, according to an exemplary embodiment. Planning system 700 may be configured to use demand response optimizer 630 as part of a planning tool 702 to simulate the operation of an energy storage system (e.g., system 500) over a predetermined time period (e.g., a day, a month, a week, a year, etc.) for planning, budgeting, and/or design considerations. When implemented in planning tool 702, demand response optimizer 630 may operate in a similar manner as described with reference to FIG. 6. For example, demand response optimizer 630 may use building loads and utility rates to determine an optimal resource allocation to minimize cost over a planning period. However, planning tool 702 may not be responsible for real-time control of a building management system or energy storage system.

Planning tool 702 can be configured to determine the benefits of investing in a battery asset and the financial metrics associated with the investment. Such financial metrics can include, for example, the internal rate of return (IRR), net present value (NPV), and/or simple payback period (SPP). Planning tool 702 can also assist a user in determining the size of the battery which yields optimal financial metrics such as maximum NPV or a minimum SPP. In some embodiments, planning tool 702 allows a user to specify a battery size and automatically determines the benefits of the battery asset from participating in selected IBDR programs while performing PBDR, as described with reference to FIG. 5. In some embodiments, planning tool 702 is configured to determine the battery size that minimizes SPP given the IBDR programs selected and the requirement of performing PBDR. In some embodiments, planning tool 702 is configured to determine the battery size that maximizes NPV given the IBDR programs selected and the requirement of performing PBDR.

In any of the aforementioned cases, planning tool 702 may allow the user to select one or more which IBDR programs in which to participate. The IBDR program options available may include frequency regulation (FR) and economic load demand response (ELDR), among others. Additionally, the user may be given the option of modifying and entering several inputs pertinent to each program, which will be explained in greater detail below. Planning tool 702 may calculate the savings from PBDR and the revenue generated corresponding to the selected IBDR programs, in addition to the pro forma (financial statement) of the investment up to 20 years. The pro forma may include total annual benefit, battery performance parameters (e.g., cost of annual energy capacity augmentation), cash flow, accumulated cash balance, NPV, IRR, and SPP. Examples of how these financial metrics are calculated are provided below.

In planning tool 702, high level optimizer 632 may receive planned loads and utility rates for the entire planning period. The planned loads and utility rates may be defined by input received from a user via a client device 722 (e.g., user-defined, user selected, etc.) and/or retrieved from a plan information database 726. High level optimizer 632 uses the planned loads and utility rates in conjunction with subplant curves from low level optimizer 634 to determine an optimal resource allocation (i.e., an optimal dispatch schedule) for a portion of the planning period.

The portion of the planning period over which high level optimizer 632 optimizes the resource allocation (i.e., the optimization period) may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimizer 632 requests all of the subplant curves used in the simulation from low level optimizer 634 at the beginning of the simulation. Since the planned loads and environmental conditions are known for the entire planning period, high level optimizer 632 may retrieve all of the relevant subplant curves at the beginning of the simulation. In some embodiments, low level optimizer 634 generates functions that map subplant production to equipment level production and resource use when the subplant curves are provided to high level optimizer 632. These subplant to equipment functions may be used to calculate the individual equipment production and resource use (e.g., in a post-processing module) based on the results of the simulation.

Still referring to FIG. 7, planning tool 702 is shown to include a communications interface 704 and a processing circuit 706. Communications interface 704 may include wired or wireless interfaces (e.g., jacks, antennas, transmitters, receivers, transceivers, wire terminals, etc.) for conducting data communications with various systems, devices, or networks. For example, communications interface 704 may include an Ethernet card and port for sending and receiving data via an Ethernet-based communications network and/or a Wi-Fi transceiver for communicating via a wireless communications network. Communications interface 704 may be configured to communicate via local area networks or wide area networks (e.g., the Internet, a building WAN, etc.) and may use a variety of communications protocols (e.g., BACnet, IP, LON, etc.).

Communications interface 704 may be a network interface configured to facilitate electronic data communications between planning tool 702 and various external systems or devices (e.g., client device 722, results database 728, plan information database 726, etc.). For example, planning tool 702 may receive planned loads and utility rates from client device 722 and/or plan information database 726 via communications interface 704. Planning tool 702 may use communications interface 704 to output results of the simulation to client device 722 and/or to store the results in results database 728.

Still referring to FIG. 7, processing circuit 706 is shown to include a processor 710 and memory 712. Processor 710 may be a general purpose or specific purpose processor, an application specific integrated circuit (ASIC), one or more field programmable gate arrays (FPGAs), a group of processing components, or other suitable processing components. Processor 710 may be configured to execute computer code or instructions stored in memory 712 or received from other computer readable media (e.g., CDROM, network storage, a remote server, etc.).

Memory 712 may include one or more devices (e.g., memory units, memory devices, storage devices, etc.) for storing data and/or computer code for completing and/or facilitating the various processes described in the present disclosure. Memory 712 may include random access memory (RAM), read-only memory (ROM), hard drive storage, temporary storage, non-volatile memory, flash memory, optical memory, or any other suitable memory for storing software objects and/or computer instructions. Memory 712 may include database components, object code components, script components, or any other type of information structure for supporting the various activities and information structures described in the present disclosure. Memory 712 may be communicably connected to processor 710 via processing circuit 706 and may include computer code for executing (e.g., by processor 710) one or more processes described herein.

Still referring to FIG. 7, memory 712 is shown to include a GUI engine 716, web services 714, and configuration tools 718. In an exemplary embodiment, GUI engine 716 includes a graphical user interface component configured to provide graphical user interfaces to a user for selecting or defining plan information for the simulation (e.g., planned loads, utility rates, incentive rates, locational marginal prices, photovoltaic generation, environmental conditions, etc.). Web services 714 may allow a user to interact with planning tool 702 via a web portal and/or from a remote system or device (e.g., an enterprise control application).

Configuration tools 718 can allow a user to define (e.g., via graphical user interfaces, via prompt-driven "wizards," etc.) various parameters of the simulation. For example, the user can specify a size or capacity for each asset or subplant of the energy storage system, the number and type of subplants, the devices within each subplant, the subplant curves, device-specific efficiency curves, the duration of the simulation, the duration of the prediction window, the duration of each time step, and/or various other types of plan information related to the simulation. Configuration tools 718 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 726) and adapt it or enable it for use in the simulation.

In some embodiments, configuration tools 718 prompt the user to select one or more optional functions that can be used during the simulation. For example, the user can select one or more IBDR programs in which to participate (e.g., FR, ELDR, etc.). Configuration tools 718 may prompt the user to select one or more financial metrics to optimize (e.g., IRR, NPV, SPP, etc.). In some embodiments, configuration tools 718 generate various input sheets which allow the user to enter plan data for use during the simulation (e.g., utility rates, demand charges, peak load contribution charges, electric load, photovoltaic generation rates, locational marginal prices, FR incentives, etc.). The user can specify plan data for each hour of the planning period and enter such data into the input sheets.

Still referring to FIG. 7, memory 712 is shown to include demand response optimizer 630. Demand response optimizer 630 may use the planned loads and utility rates to determine an optimal resource allocation over a prediction window. The operation of demand response optimizer 630 may be the same or similar as previously described with reference to FIG. 6. With each iteration of the optimization process, demand response optimizer 630 may shift the prediction window forward and apply the optimal resource allocation for the portion of the planning period no longer in the prediction window. Demand response optimizer 630 may use the new plan information at the end of the prediction window to perform the next iteration of the optimization process. Demand response optimizer 630 may output the applied resource allocation to reporting applications 730 for presentation to a client device 722 (e.g., via user interface 724) or storage in results database 728. In some embodiments, demand response optimizer 630 stores the results of the optimization in output sheets, which can be presented to the user via user interface 724.

Still referring to FIG. 7, memory 712 is shown to include reporting applications 730. Reporting applications 730 may receive the optimized resource allocations from demand response optimizer 630 and, in some embodiments, costs associated with the optimized resource allocations. Reporting applications 730 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation. An exemplary output that may be generated by reporting applications 730 is shown in FIG. 8.

Figure 8:
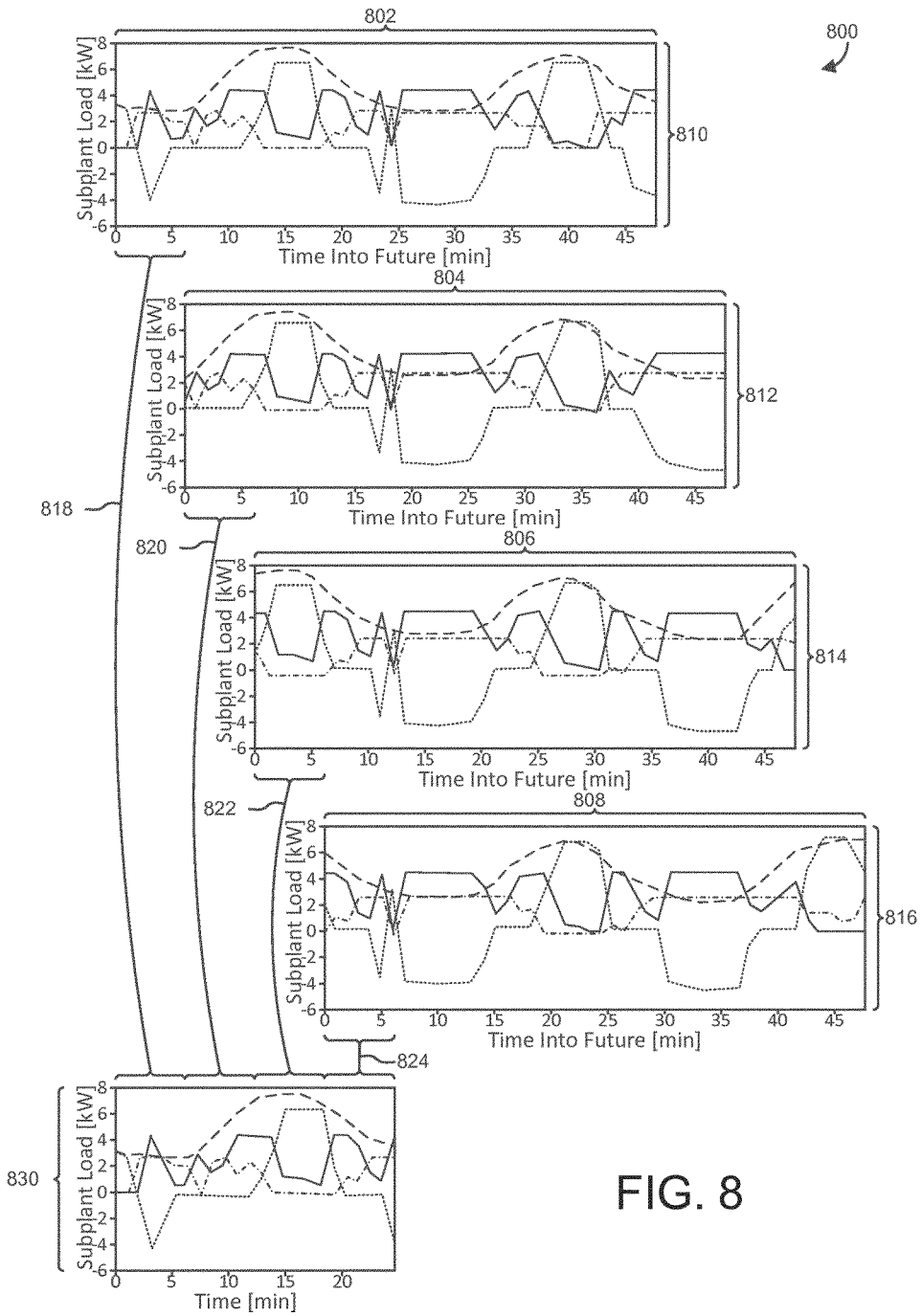
FIG. 8 is a drawing illustrating the operation of the planning tool of FIG. 7, according to an exemplary embodiment.

Referring now to FIG. 8, several graphs 800 illustrating the operation of planning tool 702 are shown, according to an exemplary embodiment. With each iteration of the optimization process, planning tool 702 selects an optimization period (i.e., a portion of the planning period) over which the optimization is performed. For example, planning tool 702 may select optimization period 802 for use in the first iteration. Once the optimal resource allocation 810 has been determined, planning tool 702 may select a portion 818 of resource allocation 810 to send to plant dispatch 830. Portion 818 may be the first b time steps of resource allocation 810. Planning tool 702 may shift the optimization period 802 forward in time, resulting in optimization period 804. The amount by which the prediction window is shifted may correspond to the duration of time steps b.

Planning tool 702 may repeat the optimization process for optimization period 804 to determine the optimal resource allocation 812. Planning tool 702 may select a portion 820 of resource allocation 812 to send to plant dispatch 830. Portion 820 may be the first b time steps of resource allocation 812. Planning tool 702 may then shift the prediction window forward in time, resulting in optimization period 806. This process may be repeated for each subsequent optimization period (e.g., optimization periods 806, 808, etc.) to generate updated resource allocations (e.g., resource allocations 814, 816, etc.) and to select portions of each resource allocation (e.g., portions 822, 824) to send to plant dispatch 830. Plant dispatch 830 includes the first b time steps 818-824 from each of optimization periods 802-808. Once the optimal resource allocation is compiled for the entire planning period, the results may be sent to reporting applications 730, results database 728, and/or client device 722, as described with reference to FIG. 7. Additional examples of user interfaces which can be generated by planning tool 702 are described in greater detail with reference to FIGS. 16A-29.

High Level Optimizer

Figure 9:
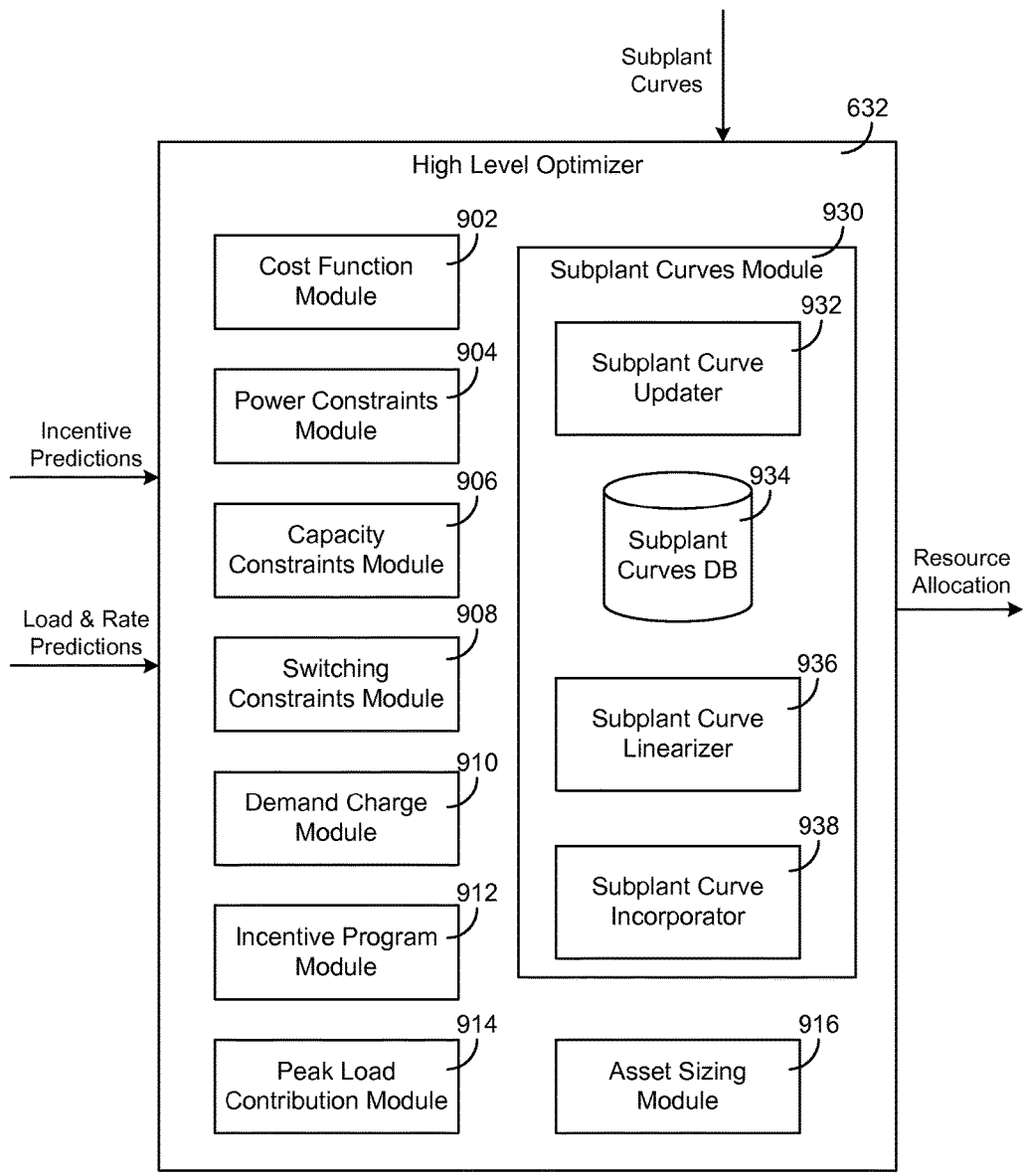
FIG. 9 is a block diagram of a high level optimizer which can be implemented as a component of the controller of FIG. 6 or the planning tool of FIG. 7, according to an exemplary embodiment.

Referring now to FIG. 9, a block diagram illustrating high level optimizer 632 in greater detail is shown, according to an exemplary embodiment. In some embodiments, high level optimizer 632 may be implemented as a component of energy storage controller 506, as described with reference to FIGS. 5-6. In other embodiments, high level optimizer 632 may be implemented as a component of planning tool 702, as described with reference to FIGS. 7-8.

High level optimizer 632 may receive load and rate predictions from load/rate predictor 622, incentive predictions from incentive estimator 620, and subplant curves from low level optimizer 634. High level optimizer 632 may determine an optimal resource allocation across energy storage system 500 as a function of the load and rate predictions, the incentive predictions, and the subplant curves. The optimal resource allocation may include an amount of each resource purchased from utilities 510, an amount of each input and output resource of generator subplants 520, an amount of each resource stored or withdrawn from storage subplants 530, and/or an amount of each resource sold to energy purchasers 504. In some embodiments, the optimal resource allocation maximizes the economic value of operating energy storage system 500 while satisfying the predicted loads for the building or campus.

High level optimizer 632 can be configured to optimize the utilization of a battery asset, such as battery 108, battery 306, and/or electrical energy storage subplant 533. A battery asset can be used to participate in IBDR programs which yield revenue and to reduce the cost of energy and the cost incurred from peak load contribution charges. High level optimizer 632 can use an optimization algorithm to optimally allocate a battery asset (e.g., by optimally charging and discharging the battery) to maximize its total value. In a planning tool framework, high level optimizer 632 can perform the optimization iteratively to determine optimal battery asset allocation for an entire planning period (e.g., an entire year), as described with reference to FIG. 8. The optimization process can be expanded to include ELDR and can account for multiple demand charges and peak load contribution charges. High level optimizer 632 can allocate the battery asset at each time step (e.g., each hour) over a given horizon such that energy and demand costs are minimized and FR revenue maximized. These and other features of high level optimizer 632 are described in detail below.

Cost Function

Still referring to FIG. 9, high level optimizer 632 is shown to include a cost function module 902. Cost function module 902 can generate a cost function or objective function which represents the total operating cost of a system over a time horizon (e.g., one month, one year, one day, etc.). The system can include any of the systems previously described (e.g., frequency response optimization system 100, photovoltaic energy system 300, energy storage system 500, planning system 700, etc.) or any other system in which high level optimizer 632 is implemented. In some embodiments, the cost function can be expressed generically using the following equation:

$$\arg\min_{x} J(x)$$

where J(x) is defined as follows:

$$J(x) = \sum_{sources}\sum_{horizon} \text{cost}(purchase_{resource,time}, time) - \sum_{incentives}\sum_{horizon} \text{revenue}(ReservationAmount)$$

The first term in the previous equation represents the total cost of all resources purchased over the optimization horizon. Resources can include, for example, water, electricity, natural gas, or other types of resources purchased from a utility or other outside entity. The second term in the equation represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

High level optimizer 632 can optimize the cost function J(x) subject to the following constraint, which guarantees the balance between resources purchased, produced, discharged, consumed, and requested over the optimization horizon:

$$\sum_{sources} purchase_{resource,time} + \sum_{subplants} \text{produces}(x_{internal,time}, x_{external,time}, v_{uncontrolled,time}) - \sum_{subplants} \text{consumes}(x_{internal,time}, x_{external,time}, v_{uncontrolled,time}) + \sum_{storages} \text{discharges}_{resource}(x_{internal,time}, x_{external,time}) - \sum_{sinks} \text{requests}_{resource} = 0 \; \forall \text{ resources}, \forall \text{ time} \in \text{horizon}$$

where $x_{internal,time}$ and $x_{external,time}$ are internal and external decision variables and $v_{uncontrolled,time}$ includes uncontrolled variables.

The first term in the previous equation represents the total amount of each resource (e.g., electricity, water, natural gas, etc.) purchased from each source (e.g., utilities 510) over the optimization horizon. The second term represents the total consumption of each resource within the system (e.g., by generator subplants 520) over the optimization horizon. The third term represents the total amount of each resource discharged from storage (e.g., storage subplants 530) over the optimization horizon. Positive values indicate that the resource is discharged from storage, whereas negative values indicate that the resource is charged or stored. The fourth term represents the total amount of each resource requested by various resource sinks (e.g., building 502, energy purchasers 504, or other resource consumers) over the optimization horizon. Accordingly, this constraint ensures that the total amount of each resource purchased, produced, or discharged from storage is equal to the amount of each resource consumed, stored, or provided to the resource sinks.

In some embodiments, cost function module 902 separates the purchase cost of one or more resources into multiple terms. For example, cost function module 902 can separate the purchase cost of a resource into a first term corresponding to the cost per unit of the resource purchased (e.g., $/kWh of electricity, $/liter of water, etc.) and a second term corresponding to one or more demand charges. A demand charge is a separate charge on the consumption of a resource which depends on the maximum or peak resource consumption over a given period (i.e., a demand charge period). Cost function module 902 can express the cost function using the following equation:

$$J(x) = \sum_{s \in sources}\left[\sum_{q \in demands_s} w_{demand,s,q} r_{demand,s,q} \max_{i \in demands_{s,q}}(purchase_{s,i}) + \sum_{horizon} r_{s,i} purchase_{s,i}\right] - \sum_{incentives}\sum_{horizon} \text{revenue}(ReservationAmount)$$

where $r_{demand,s,q}$ is the qth demand charge associated with the peak demand of the resource provided by source s over the demand charge period, $w_{demand,s,q}$ is the weight adjustment of the qth demand charge associated with source s, and the max( ) term indicates the maximum amount of the resource purchased from source s at any time step i during the demand charge period. The variable $r_{s,i}$ indicates the cost per unit of the resource purchased from source s and the variable $purchase_{s,i}$ indicates the amount of the resource purchased from source s during the ith time step of the optimization period.

In some embodiments, the energy storage system in which high level optimizer 632 is implemented includes a battery asset (e.g., one or more batteries) configured to store and discharge electricity. If the battery asset is the only type of energy storage, cost function module 902 can simplify the cost function J(x) to the following equation:

$$J(x) = -\sum_{i=k}^{k+h-1} r_{e_i} P_{bat_i} - \sum_{i=k}^{k+h-1} r_{FR_i} P_{FR_i} + \sum_{i=k}^{k+h-1} r_{s_i}|P_{bat_i} - P_{bat_{i-1}}| + w_d r_d \max_i(-P_{bat_i} + eLoad_i)$$

where h is the duration of the optimization horizon, $P_{bat_i}$ is the amount of power (e.g., kW) discharged from the battery asset during the ith time step of the optimization horizon for use in reducing the amount of power purchased from an electric utility, $r_{e_i}$ is the price of electricity (e.g., $/kWh) at time step i, $P_{FR,i}$ is the battery power (e.g., kW) committed to frequency regulation participation during time step i, $r_{FR_i}$ is the incentive rate (e.g., $/kWh) for participating in frequency regulation during time step i, $r_d$ is the applicable demand charge (e.g., $/kWh) associated with the maximum electricity consumption during the corresponding demand charge period, $w_d$ is a weight adjustment of the demand charge over the horizon, and the max( ) term selects the maximum amount electricity purchased from the electric utility (e.g., kW) during any time step i of the applicable demand charge period.

In the previous expression of the cost function J(x), the first term represents the cost savings resulting from the use of battery power to satisfy the electric demand of the facility relative to the cost which would have been incurred if the electricity were purchased from the electric utility. The second term represents the amount of revenue derived from participating in the frequency regulation program. The third term represents a switching penalty imposed for switching the battery power $P_{bat}$ between consecutive time steps. The fourth term represents the demand charge associated with the maximum amount of electricity purchased from the electric utility. The amount of electricity purchased may be equal to the difference between the electric load of the facility $eLoad_i$ (i.e., the total amount of electricity required) at time step i and the amount of power discharged from the battery asset $P_{bat_i}$ at time step i. In a planning tool framework, historical data of the electric load eLoad over the horizon can be provided as a known input. In an operational mode, the electric load eLoad can be predicted for each time step of the optimization period.

In the previous expression of the cost function J(x), the switching penalty term and the demand charge term are nonlinear. In order to solve the optimization problem using linear programming, cost function module 902 can introduce two auxiliary variables. An auxiliary switching variable $s_i$ can be substituted for the expression $|P_{bat_i}-P_{bat_{i-1}}|$ and constrained to be greater than or equal to the difference between $P_{bat_i}$ and $P_{bat_{i-1}}$. Similarly, an auxiliary demand charge variable d can be substituted for the expression $\max_i(-P_{bat_i}+eLoad_i)$ and constrained to be greater than or equal to the maximum of $-P_{bat_i}+eLoad_i$ for each time step. Constraints on the auxiliary variables $s_i$ and d are described in greater detail below. With the auxiliary variables, the cost function can be rewritten as follows:

$$J(x) = -\sum_{i=k}^{k+h-1} r_{e_i} P_{bat_i} - \sum_{i=k}^{k+h-1} r_{FR_i} P_{FR_i} + \sum_{i=k}^{k+h-1} r_{s_i} s_i + w_d r_d$$

Optimization Constraints

Still referring to FIG. 9, high level optimizer 632 is shown to include a power constraints module 904. Power constraints module 904 may be configured to impose one or more power constraints on the objective function J(x). In some embodiments, power constraints module 904 generates and imposes the following constraints:

$$P_{bat_i}+P_{FR_i} \leq P_{eff}$$

$$-P_{bat_i}+P_{FR_i} \leq P_{eff}$$

$$P_{bat_i}+P_{FR_i} \leq eLoad_i$$

where $P_{bat_i}$ is the amount of power discharged from the battery at time step i for use in satisfying electric demand and reducing the demand charge, $P_{FR_i}$ is the amount of battery power committed to frequency regulation at time step i, $P_{eff}$ is the effective power available (e.g., the maximum rate at which the battery can be charged or discharged), and $eLoad_i$ is the total electric demand at time step i.

The first two power constraints ensure that the battery is not charged or discharged at a rate that exceeds the maximum battery charge/discharge rate $P_{eff}$. If the system includes photovoltaic (PV) power generation, the effective power available $P_{eff}$ can be calculated as follows:

$$P_{eff}=P_{rated}-P_{PV\,FirmingReserve}$$

where $P_{rated}$ is the rated capacity of the battery and $P_{PV\,FirmingReserve}$ is the PV firming reserve power. The third power constraint ensures that energy stored in the battery is not sold or exported to the energy grid. In some embodiments, power constraints module 904 can remove the third power constraint if selling energy back to the energy grid is a desired feature or behavior of the system.

Still referring to FIG. 9, high level optimizer 632 is shown to include a capacity constraints module 906. Capacity constraints module 906 may be configured to impose one or more capacity constraints on the objective function J(x). The capacity constraints may be used to relate the battery power $P_{bat}$ charged or discharged during each time step to the capacity and state-of-charge (SOC) of the battery. The capacity constraints may ensure that the SOC of the battery is maintained within acceptable lower and upper bounds and that sufficient battery capacity is available for frequency regulation. In some embodiments, the lower and upper bounds are based on the battery capacity needed to reserve the amount of power committed to frequency regulation $P_{FR_i}$ during each time step i.

In some embodiments, capacity constraints module 906 generates two sets of capacity constraints. One set of capacity constraints may apply to the boundary condition at the end of each time step i, whereas the other set of capacity constraints may apply to the boundary condition at the beginning of the next time step i+1. For example, if a first amount of battery capacity is reserved for frequency regulation during time step i and a second amount of battery capacity is reserved for frequency regulation during time step i+1, the boundary point between time step i and i+1 may be required to satisfy the capacity constraints for both time step i and time step i+1. This ensures that the decisions made for the power committed to frequency regulation during the current time step i and the next time step i+1 represent a continuous change in the SOC of the battery.

In some embodiments, capacity constraints module 906 generates the following capacity constraints:

$$\begin{cases} C_a - \sum_{n=k}^{i} P_{bat_n} \leq C_{eff} - C_{FR}P_{FR_i} \\ C_a - \sum_{n=k}^{i} P_{bat_n} \geq C_{FR}P_{FR_i} \end{cases} \forall\, i = k \ldots k+h-1$$

$$\begin{cases} C_a - \sum_{n=k}^{i} P_{bat_n} \leq C_{eff} - C_{FR}P_{FR_{i+1}} \\ C_a - \sum_{n=k}^{i} P_{bat_n} \geq C_{FR}P_{FR_{i+1}} \end{cases} \forall\, i = k \ldots k+h-2$$

where $C_a$ is the available battery capacity (e.g., kWh), $C_{FR}$ is the frequency regulation reserve capacity (e.g., kWh/kW) which translates the amount of battery power committed to frequency regulation $P_{FR}$ into an amount of energy needed to be reserved, and $C_{eff}$ is the effective capacity of the battery.

The first set of constraints ensures that the battery capacity at the end of each time step i (i.e., available capacity $C_a$ minus the battery power discharged through time step i) is maintained between the lower capacity bound $C_{FR}P_{FR_i}$ and the upper capacity bound $C_{eff}-C_{FR}P_{FR_i}$ for time step i. The lower capacity bound $C_{FR}P_{FR_i}$ represents the minimum capacity required to reserve $P_{FR_i}$ for frequency regulation during time step i, whereas the upper capacity bound $C_{eff}-C_{FR}P_{FR_i}$ represents maximum capacity required to reserve $P_{FR_i}$ for frequency regulation during time step i. Similarly, the second set of constraints ensures that the battery capacity at the end of each time step i (i.e., available capacity $C_a$ minus the battery power discharged through time step i) is maintained between the lower capacity bound $C_{FR}P_{FR_{i+1}}$ and the upper capacity bound $C_{eff}-C_{FR}P_{FR_{i+1}}$ for time step i+1. The lower capacity bound $C_{FR}P_{FR_{i+1}}$ represents the minimum capacity required to reserve $P_{FR_{i+1}}$ for frequency regulation during time step i+1, whereas the upper capacity bound $C_{eff}-C_{FR}P_{FR_{i+1}}$ represents maximum capacity required to reserve $P_{FR_{i+1}}$ for frequency regulation during time step i+1.

In some embodiments, capacity constraints module 906 calculates the effective capacity of the battery $C_{eff}$ as a percentage of the rated capacity of the battery. For example, if frequency regulation and photovoltaic power generation are both enabled and the SOC control margin is non-zero, capacity constraints module 906 can calculate the effective capacity of the battery $C_{eff}$ using the following equation:

$$C_{eff} = (1 - C_{FR} - 2C_{socCM})C_{rated} - C_{PV\ FirmingReserve}$$

where $C_{socCM}$ is the control margin and $C_{PV\ FirmingReserve}$ is the capacity reserved for photovoltaic firming.

Figure 10:
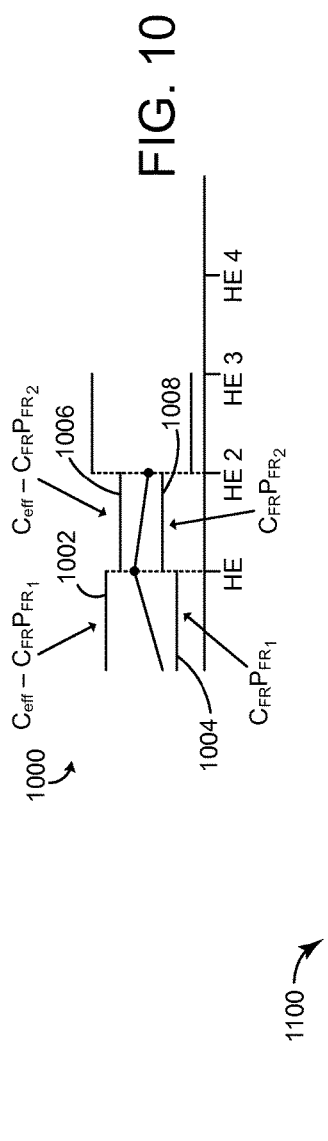
FIG. 10 is a graph illustrating capacity constraints which can be imposed by the high level optimizer of FIG. 9, according to an exemplary embodiment.

Referring now to FIG. 10, a graph 1000 illustrating the capacity constraints imposed by capacity constraints module 906 is shown, according to an exemplary embodiment. During the first hour ending at hour end 1 (HE1), the capacity constraints ensure that the battery capacity is maintained between a first lower capacity bound 1004 $C_{FR}P_{FR_1}$ and a first upper capacity bound 1002 $C_{eff}-C_{FR}P_{FR_1}$. Lower capacity bound 1004 $C_{FR}P_{FR_1}$ represents the minimum capacity required to reserve $P_{FR_1}$ for frequency regulation during the first hour, whereas upper capacity bound 1002 $C_{eff}-C_{FR}P_{FR_1}$ represents maximum capacity required to reserve $P_{FR_1}$ for frequency regulation during the first hour.

During the second hour ending at HE2, the capacity constraints ensure that the battery capacity) is maintained between a second lower capacity bound 1008 $C_{FR}P_{FR_2}$ and a second upper capacity bound 1006 $C_{eff}-C_{FR}P_{FR_2}$. Lower capacity bound 1008 $C_{FR}P_{FR_2}$ represents the minimum capacity required to reserve $P_{FR_2}$ for frequency regulation during the second hour, whereas upper capacity bound 1006 $C_{eff}-C_{FR}P_{FR_2}$ represents maximum capacity required to reserve $P_{FR_2}$ for frequency regulation during the second hour.

Referring again to FIG. 9, high level optimizer 632 is shown to include a switching constraints module 908. Switching constraints module 908 may be configured to impose one or more switching constraints on the cost function J(x). As previously described, the cost function J(x) may include the following switching term:

$$\sum_{i=k}^{k+h-1} r_{s_i} |P_{bat_i} - P_{bat_{i-1}}|$$

which functions as a penalty for switching the battery power $P_{bat}$ between consecutive time steps i and i−1. Notably, the switching term is nonlinear as a result of the absolute value function.

Switching constraints module 908 can impose constraints which represent the nonlinear switching term in a linear format. For example, switching constraints module 908 can introduce an auxiliary switching variable $s_i$ and constrain the auxiliary switching variable to be greater than the difference between the battery power $P_{bat_i}$ at time step i and the battery power $P_{bat_{i-1}}$ at time step i−1, as shown in the following equations:

$$s_i > P_{bat_i} - P_{bat_{i-1}}$$

$$s_i > P_{bat_{i-1}} - P_{bat_i} \forall i = k \ldots k+h-1$$

Switching constraints module 908 can replace the nonlinear switching term in the cost function J(x) with the following linearized term:

$$\sum_{i=k}^{k+h-1} r_{s_i} s_i$$

which can be optimized using any of a variety of linear optimization techniques (e.g., linear programming) subject to the constraints on the auxiliary switching variable $s_i$.

Demand Charge Incorporation

Still referring to FIG. 9, high level optimizer 632 is shown to include a demand charge module 910. Demand charge module 910 can be configured to modify the cost function J(x) and the optimization constraints to account for one or more demand charges. As previously described, demand charges are costs imposed by utilities 510 based on the peak consumption of a resource from utilities 510 during various demand charge periods (i.e., the peak amount of the resource purchased from the utility during any time step of the applicable demand charge period). For example, an electric utility may define one or more demand charge periods and may impose a separate demand charge based on the peak electric consumption during each demand charge period. Electric energy storage can help reduce peak consumption by storing electricity in a battery when energy consumption is low and discharging the stored electricity from the battery when energy consumption is high, thereby reducing peak electricity purchased from the utility during any time step of the demand charge period.

In some instances, one or more of the resources purchased from utilities 510 are subject to a demand charge or multiple demand charges. There are many types of potential demand charges as there are different types of energy rate structures. The most common energy rate structures are constant pricing, time of use (TOU), and real time pricing (RTP). Each demand charge may be associated with a demand charge period during which the demand charge is active. Demand charge periods can overlap partially or completely with each other and/or with the optimization period. Demand charge periods can include relatively long periods (e.g., monthly, seasonal, annual, etc.) or relatively short periods (e.g., days, hours, etc.). Each of these periods can be divided into several sub-periods including off-peak, partial-peak, and/or on-peak. Some demand charge periods are continuous (e.g., beginning Jan. 1, 2017 and ending Jan. 31, 2017), whereas other demand charge periods are non-continuous (e.g., from 11:00 AM–1:00 PM each day of the month).

For a single demand charge, demand charge module 910 can introduce an auxiliary demand charge variable d in order to formulate the optimization problem linearly. This results in the following demand charge constraints:

$$d \geq -P_{bat_i} + eLoad_i \; \forall i = k \ldots k+h-1$$

$$d \geq 0$$

where d is equal to the maximum demand at any time step within the demand charge period (i.e., the electric load $eLoad_i$ minus the power discharged from the battery $P_{bat_i}$). In some embodiments, the power committed to FR does not incur a demand. In some embodiments, a fractional portion of the frequency response bid may be incorporated into the demand charge constraints.

Over a given optimization period, some demand charges may be active during some time steps that occur within the optimization period and inactive during other time steps that occur during the optimization period. Some demand charges may be active over all the time steps that occur within the optimization period. Some demand charges may apply to some time steps that occur during the optimization period and other time steps that occur outside the optimization period (e.g., before or after the optimization period). In some embodiments, the durations of the demand charge periods are significantly different from the duration of the optimization period.

Advantageously, demand charge module 910 may be configured to account for demand charges in the high level optimization process performed by high level optimizer 632. In some embodiments, demand charge module 910 incorporates demand charges into the optimization problem and the cost function J(x) using demand charge masks and demand charge rate weighting factors. Each demand charge mask may correspond to a particular demand charge and may indicate the time steps during which the corresponding demand charge is active and/or the time steps during which the demand charge is inactive. Each rate weighting factor may also correspond to a particular demand charge and may scale the corresponding demand charge rate to the time scale of the optimization period.

As described above, the demand charge term of the cost function J(x) can be expressed as:

$$J(x) = \ldots \sum_{s \in sources} \sum_{q \in demands_s} w_{demand,s,q} r_{demand,s,q} \max_{i \in demands_{s,q}} (purchase_{s,i}) \ldots$$

where the max( ) function selects the maximum amount of the resource purchased from source s during any time step i that occurs during the optimization period. However, the demand charge period associated with demand charge q may not cover all of the time steps that occur during the optimization period. In order to apply the demand charge q to only the time steps during which the demand charge q is active, demand charge module 910 can add a demand charge mask to the demand charge term as shown in the following equation:

$$J(x) = \\ \ldots \sum_{s \in sources} \sum_{q \in demands_s} w_{demand,s,q} r_{demand,s,q} \max_{i \in demands_{s,q}} (g_{s,q,i} purchase_{s,i}) \ldots$$

where $g_{s,q,i}$ is an element of the demand charge mask.

The demand charge mask may be a logical vector including an element $g_{s,q,i}$ for each time step i that occurs during the optimization period. Each element $g_{s,q,i}$ of the demand charge mask may include a binary value (e.g., a one or zero) that indicates whether the demand charge q for source s is active during the corresponding time step i of the optimization period. For example, the element $g_{s,q,i}$ may have a value of one (i.e., $g_{s,q,i}=1$) if demand charge q is active during time step i and a value of zero (i.e., $g_{s,q,i}=0$) if demand charge q is inactive during time step i. An example of a demand charge mask is shown in the following equation:

$$g_{s,q} = [0,0,0,1,1,1,1,0,0,0,1,1]^T$$

where $g_{s,q,1}$, $g_{s,q,2}$, $g_{s,q,3}$, $g_{s,q,8}$, $g_{s,q,9}$, and $g_{s,q,10}$ have values of zero, whereas $g_{s,q,4}$, $g_{s,q,5}$, $g_{s,q,6}$, $g_{s,q,7}$, $g_{s,q,11}$, and $g_{s,q,12}$ have values of one. This indicates that the demand charge q is inactive during time steps i=1, 2, 3, 8, 9, 10 (i.e., $g_{s,q,i}=0$ $\forall i=1, 2, 3, 8, 9, 10$) and active during time steps i=4, 5, 6, 7, 11, 12 (i.e., $g_{s,q,i}=1$ $\forall i=4, 5, 6, 7, 11, 12$). Accordingly, the term $g_{s,q,i} purchase_{s,i}$ within the max( ) function may have a value of zero for all time steps during which the demand charge q is inactive. This causes the max( ) function to select the maximum purchase from source s that occurs during only the time steps for which the demand charge q is active.

In some embodiments, demand charge module 910 calculates the weighting factor $w_{demand,s,q}$ for each demand charge q in the cost function J(x). The weighting factor $w_{demand,s,q}$ may be a ratio of the number of time steps the corresponding demand charge q is active during the optimization period to the number of time steps the corresponding demand charge q is active in the remaining demand charge period (if any) after the end of the optimization period. For example, demand charge module 910 can calculate the weighting factor $w_{demand,s,q}$ using the following equation:

$$w_{demand,s,q} = \frac{\sum_{i=k}^{k+h-1} g_{s,q,i}}{\sum_{i=k+h}^{period\_end} g_{s,q,i}}$$

where the numerator is the summation of the number of time steps the demand charge q is active in the optimization period (i.e., from time step k to time step k+h−1) and the denominator is the number of time steps the demand charge q is active in the portion of the demand charge period that occurs after the optimization period (i.e., from time step k+h to the end of the demand charge period). The following example illustrates how demand charge module 910 can incorporate multiple demand charges into the cost function J(x). In this example, a single source of electricity (e.g., an electric grid) is considered with multiple demand charges applicable to the electricity source (i.e., q=1 . . . N, where N is the total number of demand charges). The system includes a battery asset which can be allocated over the optimization period by charging or discharging the battery during various time steps. Charging the battery increases the amount of electricity purchased from the electric grid, whereas discharging the battery decreases the amount of electricity purchased from the electric grid.

Demand charge module 910 can modify the cost function J(x) to account for the N demand charges as shown in the following equation:

$$J(x) = \ldots + w_{d_1} r_{d_1} \max_i(g_{1_i}(-P_{bat_i} + eLoad_i)) +$$
$$\ldots + w_{d_q} r_{d_q} \max_i(g_{q_i}(-P_{bat_i} + eLoad_i)) +$$
$$\ldots + w_{d_N} r_{d_N} \max_i(g_{N_i}(-P_{bat_i} + eLoad_i))$$

where the term $-P_{bat_i}+eLoad_i$ represents the total amount of electricity purchased from the electric grid during time step i (i.e., the total electric load $eLoad_i$ minus the power discharged from the battery $P_{bat_i}$). Each demand charge q=1 . . . N can be accounted for separately in the cost function J(x) by including a separate max( ) function for each of the N demand charges. The parameter $r_{d_q}$ indicates the demand charge rate associated with the qth demand charge (e.g., $/kW) and the weighting factor $w_{d_q}$ indicates the weight applied to the qth demand charge.

Demand charge module 910 can augment each max( ) function with an element $g_{q_i}$ of the demand charge mask for the corresponding demand charge. Each demand charge mask may be a logical vector of binary values which indicates whether the corresponding demand charge is active or inactive at each time step i of the optimization period. Accordingly, each max( ) function may select the maximum electricity purchase during only the time steps the corresponding demand charge is active. Each max( ) function can be multiplied by the corresponding demand charge rate $r_{d_q}$ and the corresponding demand charge weighting factor $w_{d_q}$ to determine the total demand charge resulting from the battery allocation $P_{bat}$ over the duration of the optimization period.

In some embodiments, demand charge module 910 linearizes the demand charge terms of the cost function J(x) by introducing an auxiliary variable $d_q$ for each demand charge q. In the case of the previous example, this will result in N auxiliary variables $d_1$ . . . $d_N$ being introduced as decision variables in the cost function J(x). Demand charge module 910 can modify the cost function J(x) to include the linearized demand charge terms as shown in the following equation:

$$J(x) = \ldots + w_{d_1} r_{d_1} d_1 + \ldots + w_{d_q} r_{d_q} d_q + \ldots + w_{d_N} r_{d_N} d_N$$

Demand charge module 910 can impose the following constraints on the auxiliary demand charge variables $d_1$ . . . $d_N$ to ensure that each auxiliary demand charge variable represents the maximum amount of electricity purchased from the electric utility during the applicable demand charge period:

$$d_1 \geq g_{1_i}(-P_{bat_i} + eLoad_i) \quad \forall i = k \ldots k+h-1, \quad g_{1_i} \neq 0$$
$$d_1 \geq 0 \quad \vdots$$
$$d_q \geq g_{q_i}(-P_{bat_i} + eLoad_i) \quad \forall i = k \ldots k+h-1, \quad g_{q_i} \neq 0$$
$$d_q \geq 0 \quad \vdots$$
$$d_N \geq g_{N_i}(-P_{bat_i} + eLoad_i) \quad \forall i = k \ldots k+h-1, \quad g_{N_i} \neq 0$$
$$d_N \geq 0$$

In some embodiments, the number of constraints corresponding to each demand charge q is dependent on how many time steps the demand charge q is active during the optimization period. For example, the number of constraints for the demand charge q may be equal to the number of non-zero elements of the demand charge mask $g_q$. Furthermore, the value of the auxiliary demand charge variable $d_q$ at each iteration of the optimization may act as the lower bound of the value of the auxiliary demand charge variable $d_q$ at the following iteration. In some embodiments, a fractional portion of the frequency response bid may be incorporated into the demand charge constraints.

Consider the following example of a multiple demand charge structure. In this example, an electric utility imposes three monthly demand charges. The first demand charge is an all-time monthly demand charge of 15.86 $/kWh which applies to all hours within the entire month. The second demand charge is an on-peak monthly demand charge of 1.56 $/kWh which applies each day from 12:00-18:00. The third demand charge is a partial-peak monthly demand charge of 0.53 $/kWh which applies each day from 9:00-12:00 and from 18:00-22:00.

For an optimization period of one day and a time step of one hour (i.e., i=1 . . . 24), demand charge module 910 may introduce three auxiliary demand charge variables. The first auxiliary demand charge variable $d_1$ corresponds to the all-time monthly demand charge; the second auxiliary demand charge variable $d_2$ corresponds to the on-peak monthly demand charge; and the third auxiliary demand charge variable $d_3$ corresponds to the partial-peak monthly demand charge. Demand charge module 910 can constrain each auxiliary demand charge variable to be greater than or equal to the maximum electricity purchase during the hours the corresponding demand charge is active, using the inequality constraints described above.

Demand charge module 910 can generate a demand charge mask $g_q$ for each of the three demand charges (i.e., q=1 . . . 3), where $g_q$ includes an element for each time step of the optimization period (i.e., $g_q = [g_{q_1} \ldots g_{q_{24}}]$). The three demand charge masks can be defined as follows:

$$g_{1_i} = 1 \; \forall i = 1 \ldots 24$$

$$g_{2_i} = 1 \; \forall i = 12 \ldots 18$$

$$g_{3_i} = 1 \; \forall i = 9 \ldots 12, 18 \ldots 22$$

with all other elements of the demand charge masks equal to zero. In this example, it is evident that more than one demand charge constraint will be active during the hours which overlap with multiple demand charge periods. Also, the weight of each demand charge over the optimization period can vary based on the number of hours the demand charge is active, as previously described.

In some embodiments, demand charge module 910 considers several different demand charge structures when incorporating multiple demand charges into the cost function J(x) and optimization constraints. Demand charge structures can vary from one utility to another, or the utility may offer several demand charge options. In order to incorporate the multiple demand charges within the optimization framework, a generally-applicable framework can be defined as previously described. Demand charge module 910 can translate any demand charge structure into this framework. For example, demand charge module 910 can characterize each demand charge by rates, demand charge period start, demand charge period end, and active hours. Advantageously, this allows demand charge module 910 to incorporate multiple demand charges in a generally-applicable format.

The following is another example of how demand charge module 910 can incorporate multiple demand charges into the cost function J(x). Consider, for example, monthly demand charges with all-time, on-peak, partial-peak, and off-peak. In this case, there are four demand charge structures, where each demand charge is characterized by twelve monthly rates, twelve demand charge period start (e.g., beginning of each month), twelve demand charge period end (e.g., end of each month), and hoursActive. The hoursActive is a logical vector where the hours over a year where the demand charge is active are set to one. When running the optimization over a given horizon, demand charge module 910 can implement the applicable demand charges using the hoursActive mask, the relevant period, and the corresponding rate.

In the case of an annual demand charge, demand charge module 910 can set the demand charge period start and period end to the beginning and end of a year. For the annual demand charge, demand charge module 910 can apply a single annual rate. The hoursActive demand charge mask can represent the hours during which the demand charge is active. For an annual demand charge, if there is an all-time, on-peak, partial-peak, and/or off-peak, this translates into at most four annual demand charges with the same period start and end, but different hoursActive and different rates.

In the case of a seasonal demand charge (e.g., a demand charge for which the maximum peak is determined over the indicated season period), demand charge module 910 can represent the demand charge as an annual demand charge. Demand charge module 910 can set the demand charge period start and end to the beginning and end of a year. Demand charge module 910 can set the hoursActive to one during the hours which belong to the season and to zero otherwise. For a seasonal demand charge, if there is an All-time, on-peak, partial, and/or off-peak, this translates into at most four seasonal demand charges with the same period start and end, but different hoursActive and different rates.

In the case of the average of the maximum of current month and the average of the maxima of the eleven previous months, demand charge module 910 can translate the demand charge structure into a monthly demand charge and an annual demand charge. The rate of the monthly demand charge may be half of the given monthly rate and the annual rate may be the sum of given monthly rates divided by two. These and other features of demand charge module 910 are described in greater detail in U.S. patent application Ser. No. 15/405,236 filed Jan. 12, 2017, the entire disclosure of which is incorporated by reference herein.

Incentive Program Incorporation

Still referring to FIG. 9, high level optimizer 632 is shown to include an incentive program module 912. Incentive program module 912 may modify the optimization problem to account for revenue from participating in an incentive-based demand response (IBDR) program. IBDR programs may be setup by regional transmission organizations (RTO) or independent system operators (ISO) to incentivize customers to lower their electric consumption and/or help in maintaining the balance of the power grid. These strategies put forward by the RTOs/ISOs allow the customer to generate revenue by participating in the various programs. These programs are also beneficial to the utility as it reduces the need to commission additional power plants during peak hours or even the need to invest in new power plants.

The type of programs offered differ from one RTO/ISO to another. In the region managed by Pennsylvania, Jersey, Maryland (PJM) interconnection, several IBDR programs are offered. These include economic load demand response (ELDR) and frequency response (FR). It is important to understand how IBDR differs from price based demand response (PBDR). As mentioned earlier, IBDR programs allow the user to generate revenue. PBDR, which includes peak shaving or peak shifting, is the process of responding to energy or electric rate prices and demand charges. PBDR allows the customers to reduce their annual energy and demand cost. It is contemplated that energy storage system 500 may participate in any number or type of PBDR and/or IBDR programs.

In some embodiments, energy storage system 500 provides electric power to an energy grid or an independent service operator as part of a FR program (e.g., PJM frequency response) or a synchronized reserve market. In a FR program, a participant contracts with an electrical supplier to maintain reserve power capacity that can be supplied or removed from an energy grid by tracking a supplied signal. The participant is paid by the amount of power capacity required to maintain in reserve.

In some embodiments, incentive program module 912 modifies the cost function J(x) to include revenue generated from participating in a FR program. In FR, the objective is to allocate a battery asset at each hour over a given horizon such that energy and demand costs are minimized and the FR revenue maximized. To account for FR program participation, incentive program module 912 can modify the cost function J(x) to include the following term:

$$-\sum_{i=k}^{k+h-1} r_{FR_i} P_{FR_i}$$

where $P_{FR,i}$ is the battery power (e.g., kW) committed to frequency regulation participation during time step i and $r_{FR_i}$ is the incentive rate (e.g., $/kWh) for participating in frequency regulation during time step i. Since participating in a FR program generates revenue, the negative sign indicates that this term subtracts from the total cost.

In order to incorporate FR in the planning tool framework, incentive program module 912 may assume that an hourly bid of power is submitted for the day-ahead. In the planning tool framework, this is represented by the committed FR power, which is considered to be a positive value. Incentive program module 912 may also assume that the FR power signal is a 2-second signal and that participation in FR does not affect the electric demand charge.

Figure 11:
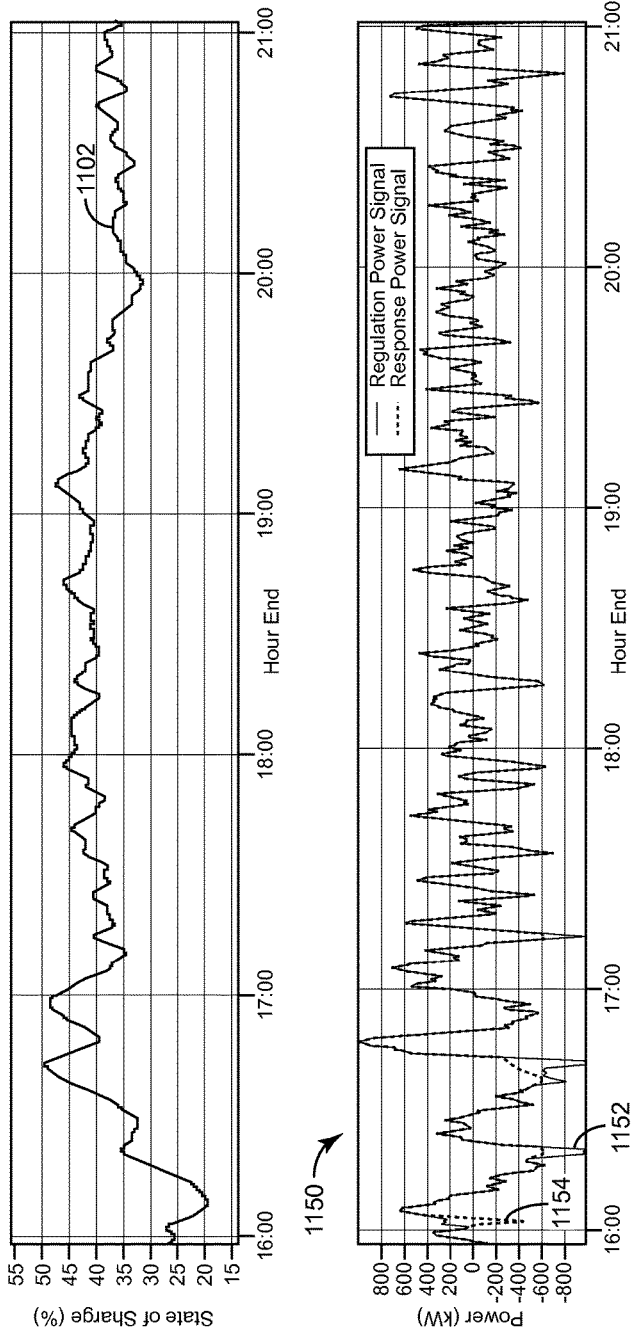
FIG. 11 is a pair of graphs illustrating a FR power signal, the corresponding FR response signal, and the state-of-charge of the battery over a five hour period, according to an exemplary embodiment.

Referring now to FIG. 11, two graphs 1100 and 1150 are shown. Graph 1150 provides an example of the FR power signal 1152 and the corresponding FR response signal 1154 over a five hour period. The FR power signal 1152 over an hour usually averages around zero. Accordingly, the process of tracking the FR power signal 1152 may result in a net zero change in the state of charge (SOC) of the battery. However, it is possible that the average of the signal 1152 may be non-zero and thus the SOC of the battery may change at the end of an hour. Line 1102 in graph 1100 represents the SOC of the battery, which is shown to vary as energy is charged and discharged from the battery based on the FR power signal 1152. In order to take this in consideration, at each hour end, the capacity of the battery is reduced by an amount dependent on the amount of power committed to FR at said hour. The latter also accounts for the heat losses, which can affect the SOC.

In some embodiments, incentive program module 912 modifies the cost function J(x) to include revenue generated from participating in an ELDR program. ELDR is an IBDR program, which allows customers to generate revenue by reducing their electric consumption during certain hours of the day. In ELDR, the objective is to maximize the revenue generated by the program, while using the battery to participate in other programs and to perform demand management and energy cost reduction. To account for ELDR program participation, incentive program module 912 can modify the cost function J(x) to include the following term:

$$\min_{b_i, P_{bat_i}} \left( -\sum_{i=k}^{k+h-1} b_i r_{ELDR_i} (adjCBL_i - (eLoad_i - P_{bat_i})) \right)$$

where $b_i$ is a binary decision variable indicating whether to participate in the ELDR program during time step i, $r_{ELDR_i}$ is the ELDR incentive rate at which participation is compensated, and $adjCBL_i$ is the symmetric additive adjustment (SAA) on the baseline load. The previous expression can be rewritten as:

$$\min_{b_i, P_{bat_i}} \left( -\sum_{i=k}^{k+h-1} b_i r_{ELDR_i} \left( \sum_{l=1}^{4} \frac{e_{li}}{4} + \sum_{p=m-4}^{m-2} \frac{1}{3} \left( eLoad_p - P_{bat_p} - \sum_{l=1}^{4} \frac{e_{lp}}{4} \right) - (eLoad_i - P_{bat_i}) \right) \right)$$

where $e_{li}$ and $e_{lp}$ are the electric loads at the ith and pth hours of the operating day.

In some embodiments, incentive program module 912 handles the integration of ELDR into the optimization problem as a bilinear problem with two multiplicative decision variables. In order to linearize the cost function J(x) and customize the ELDR problem to the optimization framework, several assumptions may be made. For example, incentive program module 912 can assume that ELDR participation is only in the real-time market, balancing operating reserve charges and make whole payments are ignored, day-ahead prices are used over the horizon, real-time prices are used in calculating the total revenue from ELDR after the decisions are made by the optimization algorithm, and the decision to participate in ELDR is made in advance and passed to the optimization algorithm based on which the battery asset is allocated.

In some embodiments, incentive program module 912 calculates the participation vector $b_i$ as follows:

$$b_i = \begin{cases} 1 & \forall i / r_{DA_i} \geq NBT_i \text{ and } i \in S \\ 0 & \text{otherwise} \end{cases}$$

where $r_{DA_i}$ is the hourly day-ahead price at the ith hour, $NBT_i$ is the net benefits test value corresponding to the month to which the corresponding hour belongs, and S is the set of nonevent days. Nonevent days can be determined for the year by choosing to participate every x number of days with the highest day-ahead prices out of y number of days for a given day type. This approach may ensure that there are nonevent days in the 45 days prior to a given event day when calculating the customer baseline load (CBL) for the event day.

Given these assumptions and the approach taken by incentive program module 912 to determine when to participate in ELDR, incentive program module 912 can adjust the cost function J(x) as follows:

$$J(x) = -\sum_{i=k}^{k+h-1} r_{e_i} P_{bat_i} - \sum_{i=k}^{k+h-1} r_{FR_i} P_{FR_i} +$$

$$\sum_{i=k}^{k+h-1} r_{s_i} s_i + w_d r_d d - \sum_{i=k}^{k+h-1} b_i r_{DA_i} \left( \sum_{p=m-4}^{m-2} -\frac{1}{3} P_{bat_p} + P_{bat_i} \right)$$

where $b_i$ and m are known over a given horizon. The resulting term corresponding to ELDR shows that the rates at the ith participation hour are doubled and those corresponding to the symmetric additive adjustment (SAA) are lowered. This means it is expected that high level optimizer 632 will tend to charge the battery during the SAA hours and discharge the battery during the participation hours. Notably, even though a given hour is set to be an ELDR participation hour, high level optimizer 632 may not decide to allocate any of the battery asset during that hour. This is due to the fact that it may be more beneficial at that instant to participate in another incentive program or to perform demand management. An example of an ELDR program in which incentive program module 912 can participate is described in detail below.

ELDR Program Example

The following ELDR program example is based on the program rules set forth by PJM. The customer chooses the hours in the day during which to participate and the amount by which electric consumption is to be reduced at a given hour during the participation period. The customer is compensated if the committed reduction amount is met. The utility verifies the amount reduced by comparing the electric load for the event day (i.e., a day during which a customer participates in ELDR) during the event hours (i.e., the hours in an event day during which the customer committed to participate in ELDR) against a calculated baseline load. The baseline load is discussed in greater detail below. Customer transactions in ELDR are usually managed by a curtailment service provider (CSP), who handles the bidding and settlement processes with the utility for the customer.

Figure 12:
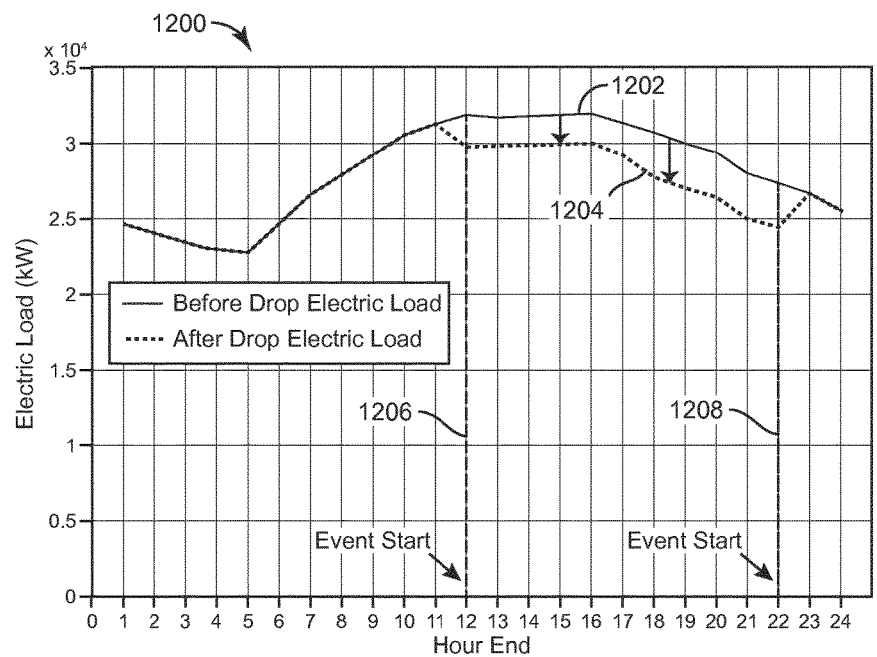
FIG. 12 is a graph illustrating a reduction in electric load during ELDR event hours, according to an exemplary embodiment.

Referring now to FIG. 12, a graph 1200 illustrating the reduction in electric load during ELDR event hours is shown, according to an exemplary embodiment. Line 1202 represents the customer's baseline load, whereas line 1204 represents the customer's actual electric load. During the event hours between the event start time 1206 and the event end time 1208, the actual electric load 1204 is reduced relative to the baseline load 1202 due to the customer participating in the ELDR program.

There are two markets in PJM's ELDR program: the day-ahead market and the real-time market. A customer can participate in either or both markets. The two markets differ in terms of the rate at which the customer gets compensated, the existence of a dispatch by the utility, and the bidding process. Both of these markets are described in detail below.

In the day-ahead market, the customer submits a bid through the CSP by 10:30 AM on the day prior to the event day or operating day. The bid may include the desired participation hours, the curtailment amount at each hour, the offer price at which the customer desires to be compensated for the curtailment, and the minimum number of hours the customer wants to participate in. customer cannot modify the bids after 10:30 AM. At 1:30 PM, the day-ahead locational marginal prices (LMPs) are released by PJM and the customer is notified which of the submitted hours cleared. The customer is then committed to reduce the electric consumption during the cleared hours. PJM will not dispatch the customer during those hours as it would in the real-time market.

In the day-ahead market, the ELDR participant is compensated for reducing demand based on the reductions of kW committed. The participant is compensated at the day-ahead LMP. Compensation will only occur for the hours where the day-ahead LMP at that hour is greater than or equal to the net benefits test (NBT) threshold. The NBT is a threshold point on the PJM supply curve where the net benefit exceeds the cost to load. It is the point where elasticity is equal to 1. The NBT is updated and posted by PJM for a calendar month on the $15^{th}$ day of the prior month. The NBT results can be found on the PJM website by selecting markets & operations→demand response→net benefits test results. The following equation shows how the revenue is calculated for a given participation hour in the day-ahead energy market.

$$C_{DA_i} = \begin{cases} P_{red_i} \times r_{DA_i} & r_{DA_i} \geq NBT \\ 0 & \text{otherwise} \end{cases}$$

where $P_{red_i}$ [kW] is the amount reduced in a participation hour and $r_{DA_i}$ [$/kWh] is the day ahead LMP.

In the day-ahead market, if the actual amount reduced is not within 20% of the amount committed, the participant may be charged with a balancing operating reserve (BOR) charge. The BOR charge is described in greater detail below.

In the real-time market, the customer can participate at any hour of the operating day as long as the bid is submitted at least three hours before the top of the desired participation hour. Customers with submitted bids will be dispatched by PJM. There is a 99% chance of getting dispatched to curtail demand if the offer price for the hour is greater than the NBT. It is worth noting that customers who have hours that cleared in the day-ahead market and who also submit offers for load reductions in the real-time energy market and get dispatched will get compensated for both reductions. The latter holds only if the real-time energy market reduction offers are submitted by 6:00 PM on the day before the operating or event day.

In the real-time market, the resource or customer receives credit for any participation hour where the corresponding Real-Time LMP, $r_{RT_i}$ [$/kWh], is greater than or equal to the NBT as shown in the following equation:

$$C_{RT_i} = \begin{cases} P_{red_i} \times r_{RT_i} & r_{RT_i} \geq NBT \\ 0 & \text{otherwise} \end{cases}$$

where $C_{RT_i}$[$] is the balancing load response credit received at the ith participation hour and $P_{red_i}$[kW] is the real time reduction in demand at the ith hour.

In addition to the balancing load response credit, the resource is usually eligible for an hourly make whole payment (MWP) if the deviation of the actual reduction from the power dispatched is within 20% of the dispatched power. MWP is made per segment, where a segment is defined as a set of contiguous participation hours. The hourly MWP may be defined as follows:

$$C_{MWP\_RT_i} = \begin{cases} v_{RT_i} - v_{bal_i} - C_{RT_i} & r_{bid\_RT_i} \geq NBT \ \& \ |P_{red_i} - P_{disp_i}| \leq 0.2 P_{disp_i} \\ 0 & \text{otherwise} \end{cases}$$

where $C_{MWP\_RT_i}$[$] is the hourly make whole payment or credit, $v_{RT_i}$[$] is the real-time load response bid, $v_{bal_i}$[$] is the balancing synchronous reserve revenue above cost, and $P_{disp_i}$[$] is the real-time dispatched power, which is the same as the power bid by the customer. The real-time load response bid $v_{RT_i}$ can be calculated as follows:

$$v_{RT_i} = \min(P_{disp_i}, P_{red_i}) r_{bid\_RT_i}$$

The segment MWP can be calculated as follows:

$$C_{Seg\_MWP\_RT_j} = \begin{cases} \max\left(\sum_{i \in Seg_j} C_{MWP\_RT_i} + C_{shutdown}, 0\right) & \begin{cases} r_{bid\_RT_i} \geq NBT \\ |P_{red_i} - P_{disp_i}| \leq 0.2 P_{disp_i} \forall i \in Seg_j \end{cases} \\ \max\left(\sum_{i \in Seg_j} C_{MWP\_RT_i}, 0\right) & \begin{cases} r_{bid\_RT_i} \geq NBT \\ \exists i \in Seg_j / |P_{red_i} - P_{disp_i}| \leq 0.2 P_{disp_i} \end{cases} \\ 0 & \text{otherwise} \end{cases}$$

where $C_{Seg\_MWP\_RT_j}$[$] is the jth segment MWP and $C_{shutdown}$[$] is the shutdown cost submitted in the offer. The shutdown cost for a segment is not paid or accounted for if at least one hour in said segment has a reduction deviation that is greater than 20% of the dispatched power.

In the real-time market, a BOR charge may be assessed for each hour where the actual power reduced deviates from the dispatched power by more than 20% of the dispatched power. There are two deviations rates applicable to each participation hour, RTO BOR deviations rate and East BOR deviations rate or West BOR deviations rate. For a given rate, the BOR charge for a given hour can be calculated as follows:

$$BOR_{ch_i} = \begin{cases} |P_{red_i} - P_{disp_i}| r_{BOR_i} & |P_{red_i} - P_{disp_i}| > 0.2 P_{disp_i} \\ 0 & \text{otherwise} \end{cases}$$

where $BOR_{ch_i}$[$] is the balancing operating reserve charge at a given rate and at a given hour and $r_{BOR_i}$[$/kWh] is the balancing operating reserve deviation rate at a given hour. If more than one rate is applicable for a given hour, then several charges may be calculated for that hour. Deviations rates are usually less than one dollar per 1 MWh, based on historical deviations rates data from PJM.

ELDR Customer Baseline Load Calculation

There are several methods that PJM approves for the customer baseline load (CBL) calculation. PJM has a testing scheme to help decide which CBL is suitable for which customer. In this disclosure, the focus is on the standard tariff defined CBL. The following table lists the parameters used in the calculation of the CBL for a given operating day. The standard tariff defined CBL may use three day types with symmetric additive adjustment (SAA) for most non-variable economic demand resources. The CBL can be used to determine the total amount of credits earned and charges accrued by a demand resource participating in ELDR.

TABLE 1

3 Day Types with Symmetric Additive Adjustment CBL Specifications

| Parameter | Definition | Day Type 1: Weekdays | Day Types 2/3: Saturdays/ Sundays and Holidays |
|---|---|---|---|
| Calculation | Whether to use median or average to calculate the CBL after the CBL Basis Window has been defined and high and low usage days have been excluded | Average | Average |
| CBL Basis Window | This is the set of days that will serve as representative of end-use customer's typical usage. If the number of days specified is 5, then after all exclusions (e.g.: before excluding event days and Low Usage Days), the set will contain 5 days. | 5 | 3 |
| CBL Basis Window Limit | Limit on number of historical calendar days used to select the CBL Basis Days (e.g.: If 45 this means CBL days must be selected from prior 45 calendar days). This ensures recent information is used to predict future consumption. | 45 | 45 |
| Start Selection From Days Prior to Event | Determines most recent historic CBL day to select (e.g. if 1 then select most recent day with same day type, if 2 then skip most recent day with same day type and select next day with same day type). | 1 | 1 |
| Exclude Previous Curtailment Days | If this is set to "Yes", exclude all previous curtailment days. Previous Curtailment Days are previous economic settlements days that include at least 1 hour in pending or confirmed status. | Yes | Yes |
| Exclude Long/ Short DST Days | If this is set to "Yes", then any long/short DST day is excluded from the CBL Basis Window. | N/A | Yes |
| Exclude Average Event Period Usage Less Than Threshold | If the Average Daily Event Period Usage for the CBL day selected is less than the threshold indicated, then that day will be excluded from the CBL Basis Window | 25% | 25% |
| Exclude Number of Low Usage Days | If the CBL Basis Days is set to 5 and this switch is set to 1, then the 1 day with the lowest Average Daily Event Period Usage will be excluded from the CBL calculation. | 1 | 1 |
| Use Previous Curtailment if CBL Basis Window incomplete | If this is set to "Yes", and if the CBL is unable to attain the minimum number of days required to calculate the CBL, then Previous Curtailment Days will be used as CBL Basis Days until such minimum is attained. If this is set to "Yes", then Exclude Previous Curtailment Days must also be set to "Yes". | Yes | Yes |
| Use Highest or Recent Previous Curtailment Day | Required if the Use Previous Curtailment Day if CBL Incomplete is set to "Yes". "Highest" means that the model will rank Previous Curtailment Days based on event period usage within the CBL Basis Day Limit and add them to the CBL Basis Days in descending order until the CBL Basis Days contains the minimum number of days required to calculate CBL. "Recent" means that the model will start adding days to the CBL Basis Days starting with the Most Recent | Highest | Highest |

TABLE 1-continued

3 Day Types with Symmetric Additive Adjustment CBL Specifications

| Parameter | Definition | Day Type 1: Weekdays | Day Types 2/3: Saturdays/Sundays and Holidays |
|---|---|---|---|
| | Curtailment Day that was excluded until the CBL Basis Days contains the minimum number of days required to calculate CBL. | | |
| Adjustments | Symmetric Additive Adjustment is CBL average usage for Event Day divided by Adjustment Basis Hours for same hours. Weather Sensitivity Adjustment compares difference is average weather over CBL days to weather on event day and then calculates adjustment based on weather sensitivity as described in this manual. | Symmetric Additive | Symmetric Additive |
| Allow Negative Adjustments | If this is set to "Yes", then the Adjustments may be positive or negative. Otherwise, Adjustments will always be greater than zero. | Yes | Yes |
| Adjustments Start (HE0-x) | The starting point for the hour(s) to be used in calculating the Adjustments. If the event starts with HE13 and Adjustment Start is 4, then HE9 will be the first hour used to calculate Adjustments. | 4 | 4 |
| Adjustment Basis Hours | Determines total number of hours to use in the adjustment from the Adjustment Start. If the event is on HE13, Adjustment Start is 4, and Adjustment Basis Hours is 3, then the adjustment will be based on the load from HE9-HE11. | 3 | 3 |
| Use Previous Curtailment if CBL Basis Window incomplete | If this is set to "Yes", and if the CBL is unable to attain the minimum number of days required to calculate the CBL, then Previous Curtailment Days will be used as CBL Basis Days until such minimum is attained. If this is set to "Yes", then Exclude Previous Curtailment Days must also be set to "Yes". | Yes | Yes |

Figure 13:
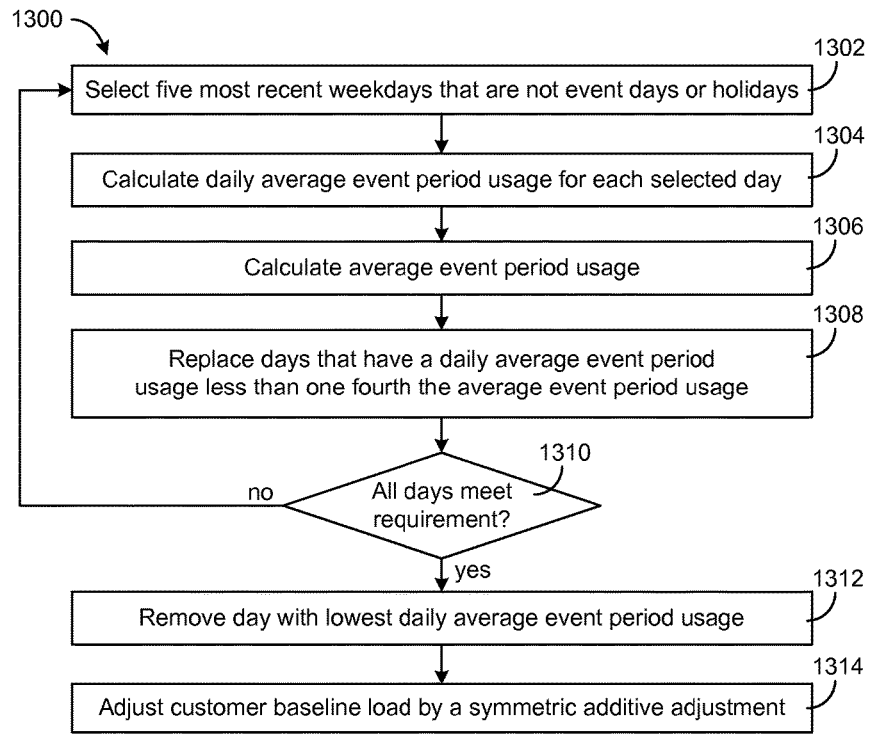
FIG. 13 is a flowchart of a process which can be performed by the high level optimizer of FIG. 9 to calculate customer baseline load, according to an exemplary embodiment.

Referring now to FIG. 13, a flowchart of a process 1300 which can be performed by incentive program module 912 to calculate the CBL for a weekday operating day is shown, according to an exemplary embodiment. Incentive program module 912 may select the five most recent weekdays that are not event days (i.e. days on which the customer had not participated in ELDR) and not holidays (step 1302). The set of days selected forms the initial CBL basis window. The CBL basis window can be denoted by the set D:

$$D = \{d_1, d_2, d_3, d_4, d_5\}$$

where $d_i$ is a vector of the hourly electric load for a day, such that $$d_i = [e_{i1} \ldots e_{i24}]$$

where $e_{ij}$ is the electric load at the jth hour on the ith day.

Incentive program module 912 may calculate the daily average event period usage for each day in D (step 1304). The daily average event period usage can be calculated using the following equation:

$$dEventAvg_i = \sum_{k=m}^{n} \frac{e_{ik}}{m-n+1} \quad \forall i = 1, \ldots, 5$$

where m and n are the hour end indices of the start and end hours of the event. An event period can be defined as the period during which the customer has committed to participate in the ELDR program.

Incentive program module 912 may calculate the average event period usage (step 1306). The average event period usage can be calculated using the following equation:

$$EventAvg = \sum_{i=1}^{5} \frac{dEventAvg_i}{5}$$

Incentive program module 912 may remove any days in D where $dEventAvg_i < 0.25 \times eventAvg$ and replace them with other weekdays that fall within the 45 calendar days period prior to the operating day (step 1308). Incentive program module 912 may determine whether all five days in the set D satisfy the requirement in step 1308 (step 1310). Steps 1302-1308 may be repeated until five days that meet the requirement are obtained.

When all five days in set D meet the requirement (i.e., the result of step 1310 is "yes"), incentive program module 912 may remove the day with the lowest daily average event period usage from the set D (step 1312). Thus, the preliminary CBL is the average of the highest four out of the five days. The CBL can be expressed as follows:

$$CBL = [cbl_1 \ldots cbl_{24}]$$

$$\text{where } cbl_j = \sum_i \frac{e_{ij}}{4} \text{ and } i \neq \text{index of } \min_{dEventAvg_i}(d_i)$$

Incentive program module 912 may adjust the CBL by a symmetric additive adjustment (SAA) (step 1314). Adjusting the CBL with the SAA can be performed as follows:

$$adjCBL = [cbl_1 + SAA \ldots cbl_{24} + SAA]$$

$$\text{where } SAA = \sum_{k=m-4}^{m-2} \frac{eLoad_k - cbl_k}{3}$$

and $eLoad_k$ is the electric load at the kth hour of the operating day.

Figure 14:
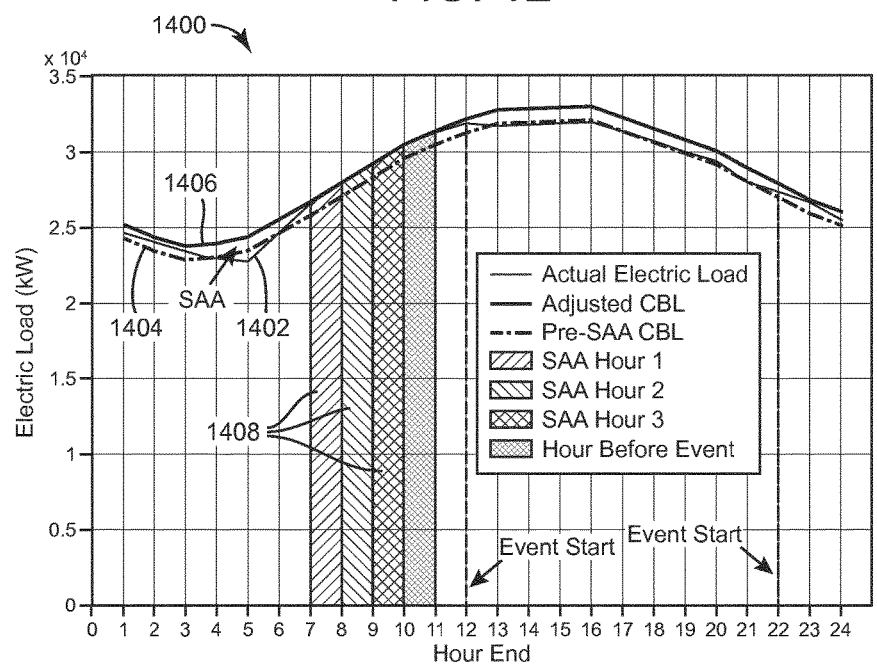
FIG. 14 is a graph illustrating the effect of a symmetric additive adjustment on the customer baseline load, according to an exemplary embodiment.

Referring now to FIG. 14 a graph 1400 illustrating the effect of SAA on the CBL is shown, according to an exemplary embodiment. Line 1402 represents the customer's actual electric load. Line 1404 represents the CBL prior to the SAA, whereas line 1406 represents the adjusted CBL (i.e., adjCBL) after the SAA. The difference between lines 1404 and 1406 represents the SAA. A decrease in the electric consumption during the SAA hours 1408 may result in lowering the CBL 1404, which in turn will minimize the amount reduced during the participation hours from PJM's perspective. However, it is also against the rules to abnormally increase the electric consumption during the SAA hours 1408. The latter may lead to rejection of the submitted settlement with PJM, and thus the customer will not be compensated. According to PJM, an increase in the electric consumption during the SAA hours 1408 that is due to a response to energy prices is acceptable.

The calculation of the CBL for weekends and holidays may be similar to the calculation of that for a weekday except for the following differences. In the weekends and holidays calculation, the three most recent Saturdays may be used for the calculation of the CBL for a Saturday operating day. The three most recent Sundays and Holidays may be used for the calculation of the CBL for a Sunday/Holiday operating day. Any weekend or holiday that corresponds to the beginning or end of daylight savings may be excluded from the set of days to be used in the calculation of the preliminary baseline load. The preliminary customer baseline load may be the average of the highest two out of the three days that meet the specified criteria.

Peak Load Contribution Incorporation

Still referring to FIG. 9, high level optimizer 632 is shown to include a peak load contribution module 914. Peak load contribution (PLC) is a customer's contribution to regional demand peaks that occur in geographic area managed by a regional transmission organization (RTO) or independent system operator (ISO) at certain hours within a base period. The regional demand at a given hour may be the summation of the customer's demand during (i.e., the rate at which the customer purchases electricity or another resource from a utility) as well as the demand of other buildings in the geographic area during that hour. The customer may be billed based on its contribution to the peak regional demand (e.g., \$/kW of the customer's PLC) in addition to the energy consumption charges and demand charges previously described.

PLC module 914 can be configured to modify the cost function $J(x)$ to account for a cost associated with the customer's PLC. By incorporating PLC costs into the cost function $J(x)$, PLC module 914 enables high level optimizer 632 to allocate resource consumption and resource purchases to reduce the customer's PLC. High level optimizer 632 can reduce PLC costs by shifting the customer's load to non-peak times or shaving the customer's peak load. This can be done, for example, by precooling the building during non-peak times, using thermal energy storage, and/or using electrical energy storage such as a battery asset.

Accounting for the cost associated with the customer's PLC can be more difficult than accounting for energy consumption costs and demand charges. Unlike demand charge which is calculated based on the customer's maximum demand during predetermined demand charge periods, the hours over which PLC is calculated may not be known in advance. The hours of peak regional demand (i.e., the coincidental peak (CP) hours) may not be known until the end of the base period over which PLC is calculated. For example, the CP hours for a given base period (e.g., one year) may be determined by a RTO at the end of the base period based on the demand of all the buildings within the geographic area managed by the RTO during the base period (e.g., by selecting the hours with the highest regional demand). The customer's PLC may then be determined based on the customer's demand during the designated CP hours and used to calculate a cost of the customer's PLC. This cost may then be billed to the customer during the next time period (e.g., the next year), referred to as the billing period.

Another difficulty in accounting for PLC costs is that the base period, billing period, CP hours, and other factors used to calculate the PLC cost may differ from one RTO to another. For example, a RTO for the Pennsylvania, Jersey, and Maryland (PJM) geographic area may define the base period (i.e., the peak-setting period) as June $1^{st}$ of year Y to May $31^{st}$ of year Y+1. The billing period (i.e., the delivery period) may be defined as June $1^{st}$ of year Y+1 to May $31^{st}$ of year Y+2. PJM may define the CP hours as the five hours with the highest loads over the five highest peak load days across the PJM geographic region.

A customer's PLC in the PJM region may be calculated as the product of the customer's average electric load during the five CP hours and a capacity loss factor (CLF), as shown in the following equation:

$$PLC_{customer} = CLF \times \sum_{i=1}^{5} \frac{eLoad_{cp_i}}{5}$$

where $PLC_{customer}$ is the customer's peak load contribution calculated during year Y, CLF is the capacity loss factor (e.g., CLF=1.05), and $eLoad_{cp_i}$ is the customer's electric load (e.g., kW) during the ith CP hour.

The customer's PLC cost in the PJM region can be calculated as the product of the customer's PLC during year Y and a PLC rate, as shown in the following equation:

$$PLC_{cost} = r_{PLC} \times PLC_{customer}$$

where $PLC_{cost}$ is the customer's PLC charge billed over the delivery year Y+1 (e.g., \$) and $r_{PLC}$ is the rate at which the customer is charged for its PLC (e.g., \$/kW).

An additional complication in the PJM region relates to the interaction between PLC costs and economic load demand response (ELDR) revenue. In some embodiments, a customer participating in ELDR in the PJM region during one of the CP hours may be prohibited from reducing its PLC while earning ELDR revenue at the same time. Accordingly, a customer wishing to reduce its load during an assumed CP hour for the purpose of reducing its capacity, transmission, and/or demand charge costs may be restricted from making a bid for the same assumed CP hour in the ELDR market.

Another example of an organization which imposes PLC costs is the independent electricity system operator (IESO) in Ontario, Canada. Relative to PJM, IESO may use a different base period, billing period, CP hours, and other factors used to calculate the PLC cost. For example, IESO may define the base period or peak-setting period as May $1^{st}$ of year Y to April $30^{th}$ of year Y+1. The billing period or adjustment period for IESO may be defined as July $1^{st}$ of year Y+1 to June $30^{th}$ of year Y+2. IESO may define the CP hours as the five hours with the highest regional demands across the IESO geographic region.

At the end of the base period, IESO may calculate the customer's peak demand factor ($\theta_{PDF}$). The peak demand factor may be defined as the ratio of the sum of the customer's peak demand to the sum of the region-wide demand peaks during the five CP hours, as shown in the following equation:

$$\theta_{PDF} = \frac{\sum_{i=1}^{5} eLoad_{cp_i}}{\sum_{i=1}^{5} sysLoad_{cp_i}}$$

where $sysLoad_{cp_i}$ is the region-wide peak load during the ith CP hour and $eLoad_{cp_i}$ is the customer's peak load during the ith CP hour.

The customer's PLC cost in the IESO region is known as a global adjustment (GA) charge. The GA charge may be imposed as a monthly charge during the billing period. In some embodiments, the GA charge is calculated by multiplying the customer's peak demand factor by the monthly region-wide global adjustment costs, as shown in the following equation:

$$GA_{cost,month} = \theta_{PDF} \times GA_{total,month}$$

where $GA_{cost,month}$ is the customer's monthly PLC cost (e.g., $) and $GA_{total,month}$ is the region-wide global adjustment cost (e.g., $). The value of $GA_{total,month}$ may be specified by IESO. In some embodiments, $GA_{total,month}$ has a known value. In other embodiments, the value of $GA_{total,month}$ may not be known until the end of the base period.

In order to incorporate PLC costs into the cost function J(x) and allocate resource consumption/purchases in advance, PLC module 914 can generate or obtain a projection of the CP hours for an upcoming base period. The projected CP hours can then be used by high level optimizer 632 as an estimate of the actual CP hours. High level optimizer 632 can use the projected CP hours to allocate one or more assets (e.g., a battery, thermal energy storage, HVAC equipment, etc.) to minimize the customer's demand during the projected CP hours. These and other features of PLC module 914 are described in greater detail in U.S. patent application Ser. No. 15/405,234 filed Jan. 12, 2017, the entire disclosure of which is incorporated by reference herein.

Asset Sizing Incorporation

Still referring to FIG. 9, high level optimizer 632 is shown to include an asset sizing module 916. Asset sizing module 916 can be configured to determine the optimal sizes of various assets in a building, group of buildings, or a central plant. Assets can include individual pieces of equipment or groups of equipment. For example, assets can include boilers, chillers, heat recovery chillers, steam generators, electrical generators, thermal energy storage tanks, batteries, air handling units, or other types of equipment in a building or a central plant (e.g., HVAC equipment, BMS equipment, etc.). In some embodiments, assets include collections of equipment which form a subplant of a central plant (e.g., central plant 118). For example, assets can include heater subplant 521, chiller subplant 522, heat recovery chiller subplant 523, steam subplant 524, electricity subplant 525, or any other type of generator subplant 520. In some embodiments, assets include hot thermal energy storage 531 (e.g., one or more hot water storage tanks), cold thermal energy storage 532 (e.g., one or more cold thermal energy storage tanks), electrical energy storage 533 (e.g., one or more batteries), or any other type of storage subplant 530.

Asset sizes can include a maximum loading of the asset and/or a maximum capacity of the asset. Some assets such as storage subplants 530 may have both a maximum loading and a maximum capacity. For example, battery assets may have a maximum battery power (e.g., a maximum rate at which the battery can be charged or discharged) and a maximum state-of-charge (e.g., a maximum energy storage of the battery). Similarly, thermal energy storage assets may have a maximum charge/discharge rate and a maximum capacity (e.g., maximum fluid storage, etc.). Other assets such as generator subplants 520 may have only a maximum loading. For example, a chiller may have a maximum rate at which the chiller can produce cold thermal energy. Similarly, an electric generator may have a maximum rate at which the generator can produce electricity. Asset sizing module 916 can be configured to determine the maximum loading and/or the maximum capacity of an asset when determining the optimal size of the asset.

In some embodiments, asset sizing module 916 is implemented a component of planning tool 702. In the planning tool framework, asset sizing module 916 can determine the optimal size of an asset for a given application. For example, consider the planning problem described with reference to FIGS. 7-8 in which the high level optimization is solved at a given time instant k over a given time horizon h. With each iteration of the high level optimization, the time horizon h can be shifted forward by a block size equivalent to b time steps and the first b sets of decision variables may be retained. In such a planning problem, the sizes of the assets to be optimally allocated are typically given along with historical load data, utility pricing, and other relative data. However, there are many cases in which the sizes of the assets to be allocated are unknown. For example, when purchasing a new asset for a given application (e.g., adding thermal energy storage or electrical energy storage to a building or central plant), a user may wish to determine the optimal size of the asset to purchase.

Asset sizing module 916 can be configured to determine the optimal size of an asset by considering the potential benefits and costs of the asset. Potential benefits can include, for example, reduced energy costs, reduced demand charges, reduced PLC charges, and/or increased revenue from participating in IBDR programs such as FR or ELDR. Potential costs can include fixed costs (e.g., an initial purchase cost of the asset) as well as marginal costs (e.g., ongoing costs of using the asset) over the time horizon. The potential benefits and costs of an asset may vary based on the application of the asset and/or the system in which the asset will be used. For example, a system that participates in FR programs may realize the benefit of increased IBDR revenue, whereas a system that does not participate in any IBDR programs may not realize such a benefit.

Some of the benefits and costs of an asset may be captured by the original cost function $J(x)$. For example, the cost function $J(x)$ may include terms corresponding to energy cost, multiple demand charges, PLC charges, and/or IBDR revenue, as previously described. Adding one or more new assets may affect the values of some or all of these terms in the original cost function $J(x)$. For example, adding a battery asset may increase IBDR revenue and decrease energy cost, demand charges, and PLC charges. However, the original cost function $J(x)$ may not account for the fixed and marginal costs resulting from new asset purchases. In order to account for these fixed and marginal costs, asset sizing module 916 may add new terms to the original cost function $J(x)$.

Asset sizing module 916 can be configured to augment the cost function $J(x)$ with two new terms that correspond to the cost of purchasing the new assets, resulting in an augmented cost function $J_a(x)$. The additional terms are shown in the following equation:

$$J_a(x) = J(x) + c_f^T v + c_s^T s_a$$

where $J(x)$ is the original cost function, x is the vector of decision variables of the optimization problem over the horizon, $c_f$ is a vector of fixed costs of buying any size of asset (e.g., one element for each potential asset purchase), v is a vector of binary decision variables that indicate whether the corresponding assets are purchased, $c_s$ is a vector of marginal costs per unit of asset size (e.g., cost per unit loading, cost per unit capacity), and $s_a$ is a vector of continuous decision variables corresponding to the asset sizes. Advantageously, the binary purchase decisions and asset size decisions are treated as decision variables which can be optimized along with the decision variables in the vector x. This allows high level optimizer 632 to perform a single optimization to determine optimal values for all of the decision variables in the augmented cost function $J_a(x)$.

In some embodiments, asset sizing module 916 scales the asset purchase costs $c_f^T v$ and $c_s^T s_a$ to the duration of the optimization period h. The cost of purchasing an asset is typically paid over an entire payback period SPP, whereas the operational cost is only over the optimization period h. In order to scale the asset purchase costs to the optimization period, asset sizing module 916 can multiply the terms $c_f^T v$ and $c_s^T s_a$ by the ratio $$\frac{h}{SPP}$$

as shown in the following equation:

$$J_a(x) = J(x) + \frac{h}{8760 \cdot SPP}(c_f^T v + c_s^T s_a)$$

where h is the duration of the optimization period in hours, SPP is the duration of the payback period in years, and 8760 is the number of hours in a year. These and other features of asset sizing module 916 are described in greater detail in U.S. patent application Ser. No. 15/426,962 filed Feb. 7, 2017, the entire disclosure of which is incorporated by reference herein High level optimizer 632 can perform an optimization process to determine the optimal values of each of the binary decision variables in the vector v and each of the continuous decision variables in the vector $s_a$. In some embodiments, high level optimizer 632 uses linear programming (LP) or mixed integer linear programming (MILP) to optimize a financial metric such as net present value (NPV), simple payback period (SPP), or internal rate of return (IRR). Each element of the vectors $c_f$, v, $c_s$, and $s_a$ may correspond to a particular asset and/or a particular asset size. Accordingly, high level optimizer 632 can determine the optimal assets to purchase and the optimal sizes to purchase by identifying the optimal values of the binary decision variables in the vector v and the continuous decision variables in the vector $s_a$.

One financial metric which can be optimized by high level optimizer 632 is NPV. NPV is a measurement of the profitability of a projected investment or project. In some embodiments, NPV is calculated as follows:

$$NPV = \sum_{i=0}^{N} \frac{C_i}{(1+r)^i}$$

where N is the number of time periods for which the NPV is calculated (e.g., the total number of years), $C_i$ is the net cash inflow during the ith period, $C_0$ represents the initial investment cost (e.g., a negative value), and r is the discount rate. The discount rate r is a way to account for the time value of money (i.e., money in the present is worth more than the same amount in the future).

Another financial metric which can be optimized by high level optimizer 632 is IRR. An IRR is the discount rate of an investment where the NPV is zero. It represents the projected rate of growth for the investment. As shown below, instead of solving for the NPV for a given discount rate, high level optimizer can set the NPV to zero and the resulting discount rate is the IRR.

$$0 = \sum_{i=0}^{N} \frac{C_i}{(1+IRR)^i}$$

A third metric which can be optimized by high level optimizer 632 is SPP. The SPP is the number of years required to earn back initial investment costs. High level optimizer 632 can solve for SPP using the following equation:

$$SPP = j - 1 + \left(1 - \frac{a_j}{C_j}\right)$$

where $a_j$ is the accumulated cash balance at the jth year, j is the index of the first year where the accumulated cash balance is greater than or equal to zero, and $C_j$ is the net cash inflow at the jth year. Several examples of how high level optimizer 632 can optimize these financial metrics are provided in U.S. patent application Ser. No. 15/426,962.

Battery Sizing Example

The following example illustrates an application of the asset sizing technique to an electrical energy storage system.

The asset sizing technique can be used to determine the optimal size of a battery in the electrical energy storage system. A battery is a type of asset that has both a capacity size (i.e., an energy capacity) and a loading size (i.e., a power capacity). Accordingly, the optimal size of the battery may indicate both the optimal energy capacity and the optimal power capacity.

Asset sizing module 916 can add two continuous decision variable terms to the original cost function J(x) to represent the energy capacity and the power capacity of the battery being sized. The continuous decision variable terms may have the form:

$$w_{EUC} r_{EUC} C_{eff} \text{ and } w_{PUC} r_{PUC} P_{eff}$$

where $r_{EUC}$ and $r_{PUC}$ are the per unit costs of energy capacity (e.g., \$/kWh) and power capacity (e.g., \$/kW), $C_{eff}$ and $P_{eff}$ are the continuous decision variables representing energy capacity (e.g., kWh) and power capacity (e.g., kW) of the battery being sized, and $w_{EUC}$ and $w_{PUC}$ are the weight adjustments of energy capacity cost and power capacity cost over the optimization period (i.e., the factors used to scale the costs to the duration of the optimization period).

Asset sizing module 916 can also add a binary decision variable term to the original cost function J(x) to represent the fixed cost associated with the battery being sized (i.e., the cost incurred regardless of energy capacity and power capacity). The binary decision variable term may have the form:

$$w_{bat} r_{bat} v$$

where $r_{bat}$ is the fixed cost of the battery being sized (e.g., \$), v is a binary decision variable indicating whether the battery is purchased or not purchased, and $w_{bat}$ is the weight adjustment of the fixed cost over the optimization period (i.e., the factor used to scale the cost to the duration of the optimization period). The weight parameters $w_{EUC}$, $w_{PUC}$, and $w_{bat}$ may be functions of the duration of the optimization period and the annuity factor a(r, N). For example, the weight parameters may have the form:

$$w_{EUC} = w_{PUC} = w_{bat} = \frac{h}{8760 \cdot a(r, N)}$$

The following equation is an example of the augmented cost function $J_a(x)$ after the continuous decision variable terms and binary decision variable term are added:

$$J_a(x) = -\sum_{i=k}^{k+h-1} r_{e_i} P_{bat_i} - \sum_{i=k}^{k+h-1} r_{FR_i} P_{FR_i} + \sum_{i=k}^{k+h-1} r_{s_i} s_i +$$

$$w_d r_d d + w_{EUC} r_{EUC} C_{eff} + w_{PUC} r_{PUC} P_{eff} + w_{bat_i} r_{bat} v$$

where $P_{bat_i}$ is the allocated battery power (e.g., kW) for reducing energy cost and demand cost at the ith time step of the optimization period of duration h, $r_{e_i}$ is cost per unit of electricity (e.g., \$/kWh) at time step i, $P_{FR_i}$ is the battery power committed to frequency response (FR) participation (e.g., kW) at the ith time step, $r_{FR_i}$ is the FR incentive rate (e.g., \$/kWh) at time step i, $r_{s_i}$ is the cost associated with switching the power setpoint of the battery at time step i (e.g., \$/kWh), $s_i$ is the switching auxiliary variable (e.g., kW), $r_d$ is the applicable demand charge rate (e.g., \$/kW) corresponding to the demand charge period which overlaps with the optimization period, d is the electric demand (e.g., kW), $w_d$ is the weight adjustment of the demand charge (i.e., the factor used to scale the demand charge to the optimization period), and the remaining terms are the continuous decision variables and the binary decision variable terms, as previously described.

Asset sizing module 916 can optimize the augmented cost function $J_a(x)$ subject to the following constraints:

$$P_{bat_i} + P_{FR_i} \leq P_{eff}$$

$$-P_{bat_i} + P_{FR_i} \leq P_{eff}$$

$$P_{bat_i} + P_{FR_i} \leq eLoad_i$$

$$\begin{cases} C_a - \sum_{n=k}^{i} P_{bat_n} \leq C_{eff} - C_{FR} P_{FR_i} \\ C_a - \sum_{n=k}^{i} P_{bat_n} \geq C_{FR} P_{FR_i} \end{cases} \forall = k \ldots k+h-1$$

$$\begin{cases} C_a - \sum_{n=k}^{i} P_{bat_n} \leq C_{eff} - C_{FR} P_{FR_{i+1}} \\ C_a - \sum_{n=k}^{i} P_{bat_n} \geq C_{FR} P_{FR_{i+1}} \end{cases} \forall = k \ldots k+h-2$$

where $eLoad_i$ is the electric load at time step i (e.g., kWh), $C_a$ is the available battery capacity (e.g., kWh), and $C_{FR}$ is the FR reserve capacity (e.g., kWh/kW). The FR reserve capacity $C_{FR}$ may be the amount of energy in kWh to be reserved for FR per kW of power committed to FR. In some embodiments, a fractional portion of the frequency response bid may be incorporated into the demand charge constraints.

In some embodiments, the constraints imposed by asset sizing module 916 also include:

$$\begin{cases} d > P_{bat_i} + eLoad_i \\ d > 0 \end{cases} \forall = k \ldots k+h-1$$

$$\begin{cases} s_i > P_{bat_i} - P_{bat_{i-1}} \\ s_i > P_{bat_{i-1}} - P_{bat_i} \end{cases} \forall = k \ldots k+h-1$$

$$P_{bat_i} \leq P_{eff}$$

$$-P_{bat_i} \leq P_{eff}$$

$$C_{eff} - Mv \leq 0$$

$$P_{eff} - C_{rate} C_{eff} \leq 0$$

where M is a very large number (e.g., $M=10^{10}$) and $C_{rate}$ is the maximum allowable power to energy ratio (e.g., $P_{eff}/C_{eff}$). This final constraint can be used to limit the power capacity and/or energy capacity of the battery such that $P_{eff}/C_{eff} \leq C_{rate}$.

Subplant Curve Incorporation

Still referring to FIG. 9, high level optimizer 632 is shown to include a subplant curves module 930. In the simplest case, it can be assumed that the resource consumption of each subplant is a linear function of the thermal energy load produced by the subplant. However, this assumption may not be true for some subplant equipment, much less for an entire subplant. Subplant curves module 930 may be configured to modify the high level optimization problem to account for subplants that have a nonlinear relationship between resource consumption and load production.

Subplant curves module 930 is shown to include a subplant curve updater 932, a subplant curves database 934, a subplant curve linearizer 936, and a subplant curves incorporator 938. Subplant curve updater 932 may be configured to request subplant curves for each of subplants 520-530 from low level optimizer 634. Each subplant curve may indicate an amount of resource consumption by a particular subplant (e.g., electricity use measured in kW, water use measured in L/s, etc.) as a function of the subplant load.

In some embodiments, low level optimizer 634 generates the subplant curves by running the low level optimization process for various combinations of subplant loads and weather conditions to generate multiple data points. Low level optimizer 634 may fit a curve to the data points to generate the subplant curves and provide the subplant curves to subplant curve updater 932. In other embodiments, low level optimizer 634 provides the data points to subplant curve updater 932 and subplant curve updater 932 generates the subplant curves using the data points. Subplant curve updater 932 may store the subplant curves in subplant curves database 934 for use in the high level optimization process.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 618. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load.

Subplant curve linearizer 936 may be configured to convert the subplant curves into convex curves. A convex curve is a curve for which a line connecting any two points on the curve is always above or along the curve (i.e., not below the curve). Convex curves may be advantageous for use in the high level optimization because they allow for an optimization process that is less computationally expensive relative to an optimization process that uses non-convex functions. Subplant curve linearizer 936 may be configured to break the subplant curves into piecewise linear segments that combine to form a piecewise-defined convex curve. Subplant curve linearizer 936 may store the linearized subplant curves in subplant curves database 934.

Subplant curve incorporator 938 may be configured to modify the high level optimization problem to incorporate the subplant curves into the optimization. In some embodiments, subplant curve incorporator 938 modifies the decision variables to include one or more decision vectors representing the resource consumption of each subplant. Subplant curve incorporator 938 may modify the inequality constraints to ensure that the proper amount of each resource is consumed to serve the predicted thermal energy loads. In some embodiments, subplant curve incorporator 938 formulates inequality constraints that force the resource usage for each resource in the epigraph of the corresponding linearized subplant curve. For example, chiller subplant 522 may have a linearized subplant curve that indicates the electricity use of chiller subplant 522 (i.e., input resource $in_1$) as a function of the cold water production of chiller subplant 522 (i.e., output resource $out_1$). The linearized subplant curve may include a first line segment connecting point $[u_1, Q_1]$ to point $[u_2, Q_2]$, a second line segment connecting point $[u_2, Q_2]$ to point $[u_3, Q_3]$, and a third line segment connecting point $[u_3, Q_3]$ to point $[u_4, Q_4]$.

Subplant curve incorporator 938 may formulate an inequality constraint for each piecewise segment of the subplant curve that constrains the value of the decision variable representing chiller electricity use to be greater than or equal to the amount of electricity use defined by the line segment for the corresponding value of the cold water production. Similar inequality constraints can be formulated for other subplant curves. For example, subplant curve incorporator 938 may generate a set of inequality constraints for the water consumption of chiller subplant 522 using the points defining the linearized subplant curve for the water consumption of chiller subplant 522 as a function of cold water production. In some embodiments, the water consumption of chiller subplant 522 is equal to the cold water production and the linearized subplant curve for water consumption includes a single line segment connecting point $[u_5, Q_5]$ to point $[u_6, Q_6]$. Subplant curve incorporator 938 may repeat this process for each subplant curve for chiller subplant 522 and for the other subplants of the central plant to define a set of inequality constraints for each subplant curve.

The inequality constraints generated by subplant curve incorporator 938 ensure that high level optimizer 632 keeps the resource consumption above all of the line segments of the corresponding subplant curve. In most situations, there is no reason for high level optimizer 632 to choose a resource consumption value that lies above the corresponding subplant curve due to the economic cost associated with resource consumption. High level optimizer 632 can therefore be expected to select resource consumption values that lie on the corresponding subplant curve rather than above it.

The exception to this general rule is heat recovery chiller subplant 523. The equality constraints for heat recovery chiller subplant 523 provide that heat recovery chiller subplant 523 produces hot water at a rate equal to the subplant's cold water production plus the subplant's electricity use. The inequality constraints generated by subplant curve incorporator 938 for heat recovery chiller subplant 523 allow high level optimizer 632 to overuse electricity to make more hot water without increasing the amount of cold water production. This behavior is extremely inefficient and only becomes a realistic possibility when the demand for hot water is high and cannot be met using more efficient techniques. However, this is not how heat recovery chiller subplant 523 actually operates.

To prevent high level optimizer 632 from overusing electricity, subplant curve incorporator 938 may check whether the calculated amount of electricity use (determined by the optimization algorithm) for heat recovery chiller subplant 523 is above the corresponding subplant curve. In some embodiments, the check is performed after each iteration of the optimization algorithm. If the calculated amount of electricity use for heat recovery chiller subplant 523 is above the subplant curve, subplant curve incorporator 938 may determine that high level optimizer 632 is overusing electricity. In response to a determination that high level optimizer 632 is overusing electricity, subplant curve incorporator 938 may constrain the production of heat recovery chiller subplant 523 at its current value and constrain the electricity use of subplant 523 to the corresponding value on the subplant curve. High level optimizer 632 may then rerun the optimization with the new equality constraints. These and other features of subplant curves module 930 are described in greater detail in U.S. patent application Ser. No. 14/634,609 filed Feb. 27, 2015, the entire disclosure of which is incorporated by reference herein.

Planning Tool Interface

Figure 15:
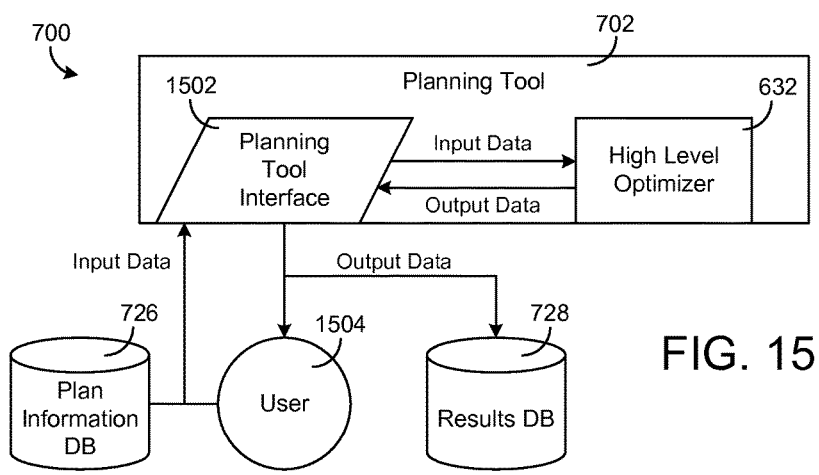
FIG. 15 is a block diagram illustrating the flow of data to the planning tool of FIG. 7, according to an exemplary embodiment.

Referring now to FIG. 15, a block diagram illustrating the flow of data in planning system 700 is shown, according to an exemplary embodiment. Planning tool 702 is shown to include high level optimizer 632 and a planning tool interface 1502. Planning tool interface 1502 can be configured to provide input data to high level optimizer 632 and receive output data from high level optimizer 632. The input data can include any type of data used by high level optimizer 632 to perform the optimization processes described above. For example, the input data can include planned loads, utility rates, photovoltaic generation, locational marginal prices, incentive rates, subplant curves, and various user selections. The user selections may define which features or functions of planning tool 702 will be used to perform the optimization. For example, user 1504 may select whether to include FR, ELDR, PLC, asset sizing, etc. in the optimization performed by high level optimizer 632. The output data can include various performance graphs, load allocations, FR participation results, ELDR participation results, asset sizes, and/or other types of results generated by high level optimizer 632.

In some embodiments, planning tool interface 1502 is an Excel interface configured to receive input data via one or more input sheets and provide output data via one or more output sheets. However, it is contemplated that planning tool interface 1502 can be any type of user interface (e.g., a web interface, an interface generated by a planning tool application, a graphical user interface, etc.). Planning tool interface 1502 can receive input data from plan information database 726, a user 1504, or any other data source. Similarly, planning tool interface 1502 can present output data to user 1504 (e.g., via an electronic display or client device) and/or store the output data in results database 728 or any other data storage device. Planning tool interface 1502 can allow user 1504 to modify and enter several sets of inputs and may serve as the file where results are saved.

In some embodiments, high level optimizer 632 is implemented as a MATLAB kernel or algorithm. However, it is contemplated that high level optimizer 632 can be any system or device configured to perform the optimization processes described above. High level optimizer 632 can be run when called, based on the features selected by user 1504 via planning tool interface 1502. The output data generated by high level optimizer 632 can be presented to user 1504 via planning tool interface 1502 and/or stored in results database 728. In some embodiments, planning tool interface 1502 uses the output data to generate various graphs, charts, tables, or other graphical user interface elements that present the output data to user 1504.

Several examples of interfaces that can be included as part of planning tool interface 1502 are described in detail below with reference to FIGS. 16A-29. Some of these interfaces are input interfaces configured to receive the input data provided to high level optimizer 632, whereas other of these interfaces are output interfaces configured to receive the output data generated by high level optimizer 632. The input data provided to the input interfaces can be entered by a user, retrieved from a database, or otherwise received from another data source. Although some of the input interfaces are described as receiving user-specified data or selections, it should be understood that these data and selections can be provided automatically (e.g., retrieved from a database, provided by a weather service or utility, etc.) in other embodiments and are not necessarily entered by the user.

Input Setup Interface

Referring now to FIGS. 16A-16E, several drawings of an input setup interface 1600 are shown, according to an exemplary embodiment. In some embodiments, input setup interface 1600 is a part of planning tool interface 1502. For embodiments in which planning tool interface 1502 is an Excel interface, input setup interface 1600 may be presented as an input sheet of the Excel interface. Input setup interface 1600 includes various selectable options that allow user 1504 to select the functionality of high level optimizer 632 and adjust the pertinent parameters.

In FIG. 16A, input setup interface 1600 is shown to include functionality selection options 1602, program selection options 1604, financial run information 1606, and capital expenses information 1608. Functionality selection options 1602 allow user 1504 to select various optional functions which can be performed by high level optimizer 632. For example, functionality selection options 1602 may allow user 1504 to select whether asset sizing module 916 will be used to determine an optimal size for a battery asset or other asset of energy storage system 500. The option to determine battery size can be enabled to cause high level optimizer 632 to determine the optimal battery size or disabled to cause high level optimizer 632 to calculate the finances for a given battery size.

Functionality selection options 1602 may also allow user 1504 to select whether to optimize the SPP or NPV. If the option to optimize the SPP is enabled, high level optimizer 632 may find the battery size that optimizes SPP. If NPV is selected, user 1504 can specify various parameters used to optimize NPV including, for example, the SPP, the C rate, the augmentation strategy unit cost ($/kWh), the energy upper bound (kWh) and the power upper bound (kW). In some embodiments, input setup interface 1600 allows user 1504 to adjust the options to optimize SPP and enter the parameters used to optimize NPV only if the option to determine battery size is enabled in functionality selection options 1602.

If the SPP specified by user 1504 is too small and high level optimizer 632 cannot find a size, high level optimizer 632 may return a zero battery size. The C rate functions may function as an upper bound on the battery size to determine. In some embodiments, the augmentation strategy unit cost defines the normalized "per kWh" net present value of the augmentation strategy cost. The battery capacity determined by high level optimizer 632 may be the greater of the energy upper bound and 3% of the effective load mean. Similarly, the battery power determined by high level optimizer 632 may be the greater of the power upper bound and 3% of the effective load mean.

Program selection options 1604 allow user 1504 to select one or more programs in which to participate. For example, program selection options 1604 are shown to include frequency regulation, economic load demand response, and peak load contribution. Selecting one or more of these programs may cause high level optimizer 632 to adjust the cost function J(x) to account for additional revenue derived from the selected programs or costs resulting from the selected programs. Any optimization constraints associated with the selected programs may also be imposed in response to selecting one or more of the programs listed in program selection options 1604. For example, frequency regulation can be selected to enable the FR program, whereas economic load remand response can be selected to enable the ELDR program.

Financial run information 1606 can be used to define the number of years over which the optimization will be performed (e.g., between 1 and 20 years) as well as the financed interest rate (i.e., the discount rate used to calculate NPV). Financial run information 1606 can include a selectable option to generate plots based on the financial information. Capital expenses information 1608 may allow user 1504 to specify various capital expenses. The capital expenses can include system size dependent capital expenses, fixed expenses, and adjustment expenses. System size dependent expenses can include energy cost ($), power cost ($), and installation cost ($). Fixed expenses can include integration cost ($), iDR/SCADA/EOS setup fees ($), warranty costs ($), construction costs ($), controls costs development costs ($), and iDR management fees ($). Adjustment costs can include expected markup of energy cost ($), expected markup of power cost ($), and margin ($).

The energy cost parameter may represent the cost of energy based on battery size and energy unit cost. In some embodiments, the energy cost parameter is automatically updated based on the battery size specified by user 1504 or automatically determined by high level optimizer 632. The power cost parameter may represent the cost of power based on inverter size and power unit cost. In some embodiments, the power cost parameter is automatically updated based on the battery size specified by user 1504 or automatically determined by high level optimizer 632.

In FIG. 16B, input setup interface 1600 is shown to include storage system parameters 1612, photovoltaic (PV) system parameters 1614, expense parameters 1616, and error messages 1618. Storage system parameters 1612 may allow a user to define various parameters associated with a battery asset or other energy storage assets (e.g., thermal energy storage) of energy storage system 500. For example, system storage parameters 1612 are shown to include battery energy capacity (kWh), battery power capacity (kW), SOC control margin (%), storage backup (%), degradation per cycle (%), and degradation threshold (%). In some embodiments, input setup interface 1600 allows user 1504 to adjust storage system parameters 1612 only if the option to determine battery size is disabled in functionality selection options 1602. If the option to determine battery size is enabled, asset sizing module 916 may automatically determine the values of system storage parameters 1612. Whether defined by user 1504 or automatically determined, the battery energy capacity and battery power capacity can be used to update the capital costs of the battery asset based on these parameters.

In some embodiments, high level optimizer 632 is configured to maintain the SOC of the battery between the SOC control margin and 1 minus the SOC control margin. Similarly, high level optimizer 632 may be configured to maintain the SOC of the battery above the storage backup percentage. The degradation per cycle may define the percentage of degradation in battery capacity that occurs per one full cycle of the battery (i.e., full discharge to full charge). The degradation threshold may define the percentage of the original battery capacity at which the battery capacity should be augmented. When the battery capacity degrades below the degradation threshold, the capacity may be reset to its initial capacity at year zero.

PV system parameters 1614 may allow a user to define various parameters associated with a PV energy system that provides energy to energy storage system 500. PV system parameters 1614 are shown to include an option to enable PV, a PV capacity (kW), a PV firming reserve capacity (kWh), and a PV firming reserve power (kW). In some embodiments, input setup interface 1600 allows user 1504 to adjust PV capacity, PV firming reserve capacity, and PV firming reserve power only if the option to enable PV is selected in PV system parameters 1614. When PV is enabled, high level optimizer 632 may calculate the effective load by subtracting the PV generation from the electric load. The PV capacity may define the rated capacity of the PV field. The PV firming reserve capacity may define the amount of energy of the battery capacity to reserve for PV firming. Similarly, the PV firming reserve power may define the amount of power of the battery capacity to reserve for PV firming.

Expense parameters 1616 may allow a user to define various expenses associated with energy storage system 500. Expense parameters 1616 are shown to include energy unit cost ($/kWh), installation cost ($/kWh), power unit cost ($/kW), expected markup of energy cost (%), expected markup of power cost (%), margin (%), an operations and maintenance factor ($/kWh), an iDR management fee (%), and a partner management fee (%). The expected markup percentages can be used to calculate the corresponding expected markup amounts in capital expenses 1608. Similarly, the margin percentage can be used to calculate the margin amount in capital expenses 1608. The operations and maintenance factor can be multiplied by the battery energy capacity to calculate the annual operations and maintenance costs. Error messages 1618 can be configured to display any errors that result from the optimization and/or errors in the information entered by the user.

Figure 16C:
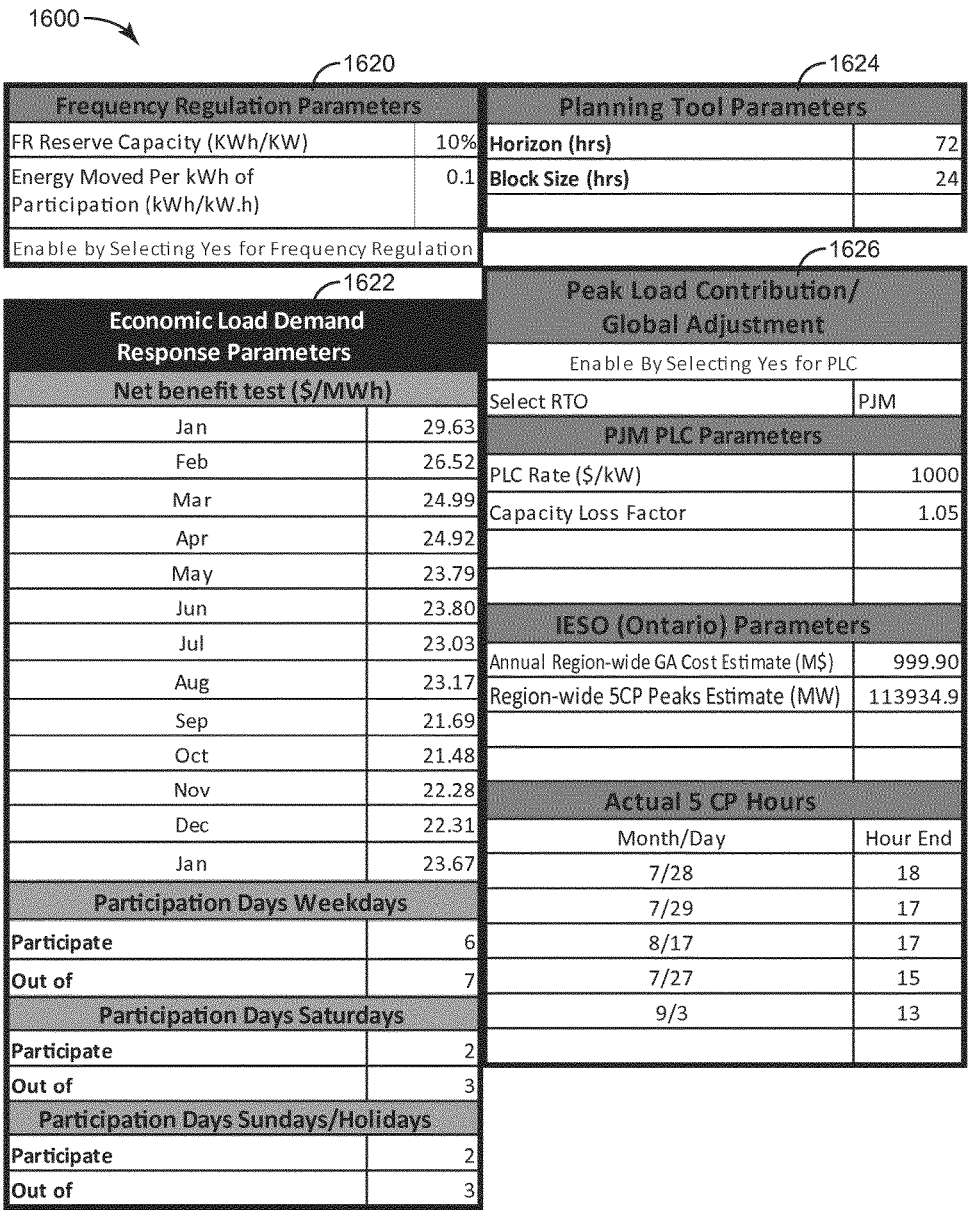

In FIG. 16C, input setup interface 1600 is shown to include FR parameters 1620, ELDR parameters 1622, planning tool parameters 1624, and PLC/GA parameters 1626. FR parameters 1620 may allow a user to define various parameters associated with the FR optimization performed by high level optimizer 632. FR parameters 1620 are shown to include FR reserve capacity (kWh/kW) and energy moved per kWh of participation (kWh/kW·h). In some embodiments, input setup interface 1600 allows user 1504 to adjust FR parameters 1620 only if the FR program is enabled in program selection options 1604. The FR reserve capacity may define a percentage of the battery capacity that needs to be reserved for every kW committed to FR participation. The energy moved per kWh of participation may be used to determine the number of battery cycles corresponding to a FR commitment. For example, if 100 kW is committed to FR, and the energy moved parameter is set to 0.1, then the number of cycles can be calculated as (0.1*100)/(2*battery capacity).

ELDR parameters 1622 may allow a user to define various parameters associated with the ELDR optimization performed by high level optimizer 632. ELDR parameters 1622 are shown to include net benefit test values ($/MWh) for each month of the year, participation days weekdays, participation days Saturdays, and participation days Sundays/holidays. The participation days options may allow the user to define the ratio or percentage of days in which to participate in ELDR. For example, the user can select "6" for the "participate" parameter and "7" for the "out of" parameter under the participation days weekdays heading to specify that system 500 should participate in ELDR for 6 out of 7 weekdays.

Planning tool parameters 1624 may allow a user to define the horizon (hours) and block size (hours) used by planning tool 702. The horizon h defines the duration of the optimization period over which each iteration of the optimization is performed. The block size defines the amount by which the optimization period is shifted forward in time with each iteration of the optimization. PLC/GA parameters 1626 may allow the user to define various parameters used by PLC module 914 to optimize the peak load contribution cost and/or the global adjustment cost. PLC/GA parameters 1626 are shown to include an RTO parameter (e.g., PJM, IESO, etc.), a PLC rate ($/kW), a capacity loss factor, an annual region-wide GA cost estimate (M$), a region-wide coincidental peaks estimate (MW), and actual coincidental peak hours.

The PLC rate may define the rate of the PLC charge in PJM. The capacity loss factor mad be used by PLC module 914 to calculate the rate for the peak load contribution in PJM, as described with reference to FIG. 9. The annual region-wide GA cost estimate may be an estimate of the region-wide cost over a year for the Ontario region. The region-wide peaks estimate may be an estimate of the region-wide consumption during the five coincidental peak hours. The actual CP hours may be the actual five coincidental peak hours. PLC module 914 may assume that the five CP hours are the same for each year of the financial run. In some embodiments, input setup interface 1600 allows user 1504 to adjust PLC/GA parameters 1626 only if the PLC program is enabled in program selection options 1604.

In FIG. 16D, input setup interface 1600 is shown to include a load percent change table 1628 and a rates and FR incentive percent change table 1630. Load percent change table 1628 may allow a user to define the percent change in the electric load and PV generation from year to year. For example, the value of 3.00% in the electric load cell following Year 1 indicates that the electric load for Year 2 will be 3.00% greater than the electric load for Year 1. Similarly, rates and FR incentive percent change table 1630 may allow a user to define the percent change in the electric rate, real time LMP, day ahead LMP, FR incentives, and PLC/GA rates from year to year. For example, the value of 3.00% in the electric rate cell following Year 1 indicates that the electric rate for Year 2 will be 3.00% greater than the electric rate for Year 1.

In FIG. 16E, input setup interface 1600 is shown to include an annual costs table 1632. Annual costs table 1632 may allow a user to define the annual costs added each year to other costs incurred. The augmentation costs may be the costs at which the cost of kWh augmentation are evaluated. The operations and maintenance (O&M) costs may be calculated based on the battery energy capacity and the O&M factor shown in expense parameters 1616.

Rate Selection Interface

Referring now to FIG. 17, a drawing of a rate selection interface 1700 is shown, according to an exemplary embodiment. In some embodiments, rate selection interface 1700 is a part of planning tool interface 1502. For embodiments in which planning tool interface 1502 is an Excel interface, rate selection interface 1700 may be presented as an input sheet of the Excel interface. Rate selection interface 1700 may allow user 1504 to define all of the applicable rate structures such as electricity prices and demand charges. Different rates can be defined for different time periods (e.g., on-peak, partial-peak, off-peak, etc.) different days (e.g. weekdays vs. weekends, holidays, etc.), and different seasons (e.g., summer, winter, etc.). High level optimizer 632 can use the rates and time periods shown in rate selection interface 1700 to determine the values of the cost parameters $r_{e_i}$ and $r_d$ in the cost function J(x) for each time step that occurs during the optimization period.

Pro Forma Interface

Referring now to FIGS. 18A-18D, several drawings of a pro forma interface 1800 are shown, according to an exemplary embodiment. In some embodiments, pro forma interface 1800 is a part of planning tool interface 1502. For embodiments in which planning tool interface 1502 is an Excel interface, pro forma interface 1800 may be presented as an output sheet of the Excel interface. Pro forma interface 1800 may be the main output sheet where the output data and results are saved.

Figure 18A:
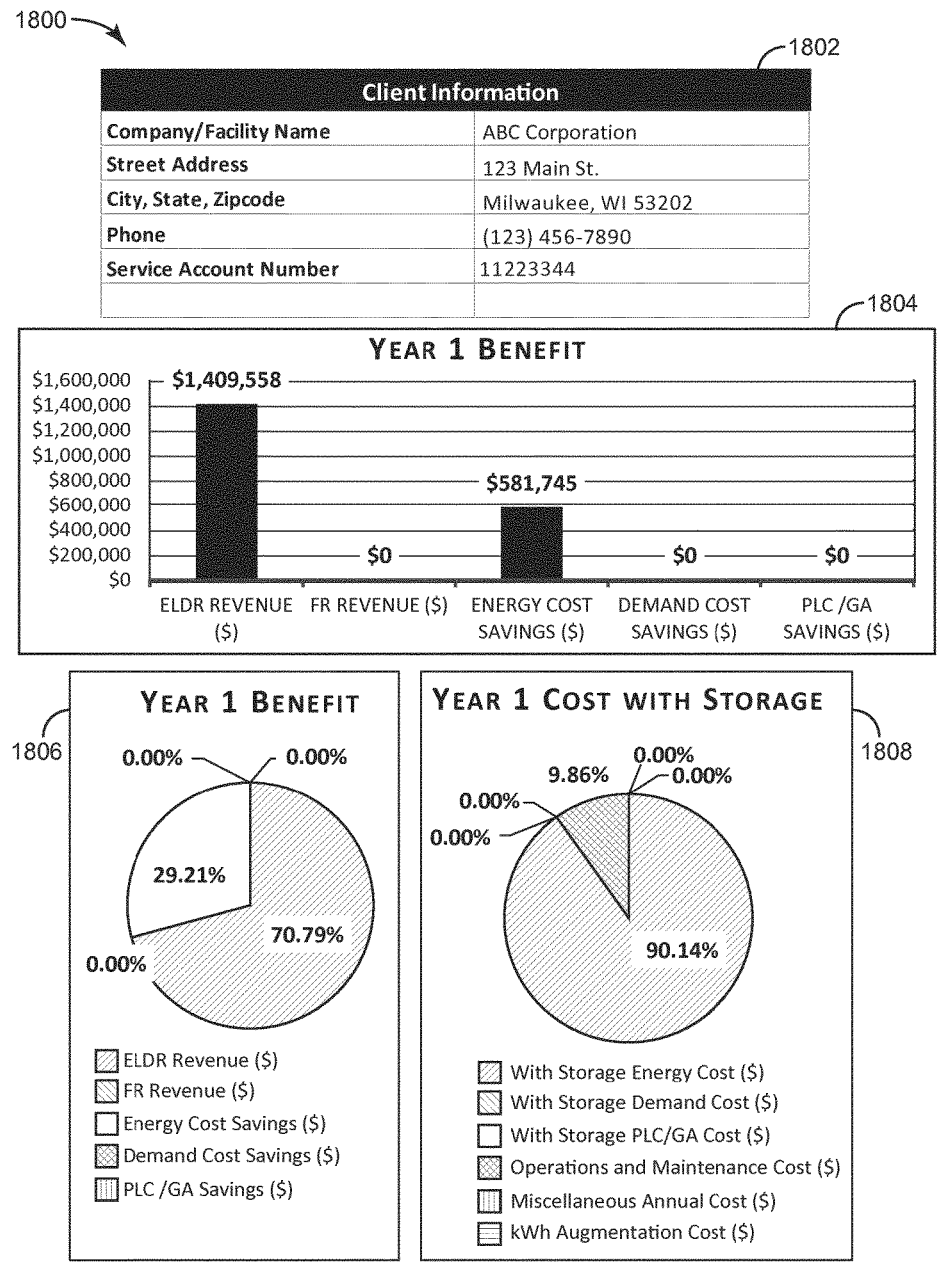

In FIG. 18A, pro forma interface 1800 is shown to include client information 1802 and several graphs 1804, 1806, and 1808. Client information 1802 may be copied from input setup interface 1600. Graph 1804 is shown as a column graph that illustrates the benefit of various functions performed by high level optimizer 632 over the first year of the planning period. For example, graph 1804 may plot the total expected ELDR revenue ($), FR revenue ($), energy cost savings ($), demand cost savings ($), and PLC/GA savings ($). Each of these benefits can be calculated by high level optimizer 632 and output as results of the planning tool 702.

Graph 1806 is shown as a pie chart that illustrates the percentage of each of the benefits shown in graph 1804. For example, graph 1806 indicates that the energy cost savings represents approximately 29.21% of the total savings, whereas ELDR revenue represents approximately 70.79% of the total savings. Similarly, graph 1808 is shown as a pie chart that illustrates the percentage of each of the costs incurred over the first year of the planning period. For example, graph 1808 indicates that energy cost (with storage) represents approximately 90.14% of the total cost, whereas operations and maintenance cost represents approximately 9.86% of the total cost. Each of these costs can be calculated by high level optimizer 632 and output as results of the planning tool 702.

In FIG. 18B, pro forma interface 1800 is shown to include a basic information table 1810 and a results table 1812. Basic information table 1810 may identify the battery size (e.g., battery energy capacity and battery power capacity) selected by the user or automatically determined by high level optimizer 632. Basic information table 1810 may also indicate the programs/functions that were used to generate the results shown in pro forma interface 1800. For example, basic information table 1810 may indicate whether FR was enabled, whether ELDR was enabled, whether PV was enabled, and whether PLC/GA was enabled.

Results table 1812 may include the cost and benefit results generated by high level optimizer 632 as a result of the optimization. For example, results table 1812 is shown to include a baseline cost 1814, a cost with storage 1816 (e.g., a cost when thermal or electrical energy storage is utilized), an annual cost 1818, and a benefit 1820. Baseline cost 1814 may include the baseline energy cost ($), the baseline demand cost ($), and the baseline PLC/GA cost ($). Cost with storage 1816 may include the energy cost with storage ($), the demand cost with storage ($), and the PLC/GA cost with storage ($). Annual cost 1818 may include the operations and maintenance cost ($), the miscellaneous annual cost ($), the kWh augmentation cost ($), and the total annual cost ($). Benefit 1820 may include ELDR revenue ($), FR revenue ($), energy cost savings ($), demand cost savings ($), PLC/GA savings ($), and a total annual benefit. Each of these costs and benefits can be calculated by high level optimizer 632 and output as results of the planning tool 702.

Results table 1812 is shown to further include battery performance 1822 and pro forma 1824. Battery performance 1822 may identify the expected number of battery cycles during each year of the planning period, the initial battery capacity at the beginning of each year, and the final battery capacity at the end of each year. The decrease in battery capacity can be calculated based on the battery degradation rates specified via input setup interface 1600. Pro forma 1824 may include the initial investment ($), an expected cash flow ($) for each year of the planning period, and an accumulated cash balance ($) after each year. Depending on whether SPP, NPV, or IRR was optimized, pro forma 1824 may display the optimal SPP, NPV, and/or IRR. Each of these values can be calculated by high level optimizer 632 and output as results of the planning tool 702.

Figure 18C:
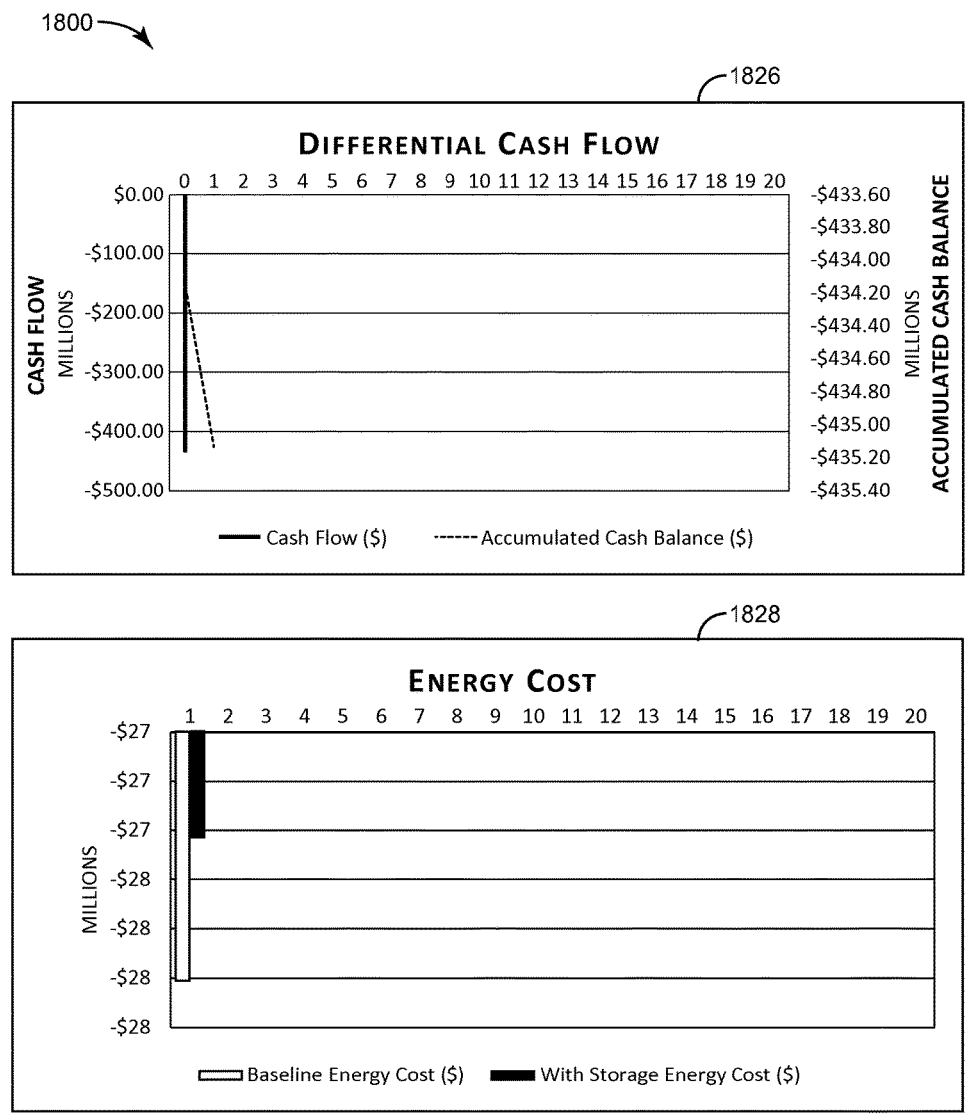
Figure 18D:
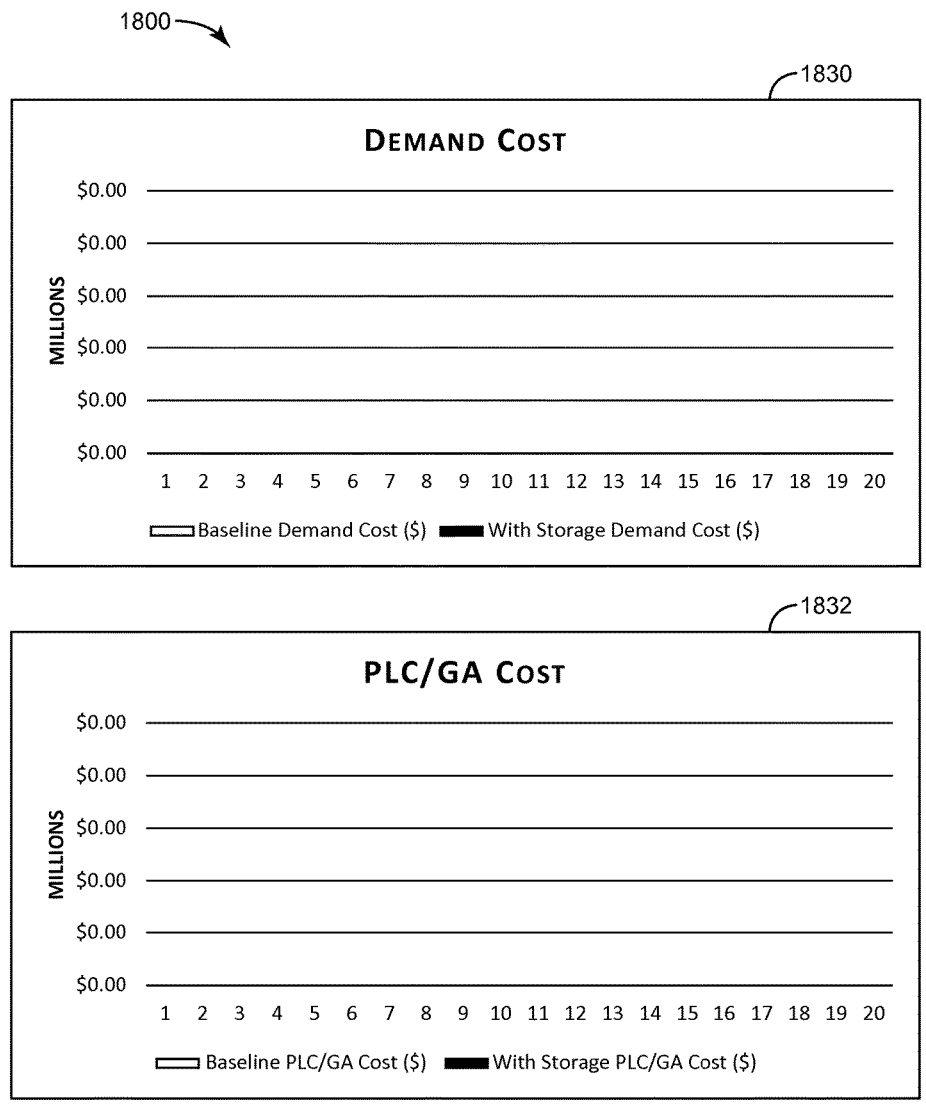

In FIGS. 18C-18D, pro forma interface 1800 is shown to include several graphs 1826, 1828, 1830, and 1832. Graph 1826 plots the differential cash flow and accumulated cash balance for each year of the planning period. Graph 1828 plots the baseline energy cost and the energy cost with storage for each year of the planning period. Graph 1830 plots the demand cost for each year of the planning period. Graph 1832 plots the PLC/GA cost for each year of the planning period. Pro forma interface 1800 may automatically generate graphs 1826-1832 based on the information shown in results table 1812.

Performance Graphs Interface

Referring now to FIGS. 19A-19G, several drawings of a performance graphs interface 1900 are shown, according to an exemplary embodiment. In some embodiments, performance graphs interface 1900 is a part of planning tool interface 1502. For embodiments in which planning tool interface 1502 is an Excel interface, performance graphs interface 1900 may be presented as an output sheet of the Excel interface. Performance graphs interface 1900 may contain the average hourly per month data of the baseline demand, the "with storage" demand (i.e., the demand when storage is utilized), the battery power, and the FR participation. Performance graphs interface 1900 may also include the baseline load duration curve and the with storage load duration curve.

In FIG. 19A, performance graphs interface 1900 is shown to include a data table 1902 indicating the baseline average hourly demand per month. In some embodiments, the baseline demand represents the demand of energy storage system 500 when no energy storage is used. Data table 1902 may include an average baseline demand value for each hour during each month of the year. Each of the hourly baseline demand values in data table 1902 can be determined by calculating the average of a set of hourly baseline demand values for that hour in each day of the corresponding month. The set of hourly baseline demand values can be generated by high level optimizer 632 as a result of the optimization process.

In FIG. 19B, performance graphs interface 1900 is shown to include a data table 1904 indicating the with storage average hourly demand per month. In some embodiments, the with storage demand represents the demand of energy storage system 500 when energy storage is used. Data table 1904 may include an average with storage demand value for each hour during each month of the year. Each of the hourly with storage demand values in data table 1904 can be determined by calculating the average of a set of hourly with storage demand values for that hour in each day of the corresponding month. The set of hourly with storage demand values can be generated by high level optimizer 632 as a result of the optimization process.

In FIG. 19C, performance graphs interface 1900 is shown to include a data table 1906 indicating the average hourly battery power per month. In some embodiments, the battery power represents the power setpoint (kW) (i.e., the rate at which the battery is charging or discharging) for one or more battery assets of energy storage system 500. Data table 1906 may include an average battery power value for each hour during each month of the year. Each of the hourly battery power values in data table 1906 can be determined by calculating the average of a set of hourly battery power values for that hour in each day of the corresponding month. The set of hourly battery power values can be generated by high level optimizer 632 as a result of the optimization process.

In FIG. 19D, performance graphs interface 1900 is shown to include a data table 1908 indicating the average hourly FR participation per month. In some embodiments, the FR participation represents the amount of battery power (kW) dedicated to participating in a frequency response program. Data table 1908 may include an FR participation value for each hour during each month of the year. Each of the hourly FR participation values in data table 1908 can be determined by calculating the average of a set of hourly FR participation values for that hour in each day of the corresponding month. The set of hourly FR participation values can be generated by high level optimizer 632 as a result of the optimization process. Because FR was disabled when the results were generated, each of the hourly FR participation values is shown as zero in data table 1908.

Figure 19E:
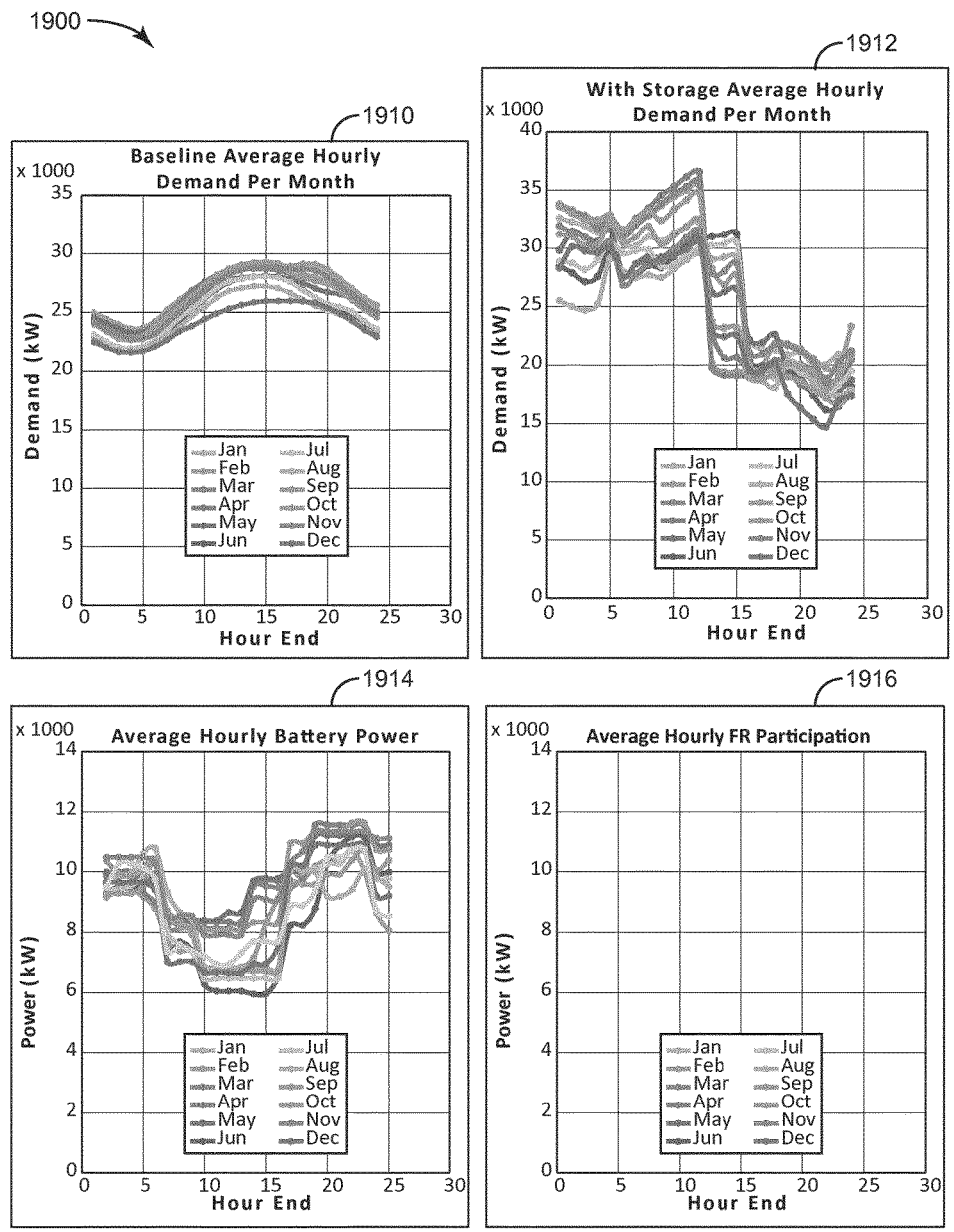

In FIG. 19E, performance graphs interface 1900 is shown to include several graphs 1910, 1912, 1914, and 1916. Each of graphs 1910-1916 may be based on one of the data tables 1902-1908 shown in FIGS. 19A-19D. For example, graph 1910 may plot the baseline average hourly demand per month data shown in data table 1902. Graph 1912 may plot the with storage average hourly demand per month data shown in data table 1904. Graph 1914 may plot the average hourly battery power per month data shown in data table 1906. Graph 1912 may plot the average hourly FR participation per month data shown in data table 1908.

Figure 19F:
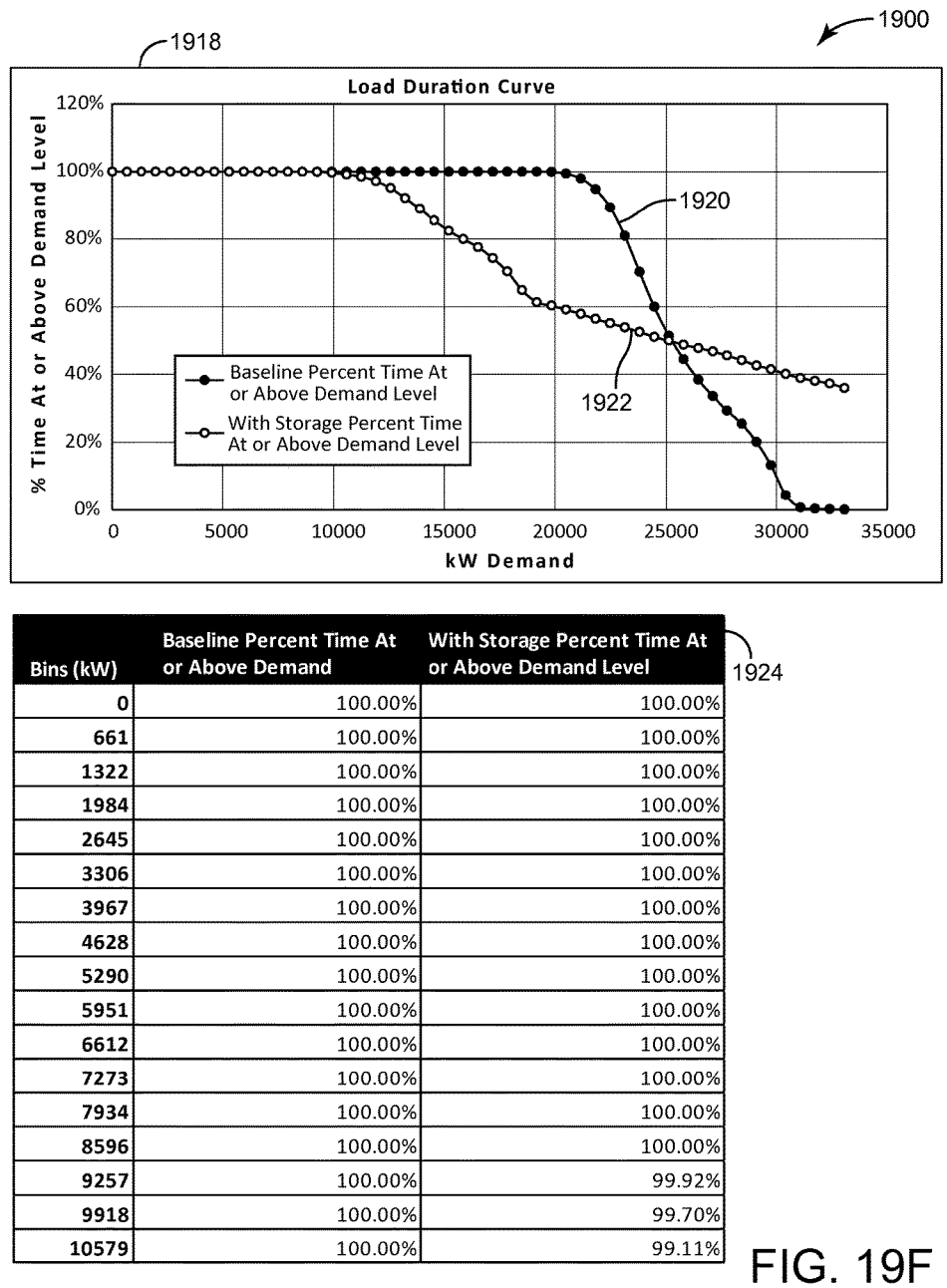

In FIG. 19F, performance graphs interface 1900 is shown to include a load duration graph 1918. Load duration graph 1918 plots a percentage of time that the demand is at or above a threshold demand level (y-axis) as a function of various demand levels (x-axis). Line 1920 represents the data obtained from the baseline configuration of system 500 without energy storage, whereas line 1922 represents the data obtained from the configuration of system 500 with energy storage. As demand increases, both of lines 1920 and 1922 decrease. However, line 1922 begins decreasing at a lower threshold demand value. This indicates that the energy storage provided by the with storage configuration reduces the overall demand for a significant portion of the time.

In FIGS. 19F-19G, performance graphs interface 1900 is shown to include a data table 1924. Data table 1924 contains the data used to generate load duration curve 1918. As shown in data table 1924, the baseline percent time remains at or above the threshold demand value 100% of the time until the threshold demand value is increased to 19,836 kW, at which the baseline percent time begins decreasing. However, the with storage percent time begins decreasing at a significantly lower demand value of approximately 9,257 kW. This indicates that the baseline configuration of system 500 never operates at a demand level below 19,836 kW, whereas the with storage configuration of system 500 operates between 9,257 kW and 19,836 kW for a significant portion of the time.

Projected CP Hours Interface

Referring now to FIG. 20, a drawing of a projected CP hours interface 2000 is shown, according to an exemplary embodiment. In some embodiments, projected CP hours interface 2000 is a part of planning tool interface 1502. For embodiments in which planning tool interface 1502 is an Excel interface, projected CP hours interface 2000 may be presented as an input sheet of the Excel interface. Projected CP hours interface 2000 includes a projected CP hours table 2002 which allows a user to define projected CP hours for the duration of the optimization period (e.g., a year).

Projected CP hours table 2002 may include a cell for every hour of the optimization period. In some embodiments, the user defines projected CP hours by setting the value of the corresponding cell to 1 or another affirmative binary value (e.g., yes, true, etc.). For example, interface 2000 is shown to include a value of 1 in the cell at the intersection of September $21^{st}$ and hour ending 14. This indicates that the $14^{th}$ hour of September $21^{st}$ (i.e., from 1:00 PM until 2:00 PM) is a projected CP hour.

Similarly, table 2002 is shown to include a value of 1 in the cells at the intersections of hour endings 14-18 with each of the days from September $21^{st}$ to September $26^{th}$. This indicates that these hours are designated as projected CP hours. Although only five hours will be actual CP hours, any number of hours can be designated as projected CP hours. The rest of the cells in table 2002 have values of 0 or another negative binary value (e.g., no, false, etc.), which indicates that the remaining hours are not projected CP hours. In some embodiments, the cells that indicate projected CP hours may be highlighted or otherwise marked (e.g., colored, shaded, bolded, etc.) to allow the user to easily spot such cells in interface 2000. PLC module 914 can use the values of the cells in table 2002 to generate the peak hours mask.

Electric Load Interface

Referring now to FIG. 21, a drawing of an electric load interface 2100 is shown, according to an exemplary embodiment. In some embodiments, electric load interface 2100 is a part of planning tool interface 1502. For embodiments in which planning tool interface 1502 is an Excel interface, electric load interface 2100 may be presented as an input sheet of the Excel interface. Electric load interface 2100 includes an electric load table 2102 which defines the electric load (kW) to be satisfied at each hour of the optimization period.

Electric load table 2102 may include a cell for each hour of the optimization period. For example, if the optimization period is one year, electric load table 2102 may include a cell for each of the 24 hours in a day for all 365 days of the year for a total of 8760 hours of electric load data. In some embodiments, the electric load data is predicted by load/rate predictor 622 based on weather forecasts, historical load data, projected building occupancy and/or other factors that may influence the electric load. In other embodiments, the electric load data can be retrieved from plan information database 726 or entered by user 1504.

High level optimizer 632 can use the electric load data as an input to the optimization. High level optimizer 632 can determine an optimal set of control decisions for the equipment of energy storage system 500 to ensure that the electric load is satisfied at each hour of the optimization period. The electric load at each hour can be satisfied by purchasing electricity from a utility, discharging the battery, using electricity generated by photovoltaic array, and/or using electricity generated by one or more of generator subplants 520. Storage subplants 530 can be used to shift the electric load to different hours by charging the battery when energy prices are low and discharging the battery when energy prices are higher.

PV Generation Interface

Referring now to FIG. 22, a drawing of a photovoltaic (PV) generation interface 2200 is shown, according to an exemplary embodiment. In some embodiments, PV generation interface 2200 is a part of planning tool interface 1502. For embodiments in which planning tool interface 1502 is an Excel interface, PV generation interface 2200 may be presented as an input sheet of the Excel interface. PV generation interface 2200 includes a PV generation table 2202 which defines the power generated by a photovoltaic field (kW) at each hour of the optimization period.

PV generation table 2202 may include a cell for each hour of the optimization period. For example, if the optimization period is one year, PV generation table 2202 may include a cell for each of the 24 hours in a day for all 365 days of the year for a total of 8760 hours of PV generation data. In some embodiments, the PV generation data is predicted based on time of day, time of year, weather patterns, cloud formations, or other factors that may influence solar intensity at the site of the PV field. In other embodiments, the PV generation data can be retrieved from plan information database 726 or entered by user 1504. An example of how the PV generation data can be predicted is described in detail in U.S. patent application Ser. No. 15/247,869.

High level optimizer 632 can use the PV generation data as an input to the optimization. For example, the PV generation data can be subtracted from the electric load data (shown in table 2102) to determine the effective electric load to be used in the optimization. In other words, if PV is enabled in PV system parameters 1614, the effective electric load may be equal to the difference between the electric load data and the PV generation data (e.g., $P_{eff_i}=eLoad_i-P_{PV_i}$). High level optimizer 632 can calculate the effective electric load for each hour of the optimization period and store the effective electric load values an effective electric load table 2702 (shown in FIG. 27).

Electric Rate Interface

Referring now to FIG. 23, a drawing of an electric rate interface 2300 is shown, according to an exemplary embodiment. In some embodiments, electric rate interface 2300 is a part of planning tool interface 1502. For embodiments in which planning tool interface 1502 is an Excel interface, electric rate interface 2300 may be presented as an input sheet of the Excel interface. Electric rate interface 2300 includes an electric rate table 2302 which defines the electric rate ($/kW) at each hour of the optimization period.

Electric rate table 2302 may include a cell for each hour of the optimization period. For example, if the optimization period is one year, electric rate table 2302 may include a cell for each of the 24 hours in a day for all 365 days of the year for a total of 8760 hours of electric rate data. In some embodiments, the electric rate data is predicted by load/rate predictor 622 based on information received from an electric utility. For example, the electric rate data can be based on constant pricing information, time-of-use pricing information, real-time pricing information, or other rate structures defined by the electric utility. In some embodiments, the electric rates shown in electric rate table 2302 are populated automatically based on the rate schedule defined via rate selection interface 1700. In other embodiments, the electric rate data can be retrieved from plan information database 726 or entered by user 1504.

High level optimizer 632 can use the electric rate data as an input to the optimization. For example, high level optimizer 632 can use the electric rate data to provide values for the variable $r_{e_i}$ at each time step of the optimization period. High level optimizer 632 can use the electric rate data to determine an optimal set of control decisions for the equipment of energy storage system 500. Storage subplants 530 can be used to shift the electric load to different hours by charging the battery when energy prices are low and discharging the battery when energy prices are higher.

Day Ahead LMP Interface

Referring now to FIG. 24, a drawing of a day ahead locational marginal price (LMP) interface 2400 is shown, according to an exemplary embodiment. In some embodiments, day ahead LMP interface 2400 is a part of planning tool interface 1502. For embodiments in which planning tool interface 1502 is an Excel interface, day ahead LMP interface 2400 may be presented as an input sheet of the Excel interface. Day ahead LMP interface 2400 includes a day ahead LMP table 2402 which defines the day ahead LMPs ($/kW) at each hour of the optimization period.

Day ahead LMP table 2402 may include a cell for each hour of the optimization period. For example, if the optimization period is one year, day ahead LMP table 2402 may include a cell for each of the 24 hours in a day for all 365 days of the year for a total of 8760 hours of day ahead LMP data. In some embodiments, the day ahead LMP data are historical LMP values for the previous year. The day ahead LMP data can be provided by a utility, retrieved from plan information database 726, or entered by user 1504.

High level optimizer 632 can use the day ahead LMP data as an input to the optimization. The day ahead LMP data indicate possible revenue that can be generated by participating in an ELDR program. High level optimizer 632 can use the day ahead LMP data to determine when to participate in the ELDR program.

Real Time LMP Interface

Referring now to FIG. 25, a drawing of a real time locational marginal price (LMP) interface 2500 is shown, according to an exemplary embodiment. In some embodiments, real time LMP interface 2500 is a part of planning tool interface 1502. For embodiments in which planning tool interface 1502 is an Excel interface, real time LMP interface 2500 may be presented as an input sheet of the Excel interface. Real time LMP interface 2500 includes a real time LMP table 2502 which defines the real time LMPs ($/kW) at each hour of the optimization period.

Real time LMP table 2502 may include a cell for each hour of the optimization period. For example, if the optimization period is one year, real time LMP table 2502 may include a cell for each of the 24 hours in a day for all 365 days of the year for a total of 8760 hours of real-time LMP data. In some embodiments, the real time LMP data are historical LMP values for the previous year. The real time LMP data can be provided by a utility, retrieved from plan information database 726, or entered by user 1504.

High level optimizer 632 can use the real time LMP data as an input to the optimization. The real time LMP data indicate possible revenue that can be generated by participating in an ELDR program. The real time LMP data may be different from both real-time electricity prices and the day ahead LMP data. For example, the real time LMP data may be specific to the ELDR real time market. High level optimizer 632 can use the real time LMP data to determine when to participate in the real time ELDR market.

FR Incentive Interface

Referring now to FIG. 26, a drawing of a FR incentive interface 2600 is shown, according to an exemplary embodiment. In some embodiments, FR incentive interface 2600 is a part of planning tool interface 1502. For embodiments in which planning tool interface 1502 is an Excel interface, FR incentive interface 2600 may be presented as an input sheet of the Excel interface. FR incentive interface 2600 includes a FR incentive table 2602 which defines the FR incentive rates ($/kW) at each hour of the optimization period.

FR incentive table 2602 may include a cell for each hour of the optimization period. For example, if the optimization period is one year, FR incentive table 2602 may include a cell for each of the 24 hours in a day for all 365 days of the year for a total of 8760 hours of FR incentive data. In some embodiments, the FR incentive data are historical FR incentive values for the previous year. In other embodiments, the FR incentive data are generated by incentive estimator 620, as described with reference to FIG. 6. The FR incentive data can be provided incentive programs 602, retrieved from plan information database 726, or entered by user 1504.

High level optimizer 632 can use the FR incentive data as an input to the optimization. The FR incentive data indicate possible revenue that can be generated by participating in a FR program. High level optimizer 632 can use the FR incentive data to determine when to participate in the FR program and how much power to commit to FR at each time step. Setting the FR incentive data to zero (i.e., defining no possibility of FR revenue) may cause high level optimizer 632 to not participate in the FR program since no revenue could be generated. In some embodiments, the FR incentive data are also used to calculate the FR program revenue.

Effective Electric Load Interface

Referring now to FIG. 27, a drawing of an effective electric load interface 2700 is shown, according to an exemplary embodiment. In some embodiments, effective electric load interface 2700 is a part of planning tool interface 1502. For embodiments in which planning tool interface 1502 is an Excel interface, effective electric load interface 2700 may be presented as an output sheet of the Excel interface. Effective electric load interface 2700 includes an effective electric load table 2702 which defines the effective electric load (kW) to be satisfied at each hour of the optimization period.

Effective electric load table 2702 may include a cell for each hour of the optimization period. For example, if the optimization period is one year, effective electric load table 2702 may include a cell for each of the 24 hours in a day for all 365 days of the year for a total of 8760 hours of effective electric load data. In some embodiments, the effective electric load data is generated by subtracting the PV generation data in PV generation table 2202 from the electric load data in electric load table 2102. In other words, if PV is enabled in PV system parameters 1614, the effective electric load may be equal to the difference between the electric load data and the PV generation data (e.g., $P_{eff_i} = \text{eLoad}_i - P_{PV_i}$).

High level optimizer 632 can use the effective electric load data as an input to the optimization. High level optimizer 632 can determine an optimal set of control decisions for the equipment of energy storage system 500 to ensure that the effective electric load is satisfied at each hour of the optimization period. The effective electric load at each hour can be satisfied by purchasing electricity from a utility, discharging the battery, and/or using electricity generated by one or more of generator subplants 520. Storage subplants 530 can be used to shift the effective electric load to different hours by charging the battery when energy prices are low and discharging the battery when energy prices are higher.

Net Electric Load Interface

Figure 28:
FIG. 28 is a drawing of a net electric load interface which can be generated by the planning tool of FIG. 7, according to an exemplary embodiment.

Referring now to FIG. 28, a drawing of a net electric load interface 2800 is shown, according to an exemplary embodiment. In some embodiments, net electric load interface 2800 is a part of planning tool interface 1502. For embodiments in which planning tool interface 1502 is an Excel interface, net electric load interface 2800 may be presented as an output sheet of the Excel interface. Net electric load interface 2800 includes a net electric load table 2802 which defines the net electric load (kW) to be satisfied at each hour of the optimization period.

Net electric load table 2802 may include a cell for each hour of the optimization period. For example, if the optimization period is one year, net electric load table 2802 may include a cell for each of the 24 hours in a day for all 365 days of the year for a total of 8760 hours of net electric load data. In some embodiments, the net electric load data is generated by subtracting the allocated battery power (i.e., the amount of power discharged from the battery) from the effective electric load data in effective electric load table 2702. In other words, the net electric load may be equal to the difference between the effective electric load and the power discharged from the battery at each time step (e.g., $P_{net_i} = P_{eff_i} - P_{bat_i}$). If the battery is discharging during a given time step (i.e., $P_{bat_i}$ is positive), the net electric load may be less than the effective electric load. However, if the battery is charging during a given time step (i.e., $P_{bat_i}$ is negative), the net electric load may be greater than the effective electric load.

High level optimizer 632 can calculate the net electric load $P_{net_i}$ for each time step based on the results of the optimization (e.g., based on the optimal battery power setpoints $P_{bat_i}$ and the effective electric load $P_{eff_i}$). The net electric load at each hour can be satisfied by purchasing electricity from a utility and/or using electricity generated by one or more of generator subplants 520. The net electric load represents the time-shifted electric load after the battery has been used to store and discharge electricity. In some embodiments, the net electric load data can be compared with the effective electric load data to observe the hourly performance of the battery asset. The with storage average hourly demand values shown in table 1904 may be based on the net electric load data.

FR Participation Interface

Referring now to FIG. 29, a drawing of a FR participation interface 2900 is shown, according to an exemplary embodiment. In some embodiments, FR participation interface 2900 is a part of planning tool interface 1502. For embodiments in which planning tool interface 1502 is an Excel interface, FR participation interface 2900 may be presented as an output sheet of the Excel interface. FR participation interface 2900 includes a FR participation table 2902 which defines the hourly results from participating in FR ($) at each hour of the optimization period.

FR participation table 2902 may include a cell for each hour of the optimization period. For example, if the optimization period is one year, FR participation table 2902 may include a cell for each of the 24 hours in a day for all 365 days of the year for a total of 8760 hours of FR participation data. In some embodiments, the FR participation data are generated by high level optimizer 632 as a result of the optimization. The FR participation data may be zero if FR is not enabled in the program selection options 1604. Similarly, the FR participation data may be zero if the FR incentive rates are set to zero in FR incentive interface 2600. The average hourly FR participation values shown in table 1908 may be based on the FR participation data.

High Level Optimization Process

Figure 30:
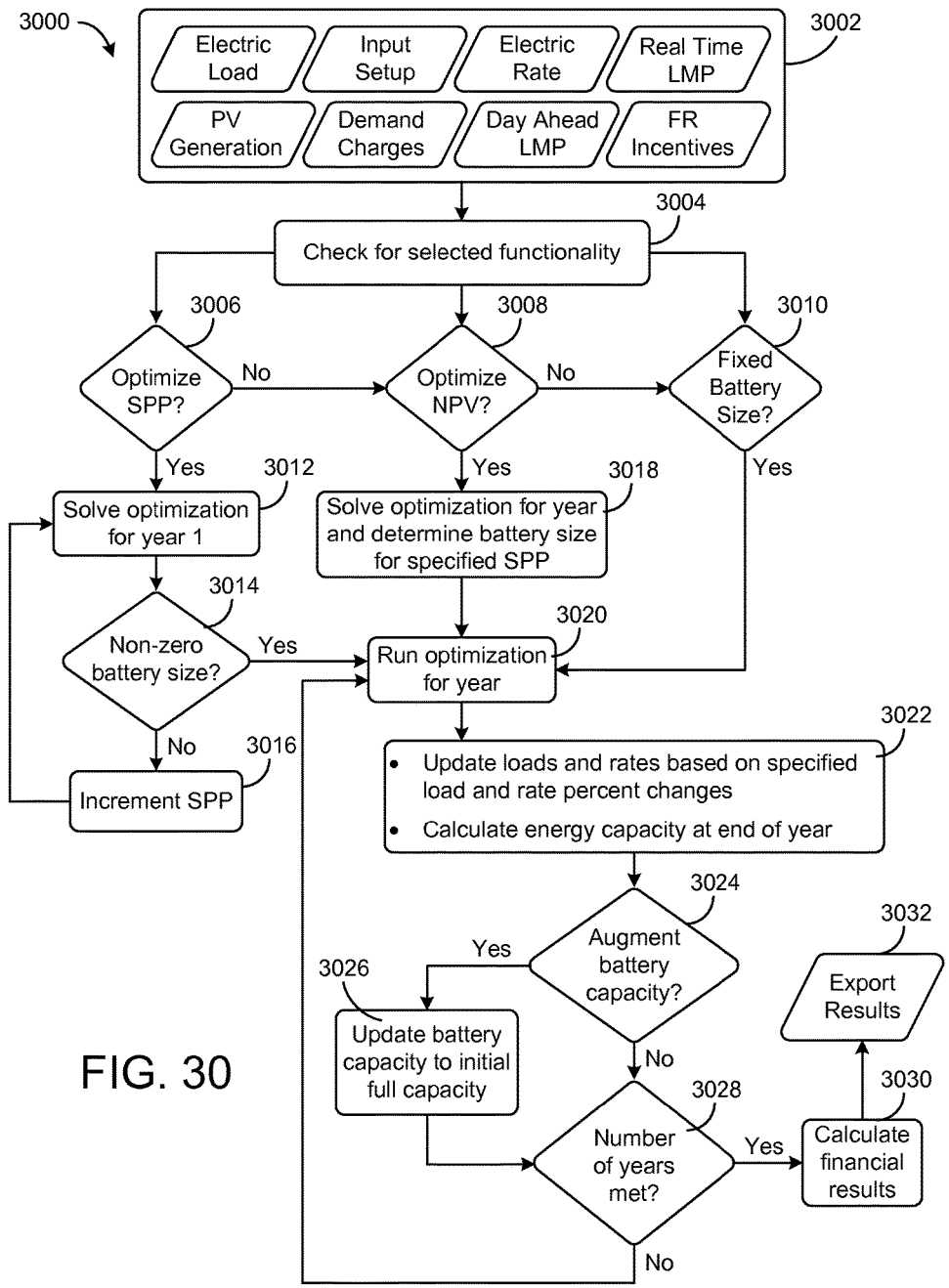
FIG. 30 is a flowchart of a high level optimization process which can be performed by the high level optimizer of FIG. 9, according to an exemplary embodiment.

Referring now to FIG. 30, a flowchart of a high level optimization process 3000 is shown, according to an exemplary embodiment. Process 3000 can be performed by high level optimizer 632 when implemented as a component of planning tool 702 or energy storage controller 506. In some embodiments, process 3000 is performed in response to a user clicking the "Run Tool" button 1610 in input setup interface 1600 (shown in FIG. 16A).

Process 3000 begins with importing input data (step 3002). The input data can include electric load data, input setup data, electric rate data, real time LMP data, PV generation data, demand charge data, day ahead LMP data, FR incentive data, and/or any other type of data used in the high level optimization. In some embodiments, the input data is received via planning tool interface 1502. For example, the input setup data can be imported from input setup interface 1600, the electric rate data and demand charge data can be imported from rate selection interface 1700, the electric load data can be imported from electric load interface 2100, the day ahead LMP data can be imported from day ahead LMP interface 2400, the real time LMP data can be imported from real time LMP interface 2500, and the PV generation data can be imported from PV generation interface 2200. In various embodiments, the input data can be imported from an Excel spreadsheet, retrieved from plan information database 726, entered by user 1504, and/or received from any other data source.

Process 3000 is shown to include checking for selected functionality (step 3004). Step 3004 may include using the program selection options 1604 provided via input setup interface 1600 to identify one or more which IBDR programs in which to participate. The IBDR program options available may include FR and ELDR, among others. Additionally, the user may be given the option of modifying and entering several inputs pertinent to each program, as described with reference to FIGS. 16A-16E. In some embodiments, step 3004 includes checking whether various features of high level optimizer 632 have been enabled. Such features can include, for example, PV generation, accounting for PLC/GA charges, accounting for multiple demand charges, among others. These and other features of high level optimizer 632 can be enabled or disabled using the inputs provided via input setup interface 1600.

Step 3004 may include using the functionality selection options 1602 provided via input setup interface 1600 to identify one or more functions selected by the user. For example, if the option to determine battery size is set to "Yes" in functionality selection options 1602, high level optimizer 632 may determine whether to optimize SPP (step 3006) or optimize NPV (step 3008). If the option to determine battery size is set to "No" in functionality selection options 1602, high level optimizer 632 may operate using a fixed battery size (step 3010).

If the option to optimize SPP is selected in functionality selection options 1602 (i.e., the result of step 3006 is "yes"), high level optimizer 632 may perform steps 3012-3016 to determine a battery size that minimizes SPP given the IBDR programs selected and the requirement of performing PBDR. In step 3012, high level optimizer 632 may run the optimization for year 1 with a SPP value of 1 year. High level optimizer 632 may then check the results of the optimization to determine whether a non-zero battery size has been identified (step 3014). A non-zero battery size may be identified if the results of the optimization indicate a non-zero battery capacity and a non-zero battery inverter power. However, a zero battery size may be identified if the results of the optimization indicate a zero battery capacity or a zero battery inverter power. If a non-zero battery size is not identified (i.e., the result of step 3014 is "no"), high level optimizer 632 may increment the SPP (step 3016) and return to step 3012.

Steps 3012-3016 can be repeated until the results of the year 1 optimization indicate a non-zero battery capacity and/or a non-zero battery inverter power. In some embodiments, the SPP is limited to a maximum of 20 years. Accordingly, steps 3012-3016 can be repeated until the results of the year 1 optimization indicate a non-zero battery capacity and/or a non-zero battery inverter power or until the SPP has reached a value of 20 years, whichever occurs first. Once steps 3012-3016 have been completed and the optimal battery size and SPP have been determined, process 3000 may proceed to step 3020.

If the option to optimize NPV is selected (i.e., the result of step 3008 is "yes"), high level optimizer 632 may perform step 3018 to determine a battery size that maximizes NPV given the IBDR programs selected and the requirement of performing PBDR. In step 3018, high level optimizer 632 may determine the optimal battery size for a specified SPP. In some embodiments, the specified SPP is provided as an input via functionality selection options 1602. Step 3018 may include running the optimization for one year at the given SPP. When optimizing NPV, the optimization may return a non-zero battery size only if there is a feasible solution (i.e., it is possible to achieve the given SPP). If the optimization returns a zero battery size, then a feasible solution does not exist for the given input parameters. This indicates that the specified SPP is too small and must be increased. Step 3018 may include identifying the non-zero battery size returned as a result of the optimization and selecting the identified battery size as the battery size which maximizes NPV for the specified SPP. Once step 3018 has been completed and the optimal battery size and NPV have been determined, process 3000 may proceed to step 3020.

If a fixed battery size is selected (i.e., the result of step 3010 is "yes"), process 3000 may proceed directly to step 3020. The fixed battery size can be specified via storage system parameters 1612. In some embodiments, step 3020 uses the battery size as an input. The battery size can be determined by performing steps 3012-3016 to optimize SPP, performing step 3018 to optimize NPV, or by identifying a fixed battery size specified via storage system parameters 1612. In each of these scenarios, the battery size may be determined prior to performing step 3020 and provided as an input to step 3020.

In step 3020, high level optimizer 632 may run the optimization for a year and return results of the battery asset allocation. If no IBDR programs have been selected, high level optimizer 632 may perform a demand management and minimization of utility cost. If the number of years specified in financial run information 1606 is set to more than one, high level optimizer 632 may update the loads and rates based on their corresponding load percent changes and rate percent changes (step 3022). The load percent changes can be specified via load percent change table 1628, whereas the rate percent changes can be specified via rate and FR incentive percent change table 1630.

Step 3022 may also include calculating energy capacity of the battery at the end of the year. Based on the battery asset allocation results for the first year, high level optimizer 632 may calculate the number of cycles that the battery has experienced. High level optimizer 632 can use the battery degradation per cycle information provided via storage system parameters 1612 to determine the total amount of battery degradation for the number of cycles that the battery has experienced.

Process 3000 is shown to include determining whether to augment the battery capacity (step 3024). In step 3024, high level optimizer 632 may compare the battery capacity calculated in step 3022 with the battery degradation threshold specified via storage system parameters 1612. If the calculated battery capacity is below the battery degradation threshold (i.e., the result of step 3024 is "yes"), high level optimizer 632 may update the battery capacity to the initial full capacity (step 3026) and calculate the energy capacity augmentation cost. The energy capacity augmentation cost may represent the cost incurred to add battery capacity (e.g., by purchasing additional batteries or performing maintenance on existing batteries) to compensate for the amount of battery degradation and restore the initial full capacity.

Process 3000 is shown to include determining whether the number of years have been met (step 3028). Step 3028 may include determining whether the optimization in step 3020 has been performed for the total number of years specified via financial run information 1606. If the total number of years have not yet been met (i.e., the result of step 3028 is "no"), process 3000 may proceed to the next year and return to step 3020. Steps 3020-3028 can be repeated until the specified number of years in the financial run have been met.

Once the specified number of years in the financial run have been met (i.e., the result of step 3028 is "yes"), high level optimizer 632 may calculate financial results (step 3030) and export the results of the optimization (step 3032). Calculating the financial results may include calculating the total costs and benefits shown in pro forma interface 1800. For example, step 3030 may include calculating values for all of the results shown in results table 1812 (e.g., baseline cost 1814, cost with storage 1816, annual cost 1818, benefit 1820, battery performance 1822, pro forma 1824, etc.). In some embodiments, step 3030 includes generating charts and graphs illustrating the financial results (e.g., graphs 1804-1808). Step 3032 may include exporting the results of the optimization to planning tool interface 1502, storing the results of the optimization in results database 728, and/or presenting the results of the optimization to a user 1504.

For embodiments in which high level optimizer 632 is implemented as a component of an online operational tool (e.g., energy storage controller 506), step 3032 may include using the results of the optimization to control the equipment of energy storage system 500. For example, the results of the optimization may indicate optimal resource allocations for each of generator subplants 520 and storage subplants 530 at each time step of the optimization period. Energy storage controller 506 can use the optimal resource allocations to generate control signals for generator subplants 520 and storage subplants 530. Energy storage controller 506 can provide the control signals to generator subplants 520 and storage subplants 530 to control the operation of generator subplants 520 and storage subplants 530.

Figure 31:
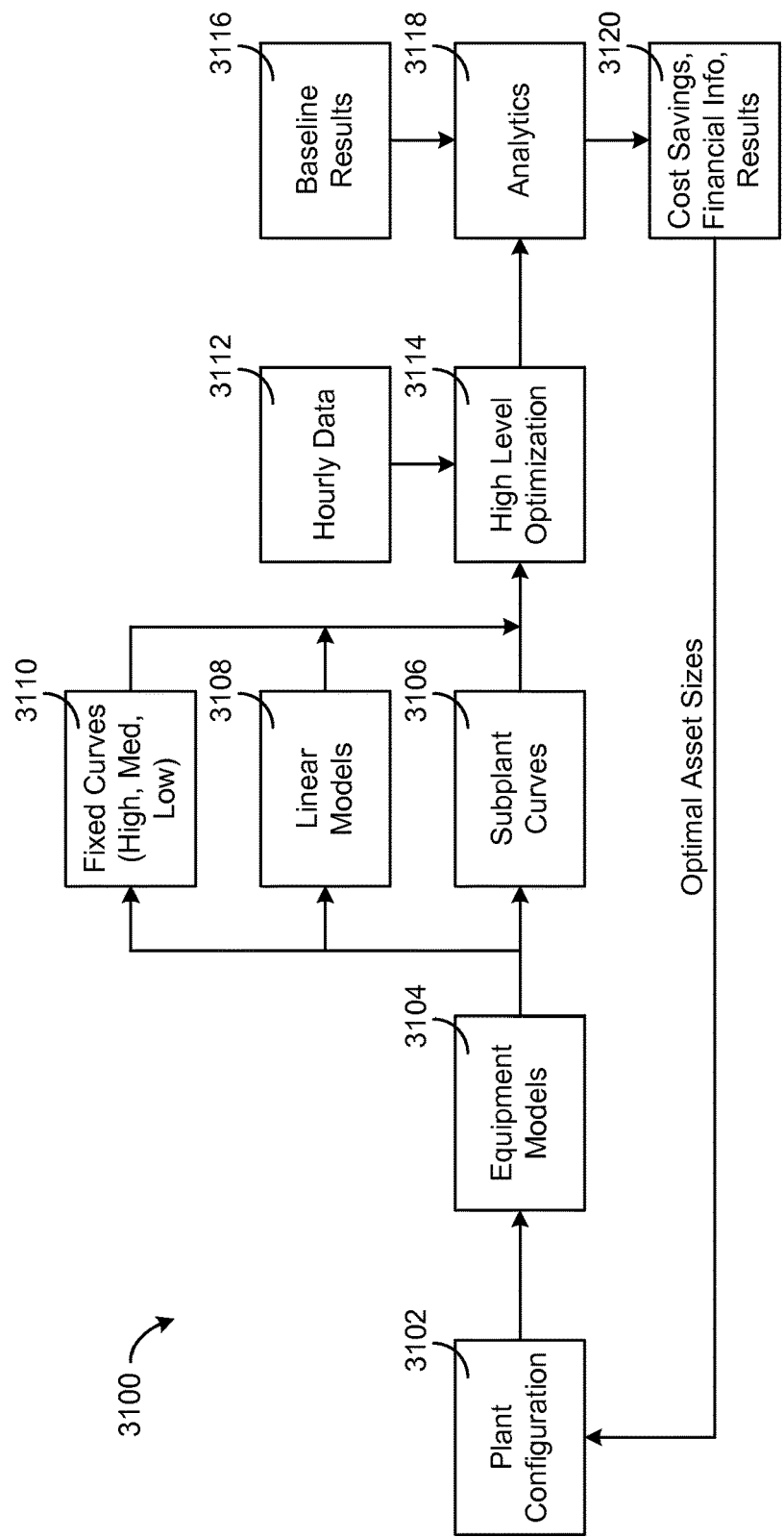
FIG. 31 is a flowchart of another process which can be performed by the high level optimizer of FIG. 9, according to an exemplary embodiment.

Referring now to FIG. 31, a flowchart of another process 3100 which can be performed by high level optimizer 632 is shown, according to an exemplary embodiment. Process 3100 can be performed by high level optimizer 632 when implemented as a component of planning tool 702 or energy storage controller 506. In some embodiments, process 3100 is performed in response to a user clicking the "Run Tool" button 1610 in input setup interface 1600 (shown in FIG. 16A).

Process 3100 is shown to include receiving a plant configuration 3102. Plant configuration 3102 can identify a set of equipment installed within a building or central plant. In some embodiments, plant configuration 3102 identifies one or more chillers, heaters, heat recovery chillers, cooling towers, thermal energy storage tanks, batteries, or other equipment which can be operated to provide energy resources to a building. Plant configuration 3102 can identify attributes of the equipment such as equipment type, model number, size (e.g., maximum loading, maximum capacity, etc.), as well as the interconnections between the equipment. In some embodiments, plant configuration 3102 is defined via planning tool interface 1502. For example, plant configuration data be imported from input setup interface 1600. In various embodiments, plant configuration 3102 can be imported from an Excel spreadsheet, retrieved from plan information database 726, entered by user 1504, and/or received from any other data source.

Process 3100 is shown to include generating equipment models 3104. Equipment models 3104 can be generated for each individual device of the equipment specified by plant configuration 3102. Each equipment model 3104 may define the relationship between input resources and output resources for the corresponding device. For example, each of equipment models 3104 may define resource consumption by the device as a function of load. Equipment models 3104 may be provided by a device manufacturer or generated using experimental data. In some embodiments, equipment models 3104 are based on an initial device efficiency curve provided by a device manufacturer and updated using experimental data.

Process 3100 is shown to include generating subplant curves 3106. Subplant curves 3106 may be composite curves which represent the overall performance of a subplant of the central plant. Each of subplant curves 3106 may correspond to a particular subplant and may indicate the relationship between input resources and output resources for the subplant. For example, the subplant curve 3106 for a chiller subplant may define the resource consumption of the chiller subplant (e.g., electricity, water, etc.) as a function of load (e.g., cold water production). Subplant curves 3106 can be generated by combining multiple equipment models 3106 for equipment within the same subplant to generate a composite curve for the subplant. In some embodiments, subplant curves 3106 are generated and updated by subplant curves module 930, as described with reference to FIG. 9. Subplant curves 3106 can be used to generate constraints on the high level optimization by constraining the operation of each subplant to a point on subplant curves 3106.

In some embodiments, subplant curves 3106 can be replaced with linear models 3108 or fixed curves 3110. Linear models 3108 may define a linear relationship between input resources and output resources for each subplant. Linear models 3108 may be less accurate than subplant curves 3106, but can be generated more quickly than subplant curves 3106. Similarly, fixed curves 3110 may define fixed levels of resource consumption (e.g., low, medium, high, etc.) based on the load on the subplant. For example, a subplant load within a low range may correspond to a low level of resource consumption, whereas a subplant load within a high range may correspond to a high level of resource consumption. Fixed curves 3110 may be less accurate than both linear models 3108 and subplant curves 3106 and can be used as an alternative to subplant curves 3106 or linear models 3108 if necessary.

Process 3100 is shown to include receiving hourly data 3112. Hourly data 3112 can include any of the input data used by high level optimizer 632. For example, hourly data 3112 can include hourly values for electric load, electric rate, real time LMP, PV generation, demand charge, day ahead LMP, FR incentives, and/or any other type of data used in the high level optimization. Hourly data 3112 can include values for each input variable for each hour of the optimization period. For example, if the optimization period is one year, hourly data 3112 may a value for each input variable for each of the 8760 hours in the year. In some embodiments, hourly data 3112 is received via planning tool interface 1502. For example, the electric rate data and demand charge data can be imported from rate selection interface 1700, the electric load data can be imported from electric load interface 2100, the day ahead LMP data can be imported from day ahead LMP interface 2400, the real time LMP data can be imported from real time LMP interface 2500, and the PV generation data can be imported from PV generation interface 2200. In various embodiments, the input data can be imported from an Excel spreadsheet, retrieved from plan information database 726, entered by user 1504, and/or received from any other data source.

Process 3100 is shown to include performing a high level optimization 3114. High level optimization 3114 can be performed by high level optimizer 632, as described with reference to FIGS. 6-9. High level optimization 3114 can generate hourly values for each of the decision variables in the cost function $J(x)$ or augmented cost function $J_a(x)$. For example, high level optimization 3114 can generate hourly values for the load (e.g., heating load, cooling load, electric load, etc.) allocated to each of generator subplants 520 during each hour of the optimization period. High level optimization 3114 can generate hourly values for the amount of each resource (e.g., hot water, cold water, electricity, etc.) to charge or discharge from storage subplants 530 during each hour of the optimization period. High level optimization 3114 can determine an amount of each resource to purchase from utilities 510 and an amount of each resource to provide to the building during each hour of the optimization period. High level optimization 3114 can determine hourly values for participation in IBDR programs such as FR and ELDR during each hour of the optimization period.

High level optimization 3114 can use the hourly values to generate results of the high level optimization. In some embodiments, high level optimization 3114 aggregates the predicted costs and benefits for each hour of the optimization period to generate aggregate results over the duration of the optimization period. The results can include the total cost of resources purchased from utilities 510 over the duration of the optimization period (e.g., electricity cost, water cost, etc.), the total cost of demand charges incurred over the duration of the optimization period, and the total PLC/GA cost over the duration of the optimization period. The results can also include benefits such as the total amount ELDR revenue and FR revenue over the duration of the optimization period. High level optimization 3114 can generate values for any of the variables shown in pro forma interface 1800, performance graphs interface 1900, or any other type of output data generated as a result of the high level optimization.

In some embodiments, high level optimization 3114 determines an optimal size for one or more assets in the building or central plant. Asset sizes can include a maximum loading of the asset and/or a maximum capacity of the asset. Some assets such as storage subplants 530 may have both a maximum loading and a maximum capacity. For example, battery assets may have a maximum battery power (e.g., a maximum rate at which the battery can be charged or discharged) and a maximum state-of-charge (e.g., a maximum energy storage of the battery). Similarly, thermal energy storage assets may have a maximum charge/discharge rate and a maximum capacity (e.g., maximum fluid storage, etc.). Other assets such as generator subplants 520 may have only a maximum loading. For example, a chiller may have a maximum rate at which the chiller can produce cold thermal energy. Similarly, an electric generator may have a maximum rate at which the generator can produce electricity. The optimal asset sizes can be determined as a result of high level optimization 3114, as described with reference to asset sizing module 916.

Process 3100 is shown to include performing analytics 3118. Analytics 3118 can include comparing the results of high level optimization 3114 with baseline results 3116. In some embodiments, baseline results 3116 include a baseline energy cost, demand charge cost, PLC/GA cost, or other costs associated with the operation of the building or central plant. Analytics 3118 can determine an amount of savings 3120 which can be realized by operating the central plant in accordance with the results of high level optimization 3114. For example, the savings 3120 can include energy cost savings, demand cost savings, PLC/GA savings, as well as forms of revenue such as ELDR revenue and FR revenue.

In some embodiments, analytics 3118 include calculating various financial metrics associated with an investment in a new or resized asset of the central plant. The financial metrics can include, for example internal rate of return (IRR), net present value (NPV), and simple payback period (SPP). Analytics 3118 can also determine the size of the asset which yields optimal financial metrics, such as a maximum NPV or a minimum SPP. The optimal financial metrics can be reported via pro forma interface 1800, performance graphs interface 1900, or otherwise provided as results of the high level optimization.

In some embodiments, process 3100 includes using the results 3120 of the high level optimization 3114 to update plant configuration 3102. For example, plant configuration 3102 can be updated to include a new or resized asset having the optimal asset size determined by high level optimization 3114. The optimal asset sizes can be used to redefine plant configuration 3102, which affects equipment models 3104 and subplant curves 3106. In some embodiments, plant configuration 3102 is dynamically updated with each iteration of high level optimization 3114 such that the results 3120 of high level optimization 3114 reflect the optimal asset sizes.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An energy storage system for a building, the system comprising:
    a battery asset configured to store electricity and discharge the stored electricity for use in satisfying a building electric load; and
    an energy storage controller including a computer readable medium and a processor, the energy storage controller comprising computer executable instructions stored in the computer readable medium for implementing a resource allocation planning tool to:
        predict the building electric load to be satisfied at each of a plurality of time steps during an optimization period and one or more selected functionalities of the planning tool;
        generate a cost function defining a cost of operating the energy storage system over the optimization period as a function of one or more battery power setpoints for the battery asset, the cost function comprising a term for each of the selected functionalities;
        generate one or more optimization constraints based on the selected functionalities, attributes of the battery asset, and the predicted building electric load to be satisfied at each of the plurality of time steps;
        optimize the cost function subject to the optimization constraints to determine optimal values of the battery power setpoints for each of the plurality of time steps; and
        generate a control signal configured to control the electricity stored to or discharged from the battery asset based on the optimal values for the battery power setpoints.

2. The energy storage system of claim 1, wherein optimizing the cost function comprises:
    optimizing the cost function to determine optimal values of the battery power setpoints for each of the plurality of time steps in the optimization period, the optimization period comprising a portion of a planning period;

shifting the optimization period forward in time by a block size comprising a predetermined number of time steps;

iteratively repeating the optimizing and shifting steps until the cost function has been optimized for each time step that occurs during the planning period; and predicting the cost of operating the energy storage system over the planning period based on the optimal values of the battery power setpoints for each time step that occurs during the planning period.

3. The energy storage system of claim 1, the energy storage controller further comprising computer executable instructions stored in the computer readable medium for implementing the resource allocation planning tool to:

obtain historical data for one or more parameters specific to the selected functionalities, the historical data defining values of the one or more parameters for each time step of the optimization period; and use the historical data as inputs to the cost function.

4. The energy storage system of claim 1, wherein the selected functionalities comprise accounting for revenue generated by using the battery asset to participate in one or more incentive programs during the optimization period, the incentive programs comprising at least one of frequency regulation (FR) and economic load demand response (ELDR);

wherein the cost function comprises at least one of a term accounting for FR revenue and a term accounting for ELDR revenue.

5. The energy storage system of claim 1, wherein the selected functionalities comprise determining an optimal size for the battery asset;

wherein the cost function accounts for both an initial purchase cost of the battery asset and an effect of the battery asset on the cost of operating the energy storage system, wherein both the initial purchase cost of the battery asset and the effect of the battery asset on the cost of operating the energy storage system are functions of one or more battery size variables included in the cost function; and the energy storage controller further comprising computer executable instructions stored in the computer readable medium for implementing the resource allocation planning tool to optimize the cost function to determine optimal values for the battery power setpoints and the battery size variables.

6. The energy storage system of claim 5, wherein optimizing the cost function comprises optimizing a financial metric comprising at least one of net present value, internal rate of return, and simple payback period.

7. The energy storage system of claim 5, the energy storage controller further comprising computer executable instructions stored in the computer readable medium for implementing the resource allocation planning tool to:

update the attributes of the battery asset based on the optimal values of the battery size variables; and scale one or more battery size cost terms in the cost function to a duration of the optimization period.

8. The energy storage system of claim 1, wherein the selected functionalities comprise accounting for multiple demand charges, each of the demand charges corresponding to a demand charge period and defining a cost based on a maximum amount of electricity purchased from an electric utility during any time step within the corresponding demand charge period; and the energy storage controller further comprising computer executable instructions stored in the computer readable medium for implementing the resource allocation planning tool to apply a demand charge mask to each of the multiple demand charges, wherein the demand charge masks cause the planning tool to disregard the electricity purchased from the electric utility during any time steps that occur outside the corresponding demand charge period when calculating a value for the demand charge.

9. The energy storage system of claim 8, the energy storage controller further comprising computer executable instructions stored in the computer readable medium for implementing the resource allocation planning tool to apply a weighting factor to each of the multiple demand charges in the cost function, each weighting factor scaling the corresponding demand charge to a duration of the optimization period.

10. The energy storage system of claim 1, wherein the selected functionalities comprise accounting for a peak load contribution (PLC) charge and the cost function comprises a PLC term representing a cost based on an amount of electricity purchased from an electric utility during coincidental peak (CP) hours of the optimization period; and the energy storage controller further comprising computer executable instructions stored in the computer readable medium for implementing the resource allocation planning tool to apply a peak hours mask to the PLC term, wherein the peak hours mask identifies one or more hours in the optimization period as projected peak hours and causes the planning tool to disregard the electricity purchased from the electric utility during any hours not identified as projected peak hours when calculating a value for the PLC term.

11. A method for optimizing cost in an energy storage system for a building, the energy storage system including a battery asset and an energy storage controller for implementing a resource allocation planning tool, the method comprising:

predicting, using the energy storage controller, a building electric load to be satisfied at each of a plurality of time steps during an optimization period and one or more selected functionalities of the planning tool;

generating, using the energy storage controller, a cost function defining a cost of operating the energy storage system over the optimization period as a function of one or more battery power setpoints for a battery asset of the energy storage system, the cost function comprising a term for each of the selected functionalities;

generating, using the energy storage controller, one or more optimization constraints based on the selected functionalities, attributes of the battery asset, and the predicted building electric load to be satisfied at each of the plurality of time steps;

optimizing, using the energy storage controller, the cost function subject to the optimization constraints to determine optimal values of the battery power setpoints for each of the plurality of time steps; and generating, using the energy storage controller, a control signal for controlling electricity stored to or discharged from the battery asset based on the optimal values for the battery power setpoints.

12. The method of claim 11, wherein optimizing the cost function comprises:

optimizing the cost function to determine optimal values of the battery power setpoints for each of the plurality of time steps in the optimization period, the optimization period comprising a portion of a planning period;

shifting the optimization period forward in time by a block size comprising a predetermined number of time steps;

iteratively repeating the optimizing and shifting steps until the cost function has been optimized for each time step that occurs during the planning period; and predicting the cost of operating the energy storage system over the planning period based on the optimal values of the battery power setpoints for each time step that occurs during the planning period.

13. The method of claim 11, further comprising:

obtaining, using the energy storage controller, historical data for one or more parameters specific to the selected functionalities, the historical data defining values of the one or more parameters for each time step of the optimization period; and using the historical data as inputs to the cost function.

14. The method of claim 11, wherein the selected functionalities comprise accounting for revenue generated by using the battery asset to participate in one or more incentive programs during the optimization period, the incentive programs comprising at least one of frequency regulation (FR) and economic load demand response (ELDR);

wherein the cost function comprises at least one of a term accounting for FR revenue and a term accounting for ELDR revenue.

15. The method of claim 11, wherein the selected functionalities comprise determining an optimal size for the battery asset;

wherein the cost function accounts for both an initial purchase cost of the battery asset and an effect of the battery asset on the cost of operating the energy storage system, wherein both the initial purchase cost of the battery asset and the effect of the battery asset on the cost of operating the energy storage system are functions of one or more battery size variables included in the cost function; and wherein optimizing the cost function comprises determining optimal values for the battery power setpoints and the battery size variables.

16. The method of claim 15, wherein optimizing the cost function comprises optimizing a financial metric comprising at least one of net present value, internal rate of return, and simple payback period.

17. The method of claim 15, further comprising:

updating, using the energy storage controller, the attributes of the battery asset based on the optimal values of the battery size variables; and scaling, using the energy storage controller, one or more battery size cost terms in the cost function to a duration of the optimization period.

18. The method of claim 11, wherein the selected functionalities comprise accounting for multiple demand charges, each of the demand charges corresponding to a demand charge period and defining a cost based on a maximum amount of electricity purchased from an electric utility during any time step within the corresponding demand charge period; and the method further comprising applying, using the energy storage controller, a demand charge mask to each of the multiple demand charges, wherein the demand charge masks cause the electricity purchased from the electric utility during any time steps that occur outside the corresponding demand charge period to be disregarded when calculating a value for the demand charge.

19. The method of claim 18, further comprising applying, using the energy storage controller, a weighting factor to each of the multiple demand charges in the cost function, each weighting factor scaling the corresponding demand charge to a duration of the optimization period.

20. The method of claim 11, wherein the selected functionalities comprise accounting for a peak load contribution (PLC) charge and the cost function comprises a PLC term representing a cost based on an amount of electricity purchased from an electric utility during coincidental peak (CP) hours of the optimization period;

the method further comprising applying, using the energy storage controller, a peak hours mask to the PLC term, wherein the peak hours mask identifies one or more hours in the optimization period as projected peak hours and causes the electricity purchased from the electric utility during any hours not identified as projected peak hours to be disregarded when calculating a value for the PLC term.

* * * * *